(12) United States Patent
Song et al.

(10) Patent No.: US 12,183,329 B2
(45) Date of Patent: Dec. 31, 2024

(54) ELECTRONIC DEVICE FOR PROCESSING USER UTTERANCE AND OPERATION METHOD THEREFOR

(71) Applicant: SAMSUNG ELECTRONICS CO., LTD., Suwon-si (KR)

(72) Inventors: Meesun Song, Suwon-si (KR); Jaehwan Lee, Suwon-si (KR); Harim Lee, Suwon-si (KR); Chunga Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 570 days.

(21) Appl. No.: 17/490,383

(22) Filed: Sep. 30, 2021

(65) Prior Publication Data

US 2022/0020358 A1    Jan. 20, 2022

Related U.S. Application Data

(63) Continuation of application No. PCT/KR2020/008365, filed on Jun. 26, 2020.

(30) Foreign Application Priority Data

Jun. 26, 2019    (KR) .......................... 10-2019-0076622

(51) Int. Cl.
*G10L 15/16*    (2006.01)
*G06F 3/16*    (2006.01)
(Continued)

(52) U.S. Cl.
CPC ................ *G10L 15/08* (2013.01); *G06F 3/16* (2013.01); *G10L 25/30* (2013.01)

(58) Field of Classification Search
CPC ... G10L 15/22; G10L 2015/223; G10L 15/26; G10L 15/1822; G10L 15/08; G10L 15/30;
(Continued)

(56) References Cited

U.S. PATENT DOCUMENTS 10,241,754 B1    3/2019    Kadarundalagi Raghuram Doss et al.
11,921,762 B2 *   3/2024    Arcienega ........... G06F 16/3329
(Continued)

FOREIGN PATENT DOCUMENTS

KR    10-2004-0102224    12/2004
KR    10-2016-0006464    1/2016
(Continued)

OTHER PUBLICATIONS

International Search Report for PCT/KR2020/008365, mailed Sep. 29, 2020, 4 pages.
(Continued)

*Primary Examiner* — Olujimi A Adesanya
(74) *Attorney, Agent, or Firm* — Nixon & Vanderhye, P.C.

(57) ABSTRACT

According to various embodiments, provided is a control operation comprising: receiving a first utterance from a device; determining a specific category corresponding to the received first utterance from among a plurality of categories; determining a first domain for processing of the first utterance from among a plurality of domains related to the determined specific category; acquiring information enabling an operation corresponding to the first utterance to be performed based on the determined first domain; receiving a second utterance from the device; identifying whether processing of the second utterance is possible in the determined first domain; based on identifying that the processing of the second user utterance based on the first domain is not possible, checking a second domain among the plurality of domains, and identifying whether processing of the second utterance based on the second domain is possible; and based on identifying that the processing of the second utterance based on the second domain is possible, acquiring information enabling an operation corresponding to the second (Continued)

utterance to be performed based on the second domain. An operation of determining a domain corresponding to a user utterance of the electronic device may be performed using an artificial intelligence model.

14 Claims, 28 Drawing Sheets

(51) Int. Cl.
  *G10L 15/08* (2006.01)
  *G10L 25/30* (2013.01)
(58) Field of Classification Search
  CPC ............ G10L 2015/228; G10L 15/18; G10L 2015/088; G10L 15/00; G10L 17/06; G10L 15/063
  See application file for complete search history.

(56) References Cited

U.S. PATENT DOCUMENTS

| | | | |
|---|---|---|---|
| 2005/0171779 A1 | 8/2005 | Joublin | |
| 2005/0203737 A1 | 9/2005 | Miyazaki | |
| 2008/0091406 A1* | 4/2008 | Baldwin | G06F 3/167 |
| | | | 704/4 |
| 2010/0023320 A1* | 1/2010 | Di Cristo | G10L 15/22 |
| | | | 704/E15.001 |
| 2012/0089481 A1* | 4/2012 | Iozzia | H04N 7/16 |
| | | | 726/5 |
| 2013/0311997 A1* | 11/2013 | Gruber | G06F 9/5005 |
| | | | 718/102 |
| 2016/0012820 A1 | 1/2016 | Mun et al. | |
| 2016/0148612 A1* | 5/2016 | Guo | G06F 40/237 |
| | | | 704/257 |
| 2016/0259623 A1* | 9/2016 | Sumner | G06F 3/167 |
| 2016/0336024 A1* | 11/2016 | Choi | G10L 15/22 |
| 2016/0357755 A1* | 12/2016 | Douglas | G06F 16/9535 |
| 2017/0076724 A1 | 3/2017 | Park et al. | |
| 2017/0132019 A1* | 5/2017 | Karashchuk | G06F 3/04886 |
| 2017/0358304 A1* | 12/2017 | Castillo Sanchez | G10L 15/22 |
| 2018/0049253 A1* | 2/2018 | Lee | H04W 8/26 |
| 2018/0122378 A1* | 5/2018 | Mixter | G10L 15/22 |
| 2018/0232662 A1* | 8/2018 | Solomon | G06F 3/04842 |
| 2018/0260680 A1* | 9/2018 | Finkelstein | G06N 5/04 |
| 2018/0293484 A1* | 10/2018 | Wang | G06F 16/632 |
| 2018/0366114 A1 | 12/2018 | Anbazhagan et al. | |
| 2019/0258456 A1* | 8/2019 | Byun | H04L 51/02 |
| 2019/0286480 A1* | 9/2019 | Park | G06F 9/451 |
| 2020/0043476 A1 | 2/2020 | Hwang | |
| 2021/0104232 A1* | 4/2021 | Lee | G06N 3/08 |

FOREIGN PATENT DOCUMENTS

| | | |
|---|---|---|
| KR | 10-2016-0059026 | 5/2016 |
| KR | 10-2016-0059640 | 5/2016 |
| KR | 10-2017-0032114 | 3/2017 |
| KR | 10-2018-0096483 | 8/2018 |

OTHER PUBLICATIONS

Written Opinion of the ISA for PCT/KR2020/008365, mailed Sep. 29, 2020, 4 pages.

* cited by examiner

ELECTRONIC DEVICE FOR PROCESSING
USER UTTERANCE AND OPERATION
METHOD THEREFOR

CROSS-REFERENCE TO RELATED
APPLICATIONS

This application is a continuation of International Application No. PCT/KR2020/008365, filed on Jun. 26, 2020, which claims priority to Korean Patent Application No. 10-2019-0076622 filed on Jun. 26, 2019 in the Korean Intellectual Property Office, the disclosures of which are herein incorporated by reference.

BACKGROUND

Field

The disclosure relates to an electronic device for processing user utterances and an operation method thereof.

Description of Related Art

Portable digital communication devices are becoming necessities for modern people. Consumers want to enjoy a variety of high-quality services they want anytime and anywhere using portable digital communication devices.

Speech recognition services provide various content services to consumers in response to a user voice received on the basis of a speech recognition interface that is implemented in portable digital communication devices. In order to provide speech recognition services, technologies for recognizing and analyzing human languages (e.g., automatic speech recognition, natural language understanding, natural language generation, machine translation, dialogue systems, question answering, speech recognition/synthesis, and the like) are implemented in the portable digital communication devices.

In order to provide high-quality speech recognition services to consumers, it is necessary to implement a technology for accurately identifying user intent from the user voice and a technology for providing an appropriate content service corresponding to the identified user intent.

An electronic device may provide various speech services to the user by processing an utterance received from the user through an external server. The external server may receive a user utterance from the electronic device, and may process the user utterance on the basis of a domain corresponding to the received user utterance, among a plurality of domains registered in the external server for processing user utterances, thereby providing a specific service. However, as the types of services increase exponentially, the number of domains registered in the external server increases exponentially, and accordingly, workload is increased in the external server for selecting a domain suitable for the user intent analyzed on the basis of the received user utterance. In addition, in the case where it is impossible to process the user utterance in a domain predetermined to process the user utterance, it is difficult for the external server to provide a speech service corresponding to the received user utterance.

SUMMARY

Embodiments of the disclosure may select a category corresponding to a user utterance, and may process the user utterance by a specific domain included in the selected category, thereby selecting a domain for providing a service suitable for the user utterance from among a plurality of domains and reducing the workload of the electronic device that identifies the respective domains. If it is not possible or able to process the user utterance by a predetermined domain, embodiments of the disclosure provide an electronic device that may allow the user utterance to be processed by another domain, thereby improving continuity of providing speech services.

According to various example embodiments, there is provided a method of operating an electronic device including: receiving a first utterance from a device; determining a specific category corresponding to the received first utterance from among a plurality of categories; determining a first domain for processing the first utterance from among a plurality of domains related to the determined specific category; obtaining information that causes an operation corresponding to the first utterance to be performed based on the determined first domain; receiving a second utterance from the device; identifying whether the second utterance is capable of being processed in the determined first domain; based on identifying that the second utterance is not capable of being processed based on the first domain, identifying a second domain among the plurality of domains and identifying whether the second utterance is capable of being processed based on the second domain; and based on identifying that the second utterance is capable of being processed based on the second domain, obtaining information that causes an operation corresponding to the second utterance to be performed based on the second domain.

According to various example embodiments, there is provided an electronic device including: at least one communication circuit; and at least one processor operatively connected to the at least one communication circuit, wherein the at least one processor may be configured to: control the at least one communication circuit to receive a first utterance from a device; determine a specific category corresponding to the received first utterance from among a plurality of categories; determine a first domain for processing the first utterance from among a plurality of domains related to the determined specific category; obtain information that causes an operation corresponding to the first utterance to be performed based on the determined first domain; control the at least one communication circuit to receive a second utterance from the device; identify whether the second utterance is capable of being processed in the determined first domain; based on identifying that the second user utterance is not capable of being processed based on the first domain, identify a second domain from among the plurality of domains; identify whether the second utterance is capable of being processed based on the second domain; and based on identifying that the second user utterance is capable of being processed based on the second domain; obtain information that causes an operation corresponding to the second utterance to be performed based on the second domain.

According to various example embodiments, there is provided an electronic device including: a memory configured to store instructions, first information on a plurality of categories, and second information on at least one domain included the respective categories; and at least one processor, wherein the instructions, when executed, cause the at least one processor to: obtain a first utterance, determine a specific category corresponding to the first utterance from among a plurality of categories based on at least part of the first information; determine a first domain for processing the first utterance from among a plurality of domains related to the determined specific category based on at least part of the second information; obtain information that causes an operation corresponding to the first utterance to be performed based on the determined first domain; obtain a second utterance; identify whether the second user utterance is capable of being processed in the determined first domain based on at least part of the second information; based on identifying that the second user utterance is not capable of being processed based on the first domain, identify a second domain from among the plurality of domains; identify whether the second utterance is capable of being processed based on the second domain; and based on identifying that the second user utterance is capable of being processed based on the second domain, obtain information that causes an operation corresponding to the second utterance to be performed based on the second domain.

According to various example embodiments, embodiments addressing the problems are not limited to the above-described example embodiments, and various modifications, alternatives and substitutes that are not mentioned may be clearly understood from this disclosure and the accompanying drawings by those of ordinary skill in the art to which the disclosure pertains.

According to various example embodiments, it is possible to provide an electronic device that selects a category corresponding to a user utterance and processes the user utterance by a specific domain included in the selected category, thereby selecting a domain for providing a service suitable for the user utterance from among a plurality of domains and reducing the workload of the electronic device for identifying each of the plurality of domains, and to further provide an operation method thereof. According to various example embodiments, it is possible to provide an electronic device that, if the user utterance is unable to be processed by a determined domain, allows the user utterance to be processed by another domain, thereby improving continuity of providing speech services, and to further provide an operation method thereof.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

In an electronic device for processing a user utterance of an electronic device according to various example embodiments of the disclosure and an operation method thereof, a method for recognizing a user voice and analyzing the intent of the user in order to determine a domain corresponding to the user voice may include an operation of receiving a voice signal, which may be an analog signal, through a microphone and an operation of converting a voice part into computer-readable text using, for example, an automatic speech recognition (ASR) model. The converted text may be interpreted using, for example, a natural language understanding (NLU) model, thereby acquiring the intent of the user utterance. The ASR model or the NLU model may include an artificial intelligence model (e.g., including various processing circuitry and/or executable program instructions). The artificial intelligence model may be processed by any processor or artificial intelligence-dedicated processor designed in a hardware structure specialized in processing of the artificial intelligence models. Artificial intelligence models may be acquired through learning. Here, acquiring the artificial intelligence model through learning may refer, for example, to predefined operation rules or artificial intelligence models, which are configured to perform desired features (or purposes), being acquired by an operation in which a basic artificial intelligence model performs learning through a learning algorithm using multiple pieces of learning data. The artificial intelligence model may be configured as a plurality of neural network layers. Each of the plurality of neural network layers may have a plurality of weight values, and may perform a neural network operation through an operation between the result of a previous layer and the plurality of weight values.

Linguistic understanding may refer, for example, to the technology of recognizing and applying/processes human languages/characters, and may include, for example, and without limitation, natural language processing, machine translation, dialog systems, question answering, speed recognition/synthesis, and the like.

An integrated intelligence system will be described in greater detail below before describing various example embodiments.

Figure 1:
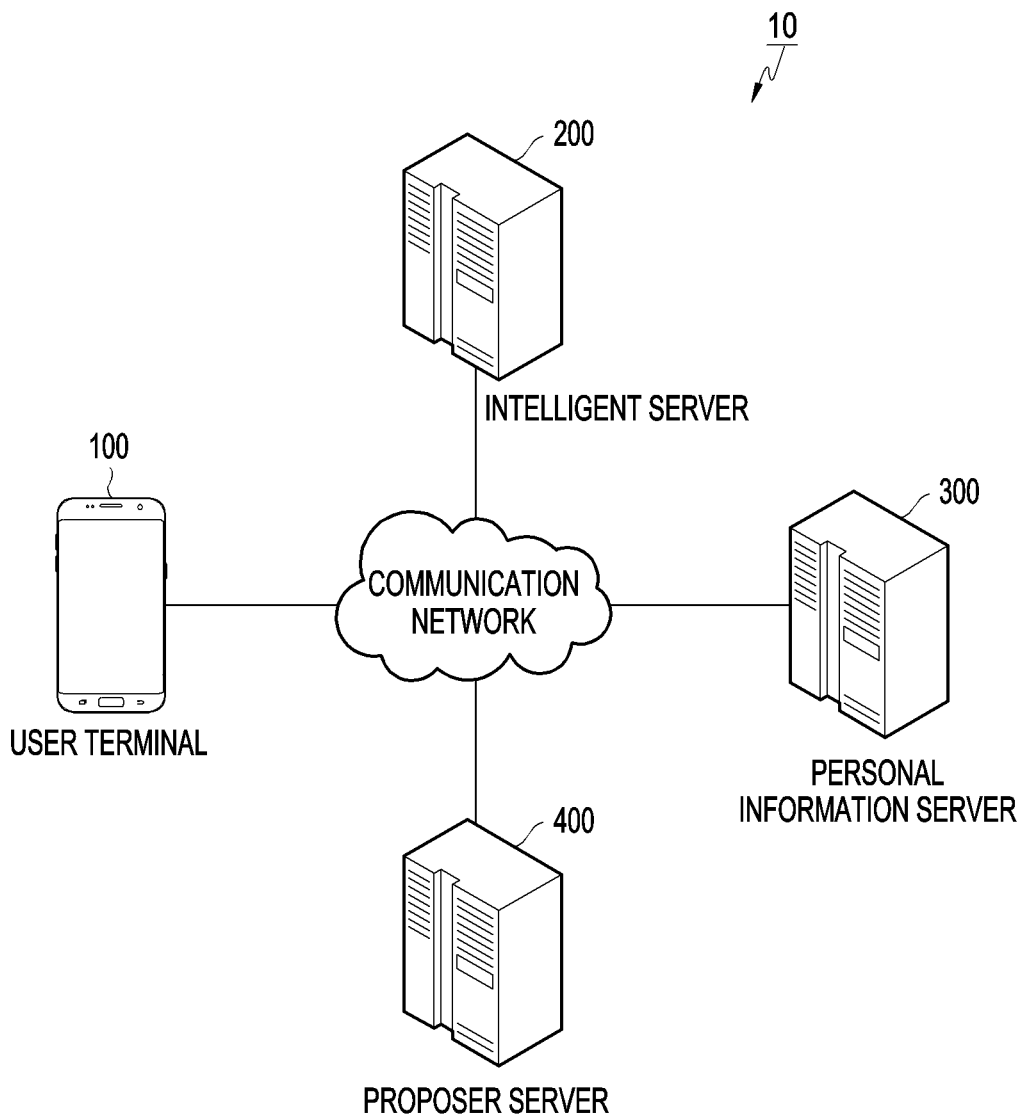
FIG. 1 is a diagram illustrating an example integrated intelligence system according to various embodiments.

FIG. 1 is a diagram illustrating an example integrated intelligence system according to various embodiments.

Referring to FIG. 1, an integrated intelligence system 10 may include a user terminal 100, an intelligent server 200, a personal information server 300, and/or a proposer server 400.

The user terminal 100 may provide services necessary for the user through the apps (or application programs) (e.g., an alarm app, a message app, a gallery app, etc.) stored in the user terminal 100. For example, the user terminal 100 may execute another app for an action through an intelligent app (or a speech recognition app) stored inside the user terminal 100. A user input for executing another app and executing an action may be received through the intelligent app of the user terminal 100. The user input, for example, may be received through physical buttons, a touch pad, voice input, remote input, and the like. According to an embodiment, the user terminal 100 may be various terminal devices (or electronic devices) connectable to the Internet, such as mobile phones, smart phones, personal digital assistants (PDAs), notebook computers, and the like.

According to an embodiment, the user terminal 100 may receive an utterance, e.g., a user utterance, as a user input. The user terminal 100 may receive a user utterance, and may generate a command for executing an app on the basis of the user utterance. Accordingly, the user terminal 100 may execute the app using the command.

The intelligent server 200 may receive a user voice input from the user terminal 100 through a communication network, and may convert the same to text data. In an embodiment, the intelligent server 200 may generate (or select) a path rule on the basis of the text data. The path rule may include information on the action (or operation) for executing functions of apps or information on parameters necessary for execution of the action. In addition, the path rule may include the order of actions of the apps. The user terminal 100 may receive the path rule, may select an app according to the path rule, and may execute an action included in the path rule using the selected app.

The term "path rule" in this disclosure may generally refer to the sequence of states in order for the electronic device to perform the task requested by the user, but is not limited thereto. In other words, the path rule may include information on the sequence of states. The task may be, for example, any action capable of being provided by the intelligent app. The task may include creating a schedule, transmitting photos to a desired receiver, or providing weather information. The user terminal 100 may perform the task by sequentially having one or more states (e.g., the action state of the user terminal 100).

According to an embodiment, the path rule may be provided or generated by the artificial intelligence (AI) system. The artificial intelligence system may be a rule-based system or a neural network-based system (e.g., a feedforward neural network (FNN) or a recurrent neural network (RNN)). The artificial intelligence system may be a combination of the above configurations, or may be another artificial intelligence system. According to an embodiment, the path rule may be selected from a group of predefined path rules, or may be generated in real time in response to a user request. For example, the artificial intelligence system may select at least one path rule from among a plurality of predefined path rules, or may generate the path rule dynamically (or in real time). In addition, the user terminal 100 may use a hybrid system in order to provide the path rule.

According to an embodiment, the user terminal 100 may execute the action, and may display a screen corresponding to the state of the user terminal 100 having executed the action on the display. As another example, the user terminal 100 may execute the action, and may not display the result of execution of the action on the display. The user terminal 100, for example, may execute a plurality of actions, and may display only some results of the plurality of actions on the display. The user terminal 100, for example, may display only the result of executing of the last action on the display. As another example, the user terminal 100 may receive a user input, and may display the result of executing of the action on the display.

The personal information server 300 may include database storing user information. For example, the personal information server 300 may receive user information (e.g., the context information, app execution, etc.) from the user terminal 100, and may store the same in the database. The intelligent server 200 may receive the user information from the personal information server 300 through a communication network, and may use the same for generating a path rule with respect to the user input. According to an embodiment, the user terminal 100 may receive the user information from the personal information server 300 through a communication network, and may use the same as information for managing the database.

The proposer server 400 may include a database storing information on the introduction of functions or applications in the terminal, or information on the functions to be provided. For example, the proposer server 400 may receive user information of the user terminal 100 from the personal information server 300, and may include a database for functions capable of being used by the user. The user terminal 100 may receive, from the proposer server 400, information on the function to be provided through the communication network, and may provide information thereon to the user.

Figure 2:
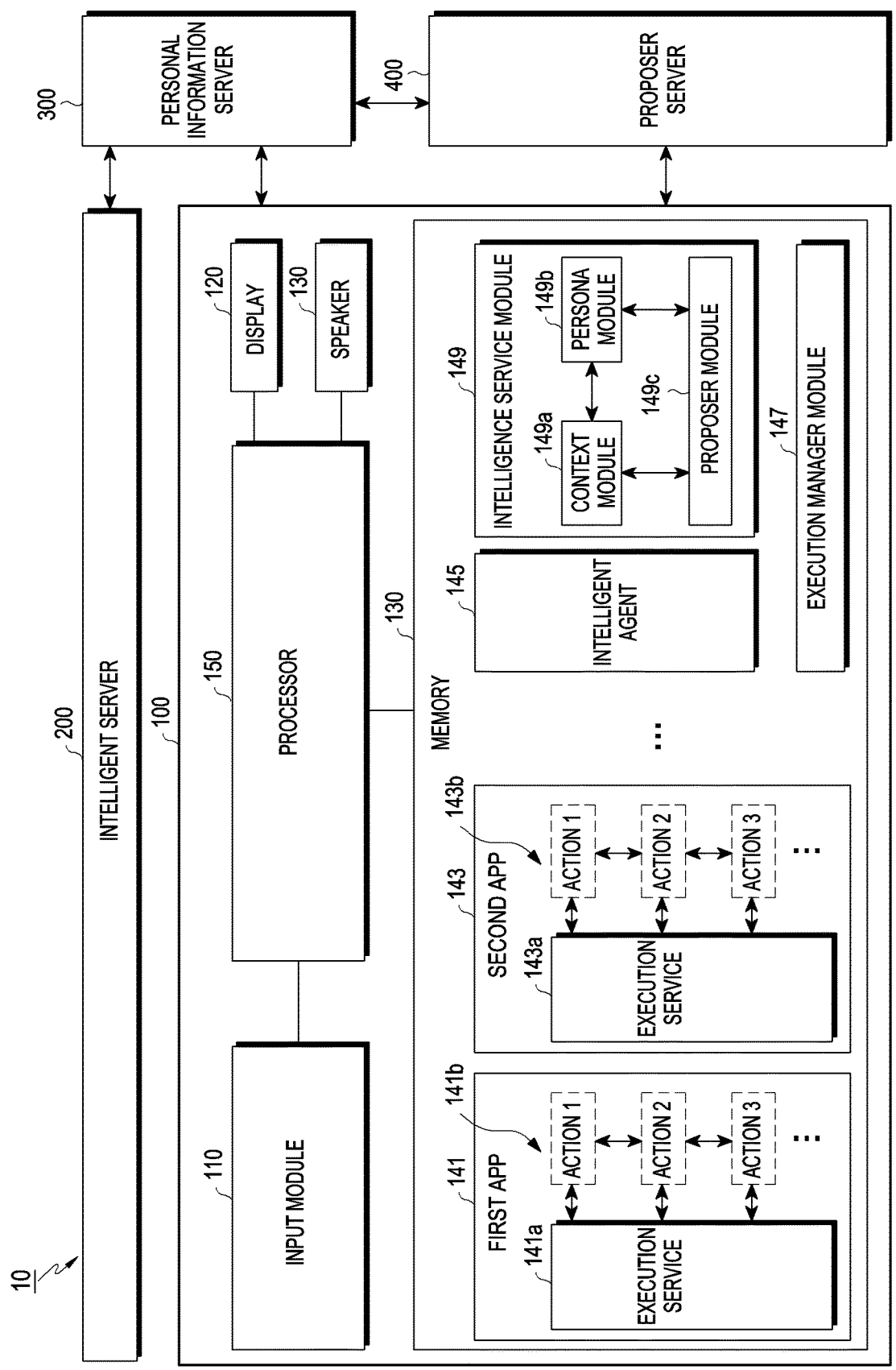
FIG. 2 is a block diagram illustrating an example user terminal of an integrated intelligence system according to various embodiments.

FIG. 2 is a block diagram illustrating an example user terminal of an integrated intelligence system according to various embodiments.

Referring to FIG. 2, the user terminal 100 may include an input module (e.g., including input circuitry) 110, a display 120, a speaker 130, a memory 140, and/or a processor (e.g., including processing circuitry) 150. The user terminal 100 may further include a housing, and the elements of the user terminal 100 may be mounted inside the housing, or may be positioned on the housing. The user terminal 100 may further include a communication circuit positioned inside the housing. The user terminal 100 may transmit/receive data (or information) to/from an external server (e.g., the intelligent server 200) through the communication circuit.

According to an embodiment, the input module 110 may include various input circuitry and receive a user input from the user. For example, the input module 110 may receive a user input from an external device (e.g., a keyboard or a headset) connected thereto. As another example, the input module 110 may include a touch screen (e.g., a touch screen display) that is combined with the display 120. As another example, the input module 110 may include a hardware key (or a physical key) positioned on the user terminal 100 (or in the housing of the user terminal 100).

According to an embodiment, the input module 110 may include a microphone for receiving a user utterance as a voice signal. For example, the input module 110 may include a speech input system, and may receive a user utterance as a voice signal through the speech input system. The microphone, for example, may be exposed or accessible through a part of the housing (e.g., a first part).

According to an embodiment, the display 120 may display a screen of images, videos, and/or execution of applications. For example, the display 120 may display a graphic user interface (GUI) of the app. According to an embodiment, the display 120 may be exposed or visible through a part of the housing (e.g., a second part).

According to an embodiment, the speaker 130 may output a voice signal. For example, the speaker 130 may output a voice signal generated inside the user terminal 100 to the outside. According to an embodiment, the speaker 130 may be exposed through a part of the housing (e.g., a third part).

According to an embodiment, the memory 140 may store a plurality of apps (or application programs) 141 and 143. The plurality of apps 141 and 143, for example, may be programs for performing functions corresponding to the user inputs. According to an embodiment, the memory 140 may store an intelligent agent (e.g., including executable program instructions) 145, an execution manager module (e.g., including executable program instructions) 147, and/or an intelligence service module (e.g., including executable program instructions) 149. The intelligent agent 145, the execution manager module 147, and the intelligence service module 149, for example, may be frameworks (or application frameworks) for processing the received user input (e.g., the user utterance).

According to an embodiment, the memory 140 may include a database for storing information required to recognize the user input. For example, the memory 140 may include a log database capable of storing log information. As another example, the memory 140 may include a persona database capable of storing user information.

According to an embodiment, the memory 140 may store a plurality of apps 141 and 143, and the plurality of apps 141 and 143 may be loaded to be performed. For example, the plurality of apps 141 and 143 stored in the memory 140 may be loaded to the execution manager module 147, and may be executed. The plurality of apps 141 and 143 may include the execution service modules 141*a* and 143*a* to perform functions. In an embodiment, the plurality of apps 141 and 143 may execute a plurality of actions (e.g., the sequence of states) 141*b* and 143*b* through the execution service modules 141*a* and 143*a* in order to perform functions. In other words, the execution service modules 141*a* and 143*a* may be activated by the execution manager module 147, and may execute a plurality of actions 141*b* and 143*b*.

According to an embodiment, when the actions 141*b* and 143*b* of the apps 141 and 143 are executed, an execution state screen according to the execution of the actions 141*b* and 143*b* may be displayed on the display 120. The execution state screen may be, for example, a screen in the state in which the actions 141*b* and 143*b* are completed. The execution state screen may be, for example, a screen in the state of partial landing of the actions 141*b* and 143*b* (e.g., the state in which parameters required for the actions 141*b* and 143*b* are not inputted).

According to an embodiment, the execution service modules 141*a* and 143*a* may execute the actions 141*b* and 143*b* according to the path rule. For example, the execution service modules 141*a* and 143*a* may be activated by the execution manager module 147, may receive an execution request from the execution manager module 147 according to the path rule, and may perform the actions 141*b* and 143*b* according to the execution request, thereby executing the functions of the apps 141 and 143. When the execution of the actions 141*b* and 143*b* is completed, the execution service modules 141*a* and 143*a* may transmit complete information to the execution manager module 147.

According to an embodiment, if a plurality of actions 141*b* and 143*b* is executed in the apps 141 and 143, a plurality of actions 141*b* and 143*b* may be sequentially executed. When the execution of one action (e.g., action 1 of a first app 141 or action 1 of a second app 143) is completed, the execution service modules 141*a* and 143*a* may open a subsequent action (e.g., action 2 of the first app 141 or action 2 of the second app 143), and may transmit complete information to the execution manager module 147. Here, opening an arbitrary action may be understood as switching the arbitrary action to an executable state or as preparing to execute the arbitrary action. In other words, if any action is not opened, the action is unable to be executed. When the complete information is received, the execution manager module 147 may transmit an execution request for a subsequent action (e.g., action 2 of the first app 141 or action 2 of the second app 143) to the execution service module. According to an embodiment, if a plurality of apps 141 and 143 is executed, the plurality of apps 141 and 143 may be sequentially executed. For example, when the execution of the last action of the first app 141 (e.g., action 3 of the first app 141) is completed and thus complete information is received, the execution manager module 147 may transmit the execution request of the first action of the second app 143 (e.g., action 1 of the second app 143) to the execution service 143*a*.

According to an embodiment, if a plurality of actions 141*b* and 143*b* is executed in the app 141 and 143, result screens according to the execution of the respective actions 141b and 143b may be displayed on the display 120. According to an embodiment, only some of the result screens according to the execution of the plurality of actions 141b and 143b may be displayed on the display 120.

According to an embodiment, the memory 140 may store an intelligent app (e.g., a speech recognition app) interworking with the intelligent agent 145. The app interworking with the intelligent agent 145 may receive and process a user utterance as a voice signal. According to an embodiment, the app interworking with the intelligent agent 145 may be operated by a specific input (e.g., an input through a hardware key, an input through a touch screen, and a specific voice input) received through the input module 110.

According to an embodiment, the intelligent agent 145, the execution manager module 147, or the intelligence service module 149 stored in the memory 140 may be executed by the processor 150. The functions of the intelligent agent 145, the execution manager module 147, or the intelligence service module 149 may be implemented by the processor 150. The functions of the intelligent agent 145, the execution manager module 147, and the intelligence service module 149 will be described as the operation of the processor 150. According to an embodiment, the intelligent agent 145, the execution manager module 147, or the intelligence service module 149 stored in the memory 140 may be implemented as hardware as well as software.

According to an embodiment, the processor 150 may control the overall operation of the user terminal 100. For example, the processor 150 may control the input module 110 to receive a user input. The processor 150 may control the display 120 to display images. The processor 150 may control the speaker 130 to output a voice signal. The processor 150 may control the memory 140 to execute programs and to load or store necessary information.

According to an embodiment, the processor 150 may execute the intelligent agent 145, the execution manager module 147, or the intelligence service module 149 stored in the memory 140. Accordingly, the processor 150 may implement the functions of the intelligent agent 145, the execution manager module 147, or the intelligence service module 149.

According to an embodiment, the processor 150 may execute the intelligent agent 145 to generate a command for operating the app on the basis of the voice signal received as a user input. According to an embodiment, the processor 150 may execute the execution manager module 147 to execute apps 141 and 143 stored in the memory 140 according to the generated command According to an embodiment, the processor 150 may execute the intelligence service module 149 to manage user information, and may process the user input using user information.

The processor 150 may include various processing circuitry and execute the intelligent agent 145 to transmit the user input received through the input module 110 to the intelligent server 200, and may process the user input through the intelligent server 200.

According to an embodiment, the processor 150 may execute the intelligent agent 145 to preprocess the user input before transmitting the user input to the intelligent server 200. According to an embodiment, in order to preprocess the user input, the intelligent agent 145 may include an adaptive echo canceller (AEC) module, a noise suppression (NS) module, an end-point detection (EPD) module, or an automatic gain control (AGC) module. The adaptive echo canceller module may remove the echo included in the user input. The noise suppression module may suppress the background noise included in the user input. The end-point detection module may detect the end point of a user voice included in the user input, thereby finding the portion where the user voice exists using the detected end point. The automatic gain control module may recognize the user input, and may adjust the volume of the user input to be suitable for processing the recognized user input. According to an embodiment, although the processor 150 may execute all of the preprocessing configurations for performance, in an embodiment, the processor 150 may execute some of the preprocessing configurations for low-power operation.

According to an embodiment, the intelligent agent 145 may execute a wake-up recognition module stored in the memory 140 in order to recognize a user call. Accordingly, the processor 150 may recognize a wake-up command of the user through the wake-up recognition module, and may execute the intelligent agent 145 in order to receive a user input upon receiving the wake-up command. The wake-up recognition module may be implemented as a low-power processor (e.g., a processor included in the audio codec). According to an embodiment, upon receiving a user input through a hardware key, the processor 150 may execute the intelligent agent 145. When the intelligent agent 145 is executed, an intelligent app (e.g., a speech recognition app) interworking with the intelligent agent 145 may be executed.

According to an embodiment, the intelligent agent 145 may include a speech recognition module for executing a user input. The processor 150 may recognize a user input in order for the app to execute an action through the speech recognition module. For example, the processor 150 may recognize a limited user (voice) input (e.g., an utterances such as "click" or the like for executing a shooting action while a camera app is being executed) that executes the action such as a wake-up command in the apps 141 and 143 through the speech recognition module. The processor 150 may assist the intelligent server 200 to recognize and quickly process the user command capable of being processed in the user terminal 100 through the speech recognition module. According to an embodiment, the speech recognition module of the intelligent agent 145 for executing the user input may be implemented in the app processor.

According to an embodiment, the speech recognition module (including the speech recognition module of the wake-up module) of the intelligent agent 145 may recognize the user input using an algorithm for recognizing a voice. The algorithm used to recognize a voice, for example, may include, without limitation, at least one of a hidden Markov model (HMM) algorithm, an artificial neural network (ANN) algorithm, a dynamic time warping (DTW) algorithm, or the like.

According to an embodiment, the processor 150 may execute the intelligent agent 145 to convert a user voice input into text data. For example, the processor 150 may transmit a user voice to the intelligent server 200 through the intelligent agent 145, and may receive text data corresponding to the user voice from the intelligent server 200. Accordingly, the processor 150 may display the converted text data on the display 120.

According to an embodiment, the processor 150 may receive a path rule from the intelligent server 200 by executing the intelligent agent 145. According to an embodiment, the processor 150 may transmit the path rule to the execution manager module 147 through the intelligent agent 145.

According to an embodiment, the processor 150 may execute the intelligent agent 145 to transmit, to the intelligence service module 149, an execution result log according to the path rule received from the intelligent server 200, and the transmitted execution result log may be accumulated and managed in preference information of the user in a persona module 149b.

According to an embodiment, the processor 150 may execute the execution manager module 147 to receive a path rule from the intelligent agent 145 and execute the apps 141 and 143, thereby allowing the apps 141 and 143 to execute actions 141b and 143b included in the path rule. For example, the processor 150 may transmit command information (e.g., path rule information) for executing the actions 141b and 143b by the apps 141 and 143 through the execution manager module 147, and may receive complete information of the actions 141b and 143b from the apps 141 and 143.

According to an embodiment, the processor 150 may execute the execution manager module 147 to transmit command information (e.g., path rule information) for executing the actions 141b and 143b of the apps 141 and 143 between the intelligent agent 145 and the apps 141 and 143. The processor 150 may bind the apps 141 and 143 to be executed according to the path rule through the execution manager module 147, and may transmit, to the apps 141 and 143, command information (e.g., path rule information) of the actions 141b and 143b included in the path rule. For example, the processor 150 may sequentially transmit the actions 141b and 143b included in the path rule to the apps 141 and 143 through the execution manager module 147, thereby sequentially executing the actions 141b and 143b of the apps 141 and 143 according to the path rule.

According to an embodiment, the processor 150 may manage the execution states of the actions 141b and 143b of the apps 141 and 143 by executing the execution manager module 147. For example, the processor 150 may receive information on the execution states of the actions 141b and 143b from the apps 141 and 143 through the execution manager module 147. If the execution states of the actions 141b and 143b are, for example, partial landing states (e.g., the case where parameters required for the actions 141b and 143b are not input), the processor 150 may transmit information on the partial landing state to the intelligent agent 145 through the execution manager module 147. The processor 150 may request the user to input necessary information (e.g., parameter information) using the received information through the intelligent agent 145. As another example, if the execution states of the actions 141b and 143b are running states, the processor 150 may receive an utterance from the user through the intelligent agent 145. The processor 150 may transmit information on the running apps 141 and 143 and the execution states of the apps 141 and 143 to the intelligent agent 145 through the execution manager module 147. The processor 150 may transmit the user utterance to the intelligent server 200 through the intelligent agent 145. The processor 150 may receive parameter information of the user utterance from the intelligent server 200 through the intelligent agent 145. The processor 150 may transmit the received parameter information to the execution manager module 147 through the intelligent agent 145. The execution manager module 147 may convert the parameters of actions 141b and 143b into new parameters using the received parameter information.

According to an embodiment, the processor 150 may execute the execution manager module 147 to transmit parameter information included in the path rule to the apps 141 and 143. If a plurality of apps 141 and 143 is sequentially executed according to the path rule, the execution manager module 147 may transfer parameter information included in the path rule from one app to another app.

According to an embodiment, the processor 150 may execute the execution manager module 147 to receive a plurality of path rules. The processor 150 may select a plurality of path rules on the basis of the user utterance through the execution manager module 147. For example, although the user utterance specifies some apps 141 to execute some actions 141a through the execution manager module 147, if the user utterance does not specify other apps 143 to execute the remaining actions 143b, the processor 150 may receive a plurality of path rules, which are different from each other, in which the same app 141 (e.g., a gallery app) for executing some actions 141a is executed and in which the apps 143 (e.g., a message application and a telegram app), which are different from each other, for executing the remaining actions 143b are executed. The processor 150 may execute the identical actions 141b and 143b (e.g., consecutive and identical actions 141b and 143b) of a plurality of path rules through the execution manager module 147. In the case of having executed the identical actions, the processor 150 may display, on the display 120, a state screen for selecting the different apps 141 and 143 included in the respective path rules through the execution manager module 147.

According to an embodiment, the intelligence service module 149 may include a context module 149a, a persona module 149b, and/or a proposer module 149c.

The processor 150 may collect the current states of the apps 141 and 143 from the apps 141 and 143 by executing the context module 149a. For example, the processor 150 may execute the context module 149a to receive context information that indicates the current states of the apps 141 and 143, and may collect the current states of the apps 141 and 143 through received context information.

The processor 150 may manage personal information of the user of the user terminal 100 by executing the persona module 149b. For example, the processor 150 may execute the persona module 149b to collect usage information and execution results of the user terminal 100, and may manage personal information of the user using the collected usage information and execution results of the user terminal 100.

The processor 150 may execute the proposer module 149c to predict the user intent, and may recommend a command to the user on the basis of the user intent. For example, the processor 150 may execute the proposer module 149c, thereby recommending a command to the user depending on the current state of the user (e.g., time, a location, situation, and an app).

Figure 3:
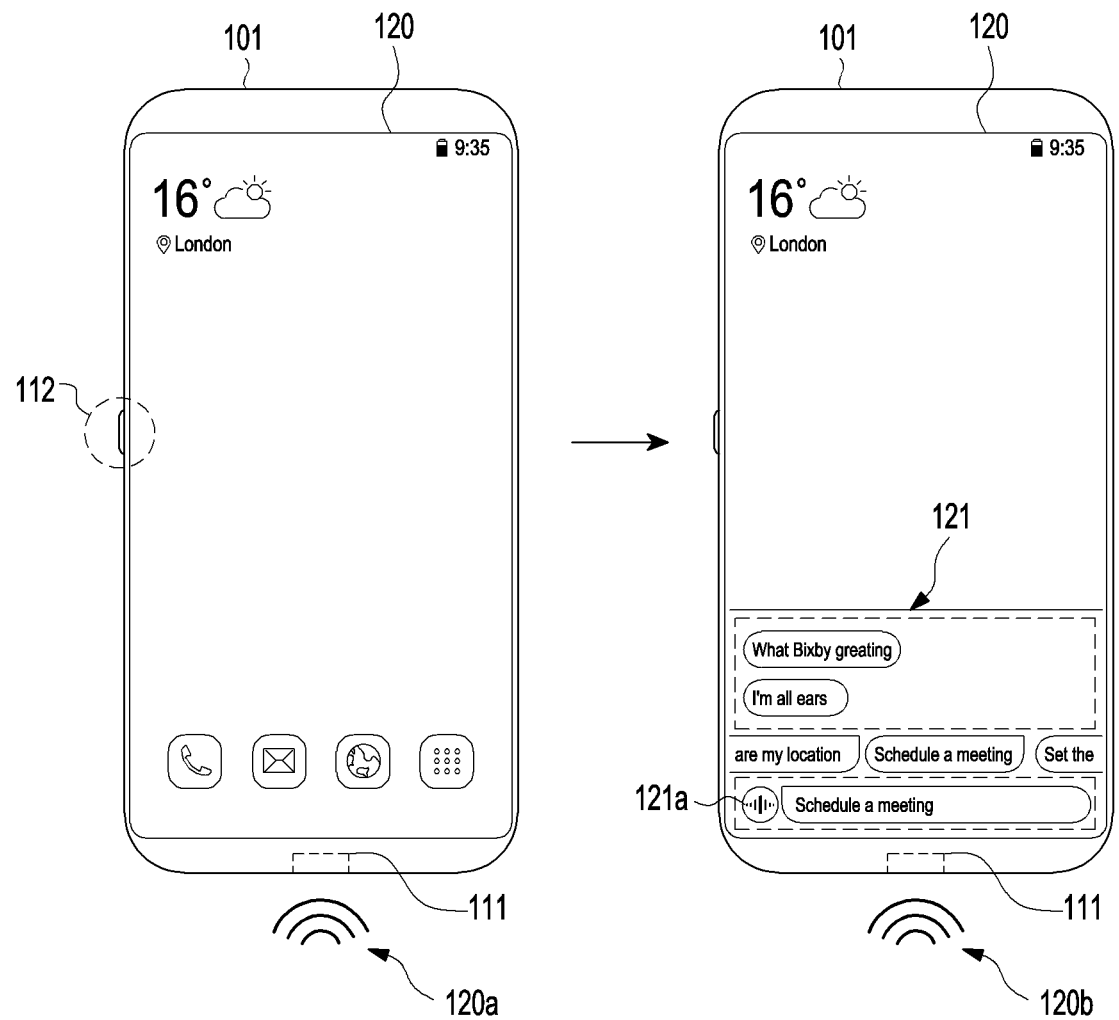
FIG. 3 is a diagram illustrating execution of an intelligent app of a user terminal according to various embodiments.

FIG. 3 is a diagram illustrating example execution of an intelligent app of a user terminal according to various embodiments.

FIG. 3 shows that the user terminal 100 receives a user input and executes an intelligent app (e.g., a speech recognition app) interworking with the intelligent agent 145.

According to an embodiment, the user terminal 100 may execute an intelligent app to recognize a voice through, for example, a hardware key 112. For example, upon receiving the user input through the hardware key 112, the user terminal 100 may display a user interface (UI) 121 of the intelligent app on a display 120. For example, the user may touch a speech recognition button 121a in the UI 121 of the intelligent app in order to input a voice 120b while the UI 121 of the intelligent app is displayed on the display 120. As another example, the user may input a voice 120b by continuously pressing the hardware key 112 in order to input the voice 120b.

According to an embodiment, the user terminal 100 may execute an intelligent app for recognizing a voice through a microphone 111. For example, if a specified voice (e.g., "wake up!") is input through the microphone 111, the user terminal 100 may display a UI 121 of the intelligent app on the display 120.

Figure 4:
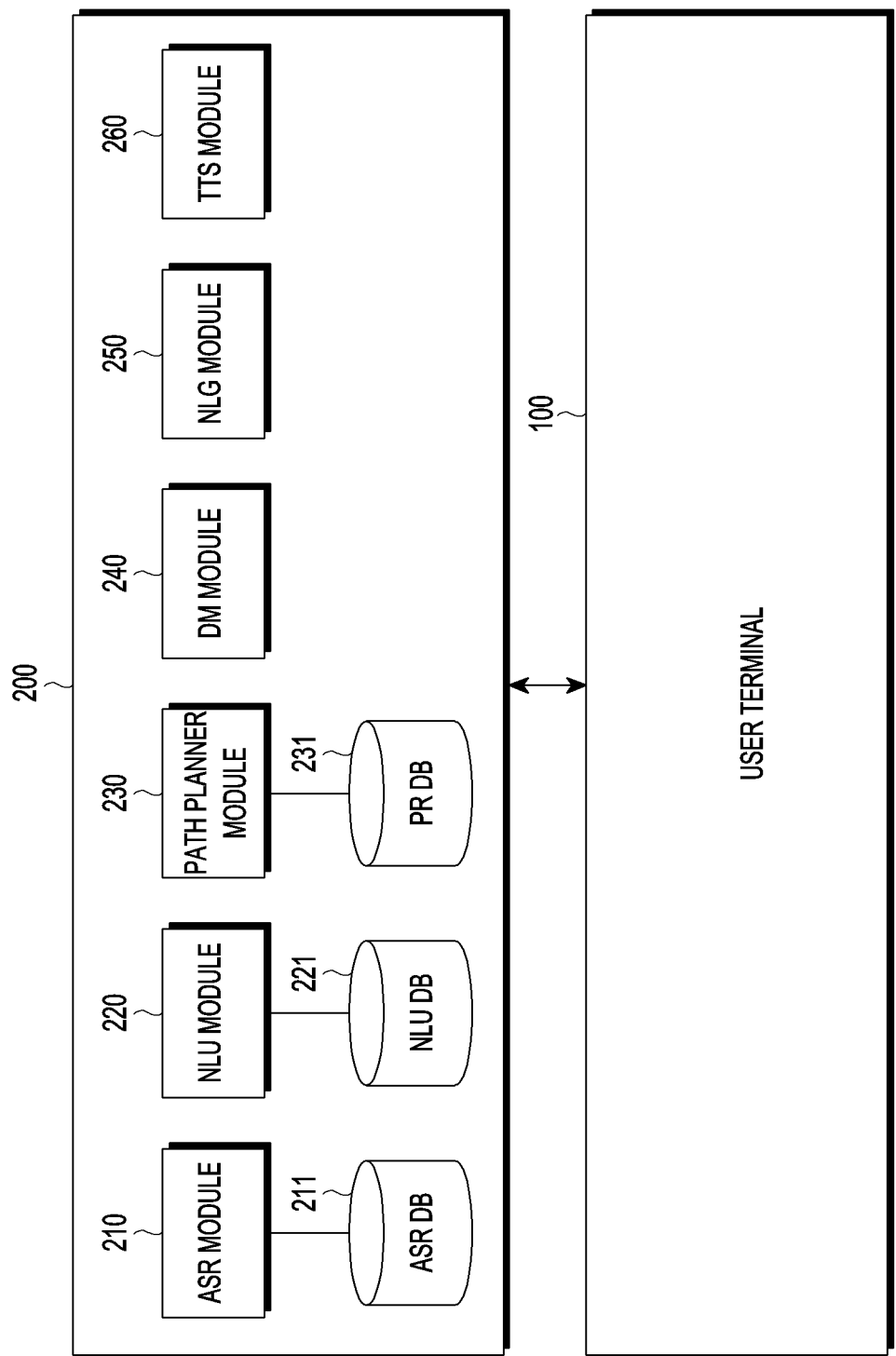
FIG. 4 is a block diagram illustrating an intelligent server of an integrated intelligence system according to various embodiments.

FIG. 4 is a block diagram illustrating an example configuration of an intelligent server of an integrated intelligence system according to various embodiments.

Referring to FIG. 4, the intelligent server 200 may include an automatic speech recognition (ASR) module (e.g., including various processing circuitry and/or executable program instructions) 210, a natural language understanding (NLU) module (e.g., including various processing circuitry and/or executable program instructions) 220, a path planner module (e.g., including various processing circuitry and/or executable program instructions) 230, a dialog manager (DM) module (e.g., including various processing circuitry and/or executable program instructions) 240, a natural language generator (NLG) module (e.g., including various processing circuitry and/or executable program instructions) 250, and/or a text-to-speech (TTS) module (e.g., including various processing circuitry and/or executable program instructions) 260. According to an embodiment, the intelligent server 200 may include a communication circuit, a memory, and a processor (not shown). The processor may execute instructions stored in the memory so as to drive the automatic speech recognition module 210, the natural language understanding module 220, the path planner module 230, the dialog manager module 240, the natural language generator module 250 and the text-to-speech module 260. The intelligent server 200 may transmit and receive data (or information) to and from an external electronic device (e.g., the user terminal 100) through the communication circuit.

The natural language understanding module 220 or the path planner module 230 of the intelligent server 200 may generate a path rule.

According to an embodiment, the automatic speech recognition (ASR) module 210 may convert a user input received from the user terminal 100 into text data.

According to an embodiment, the automatic speech recognition module 210 may convert a user input received from the user terminal 100 into text data. For example, the automatic speech recognition module 210 may include an utterance recognition module. The utterance recognition module may include an acoustic model and a language model. For example, the acoustic model may include information related to vocalization, and the language model may include unit phoneme information and information on the combination thereof. The utterance recognition module may convert user utterances into text data using the information related to vocalization and the information on unit phoneme information. The information on the acoustic model and the language model may be stored, for example, in an automatic speech recognition database (ASR DB) 211.

According to an embodiment, the natural language understanding module 220 may recognize user intent by executing syntactic analysis or semantic analysis. The syntactic analysis may be performed so as to divide a user input into syntactic units (e.g., words, phrases, morphemes, etc.) and recognize syntactic elements of the divided units. The semantic analysis may be performed using semantic matching, rule matching, formula matching, or the like. Accordingly, the natural language understanding module 220 may acquire a domain corresponding to the user input, intent thereof, or parameters (or slots) required to express the intent.

According to an embodiment, the natural language understanding module 220 may determine user intent and parameters using a matching rule that is divided into the domain, the intent, and the parameters (or the slots) required to recognize the intent. For example, the one domain (e.g., alarm) may include a plurality of intents (e.g., alarm configuration, alarm release, etc.), and one intent may include a plurality of parameters (e.g., time, the number of repetitions, alarm sound, etc.). A plurality of rules may include, for example, one or more essential element parameters. The matching rule may be stored in the natural language understanding database (NLU DB) 221.

According to an embodiment, the natural language understanding module 220 may recognize the meaning of a word extracted from the user input using linguistic features (e.g., syntactic elements) such as morphemes, phrases, and the like, and may determine the user intent by matching the recognized meaning of the word to the domain and the intent. For example, the natural language understanding module 220 may determine the user intent by calculating how many words extracted from the user input are included in each domain and intent. According to an embodiment, the natural language understanding module 220 may determine the parameter of the user input using the word that is the basis for recognizing the intent. According to an embodiment, the natural language understanding module 220 may determine the user intent using the natural language understanding database 221 that stores linguistic features for recognizing the intent of the user input. According to an embodiment, the natural language understanding module 220 may determine the user intent using the personal language model (PLM). For example, the natural language understanding module 220 may determine the user intent using personal information (e.g., a contact list and a music list). The personal language model may be stored, for example, in the natural language understanding database 221. According to an embodiment, in addition to the natural language understanding module 220, the automatic speech recognition module 210 may also recognize the user voice in consideration of the personal language model stored in the natural language understanding database 221.

According to an embodiment, the natural language understanding module 220 may generate a path rule on the basis of the intent and parameters of the user input. For example, the natural language understanding module 220 may select an app to be executed on the basis of the intent of the user input, and may determine an action to be executed in the selected app. The natural language understanding module 220 may generate a path rule by determining the parameters corresponding to the determined action. According to an embodiment, the path rule generated by the natural language understanding module 220 may include information on an app to be executed, an action to be executed in the app (e.g., at least one or more states), and parameters necessary to execute the action.

According to an embodiment, the natural language understanding module 220 may generate one path rule or a plurality of path rules on the basis of the intent and parameters of the user input. For example, the natural language understanding module 220 may receive a path rule set corresponding to the user terminal 100 from the path planner module 230, and may map the intent and parameter of the user input to the received path rule set, thereby determining the path rule.

According to an embodiment, the natural language understanding module 220 may determine an app to be executed, an action to be executed in the app, and parameters necessary to execute the action on the basis of the intent and parameter of the user input, thereby generating one path rule or a plurality of path rules. For example, the natural language understanding module 220 may arrange an app to be executed and an action to be executed in the app in the form of an ontology or graph model according to the intent of the user input using information of the user terminal 100, thereby generating the path rule. The generated path rule may be stored in, for example, a path rule database (PR DB) 231 through the path planner module 230. The generated path rule may be added to the path rule set in the database 231.

According to an embodiment, the natural language understanding module 220 may select at least one path rule from among a plurality of generated path rules. For example, the natural language understanding module 220 may select an optimal path rule from among the plurality of path rules. As another example, the natural language understanding module 220 may select a plurality of path rules if only some actions are specified on the basis of the user utterance. The natural language understanding module 220 may determine one path rule from among the plurality of path rules by an additional input from the user.

According to an embodiment, the natural language understanding module 220 may transmit the path rule to the user terminal 100 in response to a request for the user input. For example, the natural language understanding module 220 may transmit one path rule corresponding to the user input to the user terminal 100. As another example, the natural language understanding module 220 may transmit a plurality of path rules corresponding to the user input to the user terminal 100. The plurality of path rules may be generated by the natural language understanding module 220 if, for example, only some actions are specified on the basis of the user utterance.

According to an embodiment, the path planner module 230 may select at least one path rule from among a plurality of path rules.

According to an embodiment, the path planner module 230 may transmit a path rule set including a plurality of path rules to the natural language understanding module 220. A plurality of path rules of the path rule set may be stored in the form of a table in the path rule database 231 connected to the path planner module 230. For example, the path planner module 230 may transmit the path rule set corresponding to information (e.g., OS information or app information) of the user terminal 100 received from the intelligent agent 145 to the natural language understanding module 220. The table stored in the path rule database 231 may be stored, for example, for each domain or for each domain version.

According to an embodiment, the path planner module 230 may select one path rule or a plurality of path rules from the path rule set, and may transmit the same to the natural language understanding module 220. For example, the path planner module 230 may match the user intent and the parameter to the path rule set corresponding to the user terminal 100, thereby selecting one path rule or a plurality of path rules, and may transmit the same to the natural language understanding module 220.

According to an embodiment, the path planner module 230 may generate one path rule or a plurality of path rules using the user intent and the parameter. For example, the path planner module 230 may determine the app to be executed and the actions to be executed in the app on the basis of the user intent and the parameter, thereby generating one path rule or a plurality of path rules. According to an embodiment, the path planner module 230 may store the generated path rule in the path rule database 231.

According to an embodiment, the path planner module 230 may store the path rule generated by the natural language understanding module 220 in the path rule database 231. The generated path rule may be added to the path rule set stored in the path rule database 231.

According to an embodiment, the table stored in the path rule database 231 may include a plurality of path rules or a plurality of path rule sets. The plurality of path rules or the plurality of path rule sets may reflect the kind, the version, the type, or the characteristics of the device for executing each path rule.

According to an embodiment, the dialog manager module 240 may determine whether the user intent recognized by the natural language understanding module 220 is clear. For example, the dialog manager module 240 may determine whether the user intent is clear on the basis of whether information of the parameters is sufficient. The dialog manager module 240 may determine whether the parameters recognized in the natural language understanding module 220 are sufficient to execute the task. According to an embodiment, if the user intent is not clear, the dialog manager module 240 may perform feedback requesting necessary information from the user. For example, the dialog manager module 240 may perform feedback requesting information on parameters for recognizing the user intent.

According to an embodiment, the dialog manager module 240 may include a content provider module. If the action is able to be executed on the basis of the intent and the parameter recognized in the natural language understanding module 220, the content provider module may generate a result of executing the task corresponding to the user input. According to an embodiment, the dialog manager module 240 may transmit the result generated in the content provider module to the user terminal 100 in response to the user input.

According to an embodiment, the natural language generator (NLG) module 250 may convert specified information into text. The information converted into the text may be in the form of a natural language utterance. The specified information may be, for example, information on the additional input, information indicating completion of the action corresponding to the user input, or information for guiding an additional input of the user (e.g., feedback information to the user input). The information converted into the text may be transmitted to the user terminal 100 to then be displayed on the display 120, or may be transmitted to the text-to-speech module 260 to then be converted into a voice form.

According to an embodiment, the text-to-speech module 260 may convert information in the form of text into information in the form of a voice. The text-to-speech module 260 may receive information in a text form from the natural language generator module 250, may convert information in a text form into information in a voice form, and may transmit the same to the user terminal 100. The user terminal 100 may output information in a voice form to the speaker 130.

According to an embodiment, the natural language understanding module 220, the path planner module 230, and the dialog manager module 240 may be implemented as one module. For example, the natural language understanding module 220, the path planner module 230, and the dialog manager module 240 may be implemented as one module, may determine the user intent and the parameter, and may generate a response (e.g., a path rule) corresponding to the determined user intent and parameter. Accordingly, the generated response may be transmitted to the user terminal 100.

Figure 5:
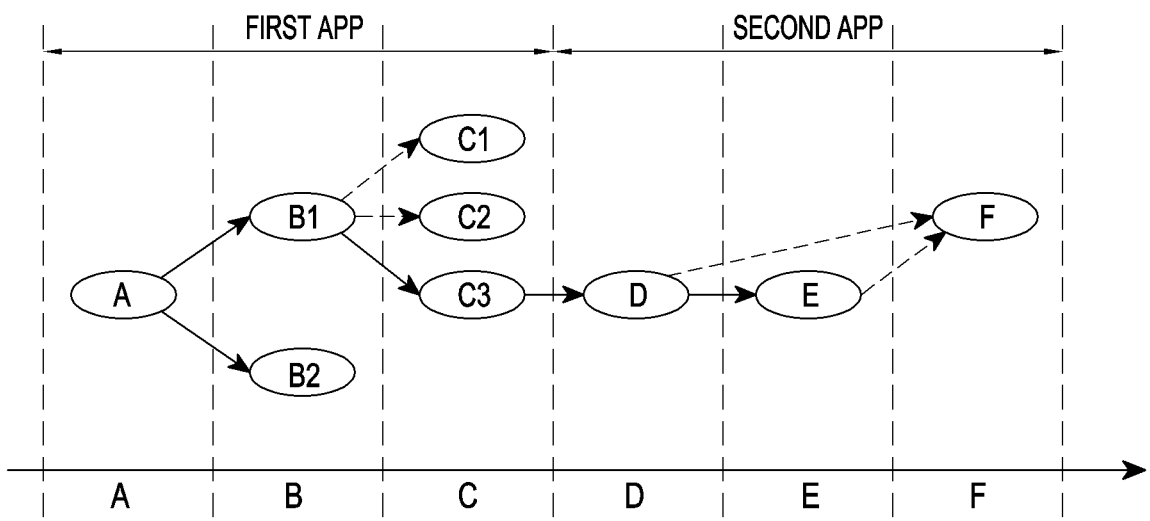
FIG. 5 is a diagram illustrating an example method in which a path natural language understanding (NLU) module generates a path rule according to various embodiments.

FIG. 5 is a diagram illustrating an example method in which a path planner module generates a path rule according to various embodiments.

Referring to FIG. 5, according to an embodiment, the natural language understanding module 220 may classify the function of an app into any one action (e.g., state A to state F), and may store the same in the path rule database 231. For example, the natural language understanding module 220 may store a path rule set including a plurality of path rules (A-B1-C1, A-B1-C2, A-B1-C3-D-F, A-B1-C3-D-E-F and A-B2) classified as any one action (e.g., state) in the path rule database 231.

According to an embodiment, the path rule database 231 of the path planner module 230 may store a path rule set for executing a function of the app. The path rule set may include a plurality of path rules including a plurality of actions (e.g., the sequence of states). The plurality of path rules may sequentially arrange a plurality of actions to be executed according to the parameters input to the respective actions. According to an embodiment, the plurality of path rules may be configured in the form of an ontology or graph model, and may be stored in the path rule database 231.

According to an embodiment, the natural language understanding module 220 may select an optimal path rule (A-B1-C3-D-F) from among a plurality of path rules (A-B1-C1, A-B1-C2, A-B1-C3-D-F, A-B1-C3-D-E-F and A-B2) corresponding to the intent and parameter of the user input.

According to an embodiment, the natural language understanding module 220 may transmit a plurality of rules to the user terminal 100 if there is no path rule that perfectly matches the user input. For example, the natural language understanding module 220 may select a path rule (e.g., A-B1) that partially corresponds to the user input. The natural language understanding module 220 may select one or more path rules (e.g., A-B1-C1, A-B1-C2, A-B1-C3-D-F, A-B1-C3-D-E-F and A-B2) that includes the path rule (e.g., A-B1) partially corresponding to the user input, and may transmit the same to the user terminal 100.

According to an embodiment, the natural language understanding module 220 may select one from among a plurality of path rules on the basis of the additional input of the user terminal 100, and may transmit the one selected path rule to the user terminal 100. For example, the natural language understanding module 220 may select one path rule (e.g., A-B1-C3-D-F) from among the plurality of path rules (e.g., A-B1-C1, A-B1-C2, A-B1-C3-D-F, A-B1-C3-D-E-F and A-B2) according to a user input (e.g., an input for selecting C3) further input from the user terminal 100, and may transmit the same to the user terminal 100.

According to an embodiment, the natural language understanding module 220 may determine the user intent and the parameter corresponding to the user input (e.g., the input for selecting C3) further input to the user terminal 100 through the natural language understanding module 220, and may transmit the determined user intent or parameter to the user terminal 100. The user terminal 100 may select one path rule (e.g., A-B1-C3-D-F) from among the plurality of path rules (e.g., A-B1-C1, A-B1-C2, A-B1-C3-D-F, A-B1-C3-D-E-F and A-B2) on the basis of the transmitted intent or the parameter.

Accordingly, the user terminal 100 may complete the actions of the apps 141 and 143 according to the one selected path rule.

According to an embodiment, if a user input with insufficient information is received by the intelligent server 200, the natural language understanding module 220 may generate a path rule that partially corresponds to the received user input. For example, the natural language understanding module 220 may transmit the partially corresponding path rule to the intelligent agent 145. The processor 150 may execute the intelligent agent 145 to receive the path rule, and may transmit the partially corresponding path rule to the execution manager module 147. The processor 150 may execute the first app 141 according to the path rule through the execution manager module 147. The processor 150 may transmit information on the insufficient parameter to the intelligent agent 145 while executing the first app 141 through the execution manager module 147. The processor 150 may request an additional input from the user using information on the insufficient parameter through the intelligent agent 145. When the additional input is received from the user through the intelligent agent 145, the processor 150 may transmit the user input to the intelligent server 200, thereby processing the same. The natural language understanding module 220 may generate a supplemented path rule on the basis of the intent and parameter information of the further input user input, and may transmit the same to the intelligent agent 145. The processor 150 may transmit the path rule to the execution manager module 147 through the intelligent agent 145, thereby executing the second app 143.

According to an embodiment, if a user input excluding some information is received by the intelligent server 200, the natural language understanding module 220 may transmit a user information request to the personal information server 300. The personal information server 300 may transmit user information by a user input stored in the persona database to the natural language understanding module 220. The natural language understanding module 220 may select a path rule corresponding to the user input excluding some actions using the user information. Accordingly, even if a user input excluding some information is received by the intelligent server 200, the natural language understanding module 220 may determine the path rule corresponding to the user input by requesting an additional input for the missing information or using the user information.

Table 1 below may show examples of the path rule related to the task requested by the user according to an embodiment.

TABLE 1

| Path rule ID | State | parameter |
| --- | --- | --- |
| Gallery_101 | pictureView(25) | NULL |
|  | searchView(26) | NULL |
|  | searchViewResult(27) | Location, time |
|  | SearchEmptySelectedView(28) | NULL |
|  | SearchSelectedView(29) | ContentType, selectall |
|  | CrossShare(30) | anaphora |

Referring to Table 1, the path rule generated or selected by the intelligent server (the intelligent server 200 in FIG. 1) according to a user utterance (e.g., "Share photos") may include at least one state 25, 26, 27, 28, 29 or 30. For example, at least one state (e.g., any one action state of the terminal) may correspond to at least one of execution of a photo application (PicturesView) 25, execution of a photo search function (SearchView) 26, display of a search result display screen (SearchViewResult) 27, display of a search result display screen where photos are not selected (SearchEmptySelectedView) 28, display of a search result display screen where at least one photo is selected (SearchSelectedView) 29, or display of a shared application selection screen (CrossShare) 30. In an embodiment, parameter information of the path rule may correspond to at least one state. For example, at least one photo may be included in the state of displaying a search result display screen where at least one photo is selected 29.

As a result of execution of a path rule including the sequence of the states 25, 26, 27, 28, and 29, the task requested by the user (e.g., "Share photos!") may be executed.

Hereinafter, an intelligent system according to various example embodiments will be described.

According to various example embodiments, the intelligent system may be an example of the integrated intelligence system described above. Accordingly, the various embodiments of the integrated intelligence system described above may be applied to various embodiments of the intelligent system described below. For example, the various modules (e.g., the natural language understanding modules and the like) included in the intelligent server of the integrated intelligence system described above may be included in various embodiments of the intelligent system described below.

According to various embodiments, the intelligent system may provide various services corresponding to user utterances acquired from the user on the basis of various domains. For example, the intelligent system may acquire a user utterance, may enable acquired the user utterance to be processed by a specific domain, and may display information returned from the specific domain on a display of a device to be provided with the service. Here, the domain has the same name as the domain in the natural language understanding module 220 described above, but has different configuration.

According to various embodiments, the domain may indicate the unit for providing information (e.g., a deeplink, a UI, and/or a UX) corresponding to a user utterance in the intelligent system. The domain may correspond to, for example, a produced application, and may provide information (e.g., a deeplink) related to the application corresponding to the user utterance. For example, the minimum unit of program or application for processing the user utterance and then providing information capable of access to at least one function of the application or at least one service may be defined as a domain. Depending on implementation, the domain may also be referred to as a "capsule". The capsule will be described in greater detail below with reference to FIG. 7. As another example, as will be described later, there may be an external server interworking with the intelligent system, and the domain may be stored in the external server. The external server may perform the same or similar operation as the domain. In this case, the intelligent server may transmit the received user utterance to the external server, and the intelligent server may receive corresponding information processed by the domain in the external server, and may forward the same to the electronic device.

According to various embodiments, domains may be classified by categories in the intelligent system. This will be described in greater detail below with reference to FIG. 8.

Hereinafter, an example of the configuration of the intelligent system according to various example embodiments will be described.

Figure 6:
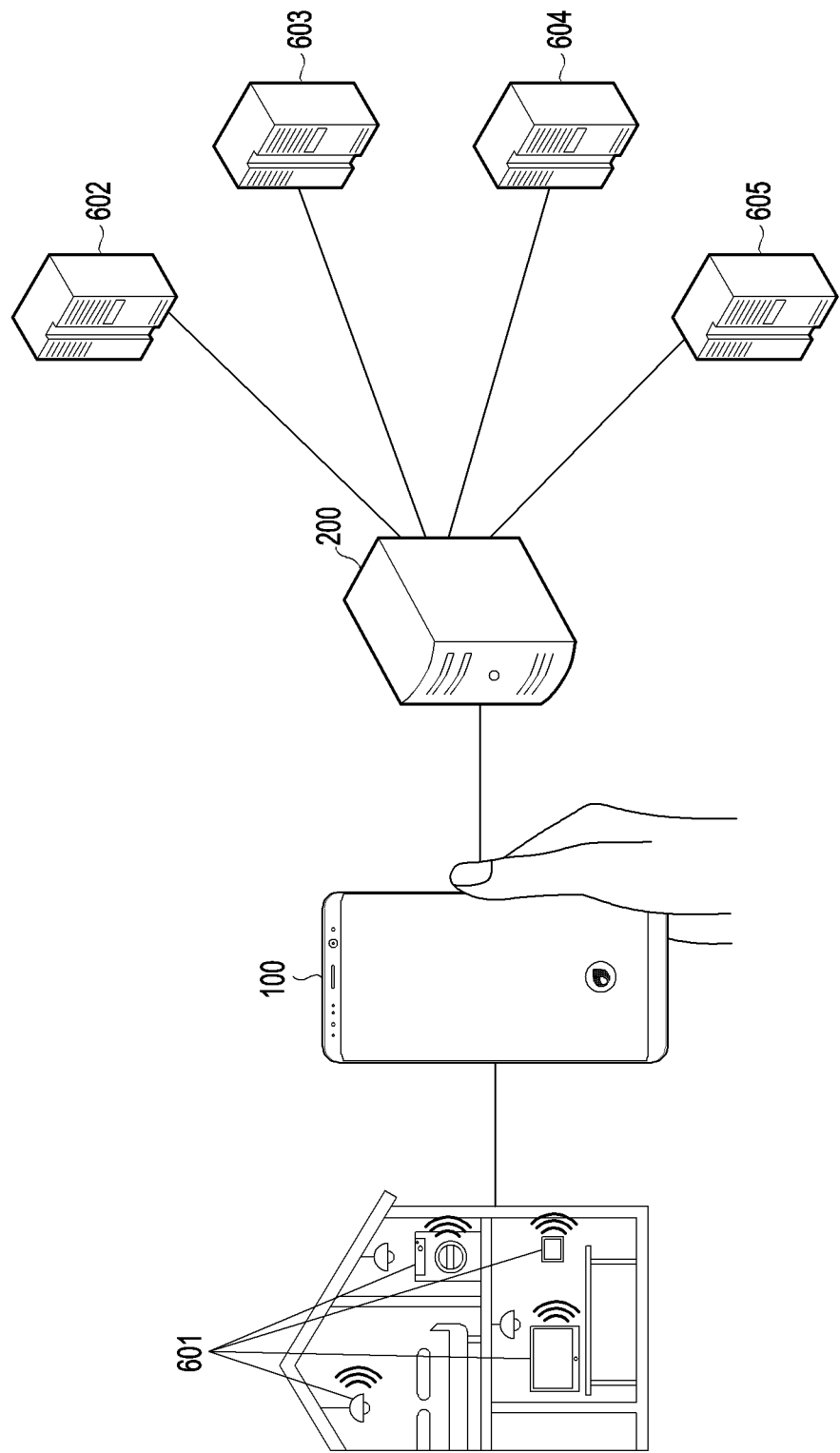
FIG. 6 is a diagram illustrating an example configuration of an intelligent system according to various embodiments.

FIG. 6 is a diagram illustrating an example configuration of an intelligent system according to various embodiments.

According to various embodiments, the intelligent system may include an electronic device 100, an intelligent server 200, developer servers 602, 603, 604, and 605, and an external electronic device 601 as shown in FIG. 6.

Hereinafter, the electronic device 100 will be described.

Since the electronic device 100 has been described in FIG. 1, a duplicate description thereof may not be repeated here.

According to various embodiments, the electronic device 100 may acquire a variety of information for providing speech recognition services. If a speech service providing application (e.g., Bixby) (or an intelligent application or a speech recognition app) is executed, the electronic device 100 may receive an utterance (user utterance) from the user on the basis of the speech service application. The electronic device 100 may acquire a variety of additional information while the speech service providing application (or the intelligent application or the speech recognition app) is running A variety of additional information may include context information and/or user information. For example, context information may include information on the application or program executed in the electronic device 100, information on the current location, and the like. For example, the user information may include a usage pattern (e.g., an application usage pattern and the like) of the user of the electronic device 100, personal information of the user (e.g., age and the like), and the like.

According to various embodiments, the electronic device 100 may transmit the received user utterance to the intelligent server 200. In addition, the electronic device 100, for example, may provide the acquired additional information to the intelligent server 200.

According to various embodiments, the electronic device 100 may receive, from the intelligent server 200, specific information as a response of a result of processing the user utterance by the intelligent server 200, and may provide a service to the user on the basis of the specific information. For example, the electronic device 100 may display the received specific information (e.g., a UI/UX including content corresponding to the user utterance) on the display. Alternatively, for example, the electronic device 100 may provide a service for controlling at least one external electronic device 601 on the basis of the specific information.

Hereinafter, at least one external electronic device 601 will be described.

According to various embodiments, at least one external electronic device 601 may be a target device that is connected to the electronic device 100 through various types of communication schemes (e.g., Wifi or the like) and is controlled by a control signal received from the electronic device 100. In other words, the external electronic device 601 may be controlled by the electronic device 100 on the basis of specific information acquired by the user utterance. The external electronic device 601 may be an IOT device that is managed in a specific cloud (e.g., a smart home cloud) together with the electronic device 100.

Hereinafter, the intelligent server 200 will be described.

According to various embodiments, the intelligent server 200 may process the user utterance received from the electronic device 100, thereby acquiring information for providing a service corresponding to the user utterance. The intelligent server 200 may refer to additional information received together with the user utterance from the electronic device 100 when processing the user utterance.

According to various embodiments, the intelligent server 200 may enable the user utterance to be processed by a domain. For example, the intelligent server 200 may cause the user utterance to be processed by the capsule that is implemented in the intelligent server 200, thereby acquiring processing result information from the capsule, or may cause the user utterance to be processed by an external server interworking with the intelligent server 200, thereby acquiring processing result information from the external server. The operation of the capsule and the external server will be described later in detail.

According to various embodiments, the intelligent server 200 may acquire a domain for processing the user utterance from developer servers 602, 603, 604, and 605. For example, the intelligent server 200 may acquire a capsule for processing the user utterance from the developer servers 602, 603, 604, and 605. For example, the developers of the developer servers 602, 603, 604, and 605 may register capsules in the intelligent server 200. If the developer servers 602, 603, 604, and 605 accesses the intelligent server 200, the intelligent server 200 may cause a user interface for registering the capsules to be displayed on the developer servers 602, 603, 604, and 605, and the developers may register the capsules on the displayed user interface.

The disclosure is not limited to the above description, and the intelligent server 200 may store a domain that is produced by the intelligent server 200.

Hereinafter, the developer servers 602, 603, 604, and 605 will be described.

According to various embodiments, a plurality of developer servers 602, 603, 604, and 605 may register domains for processing the user utterance in the intelligent server 200. For example, the capsules for processing the user utterance may be produced in the developer servers 602, 603, 604, and 605, and the developer servers 602, 603, 604, and 605 (or the capsule developers) may register the produced capsules in the intelligent server 200. In this case, the registration procedure may be performed such that the developer servers 602, 603, 604, and 605 directly access the intelligent server 200 and register the capsules in the accessed intelligent server 200, but is not limited thereto, and a separate registration server may be provided to register the capsules so that the registered capsule may be provided to the intelligent server 200 from the registration server.

According to various embodiments, one or more functions provided by the capsules produced in the respective developer servers 602, 603, 604, and 605 may be different from each other, or they may be the same as or similar to each other. For example, a first capsule produced in a first developer server may provide a first function (e.g., a music-related function), a second capsule produced in a second developer server may provide a second function (e.g., a music-related function), . . . , and an $N^{th}$ capsule produced in an $N^{th}$ developer server may provide an $N^{th}$ function (e.g., an image-related function). Based on the various services capable of being provided by the various capsules, various services corresponding to the user utterances may be provided to the user.

According to various embodiments, each capsule may provide a plurality of functions related to each other. For example, the first capsule may provides $1\text{-}1^{st}$ function (e.g., a music playback function) and a $1\text{-}2^{nd}$ function (e.g., a music list providing function), which are related to each other. Allocation to a specific category may be performed according to the function provided by the capsule, and thus Allocation to a plurality of categories may be performed, which will be described later in the description of the intelligent server 200.

Hereinafter, an example of the configuration of the intelligent server 200 and an example of the external servers 719 and 720 interworking with the intelligent server 200 according to various embodiments will be described below with reference to FIG. 7.

According to various embodiments, the intelligent server 200 may process a user utterance and additional information received from the electronic device 100, and may generate specific information for providing a service corresponding to the user utterance.

Figure 7:
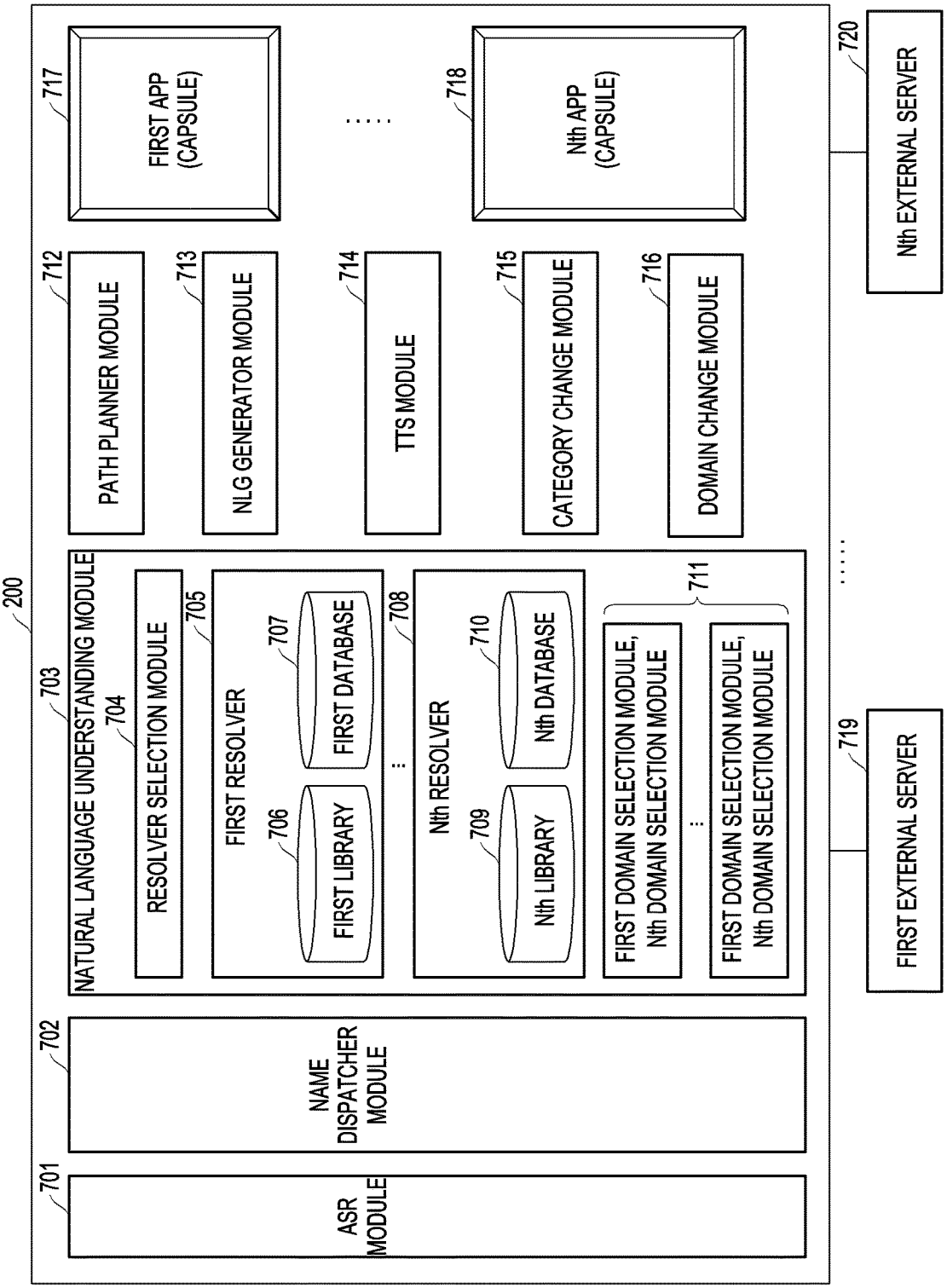
FIG. 7 is a diagram illustrating an example configuration of an intelligent server and an example of an external server interworking with the intelligent server according to various embodiments.

FIG. 7 is a diagram illustrating an example configuration of an intelligent server 200 and an example of an external server 719 and/or 720 interworking with the intelligent server 200 according to various embodiments. The respective modules implemented in the intelligent server 200 may be programs coded to execute specific operations. In other words, the processor of the intelligent server 200 may be configured to execute specific operations of the respective modules. Hereinafter, the operation of the configuration of the intelligent server 200 in FIG. 7 will be described with reference to FIGS. 8 and 9.

Figure 8:
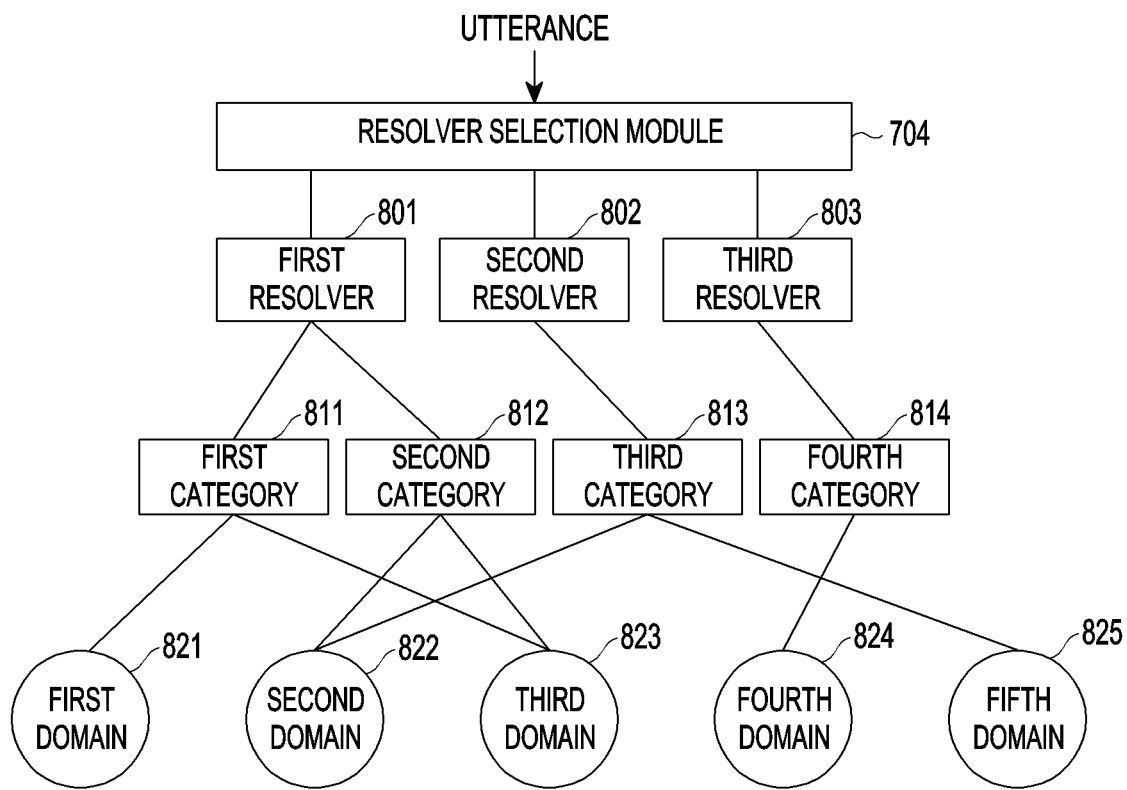
FIG. 8 is a diagram illustrating an example resolver selection operation, a category selection operation, and a domain selection operation of an intelligent server according to various embodiments.

FIG. 8 is a diagram illustrating an example resolver selection operation, a category selection operation, and a domain selection operation of an intelligent server 200 according to various embodiments.

Figure 9:
FIG. 9 is a diagram illustrating an example list of utterances capable of being processed in a category according to various embodiments.

FIG. 9 is a diagram illustrating an example list of utterances capable of being processed in a category according to various embodiments.

According to various embodiments, the intelligent server 200 may include an ASR module 701, a name dispatcher module 702, a natural language understanding module 703 including a resolver selection module 704, a plurality of resolvers 705 and 708, and a plurality of domain selection modules 711, a path planner module 712, an NLG generator module 713, a TTS module 714, a category change module 715, a domain change module 716, and a plurality of capsules 717 and 718. Each of these modules may include various processing circuitry and/or executable program instructions as described above.

According to various embodiments, the ASR module 701 may perform a similar operation as the ASR module 210 described above, the path planner module 712 may perform a similar operation as the path planner module 230 described above, the NLG generator module 713 may perform a similar operation as the NLG module 250 described above, and the TTS module 714 may perform a similar operation as the TTS module 260 described above, so duplicate descriptions regarding the respective modules may not be repeated.

According to various embodiments, the name dispatcher module 702 may identify text data corresponding to a user utterance acquired by the ASR module 701, and may identify a specific word included in the text data, and may identify a domain (or a capsule) capable of providing a service corresponding to the identified specific word. For example, the specific word may include a common noun including a device name (e.g., TV) and a content name (e.g., a movie name and a song title), various types of proper nouns (e.g., weather), and the like.

According to various embodiments, the natural language understanding module 703 may syntactically and/or semantically analyze the user utterance, may identify the user intent, and may identify a domain corresponding to the identified user intent. The modules (e.g., the resolver selection module 704, the plurality of resolvers 705 and 708, and the domain selection modules 711) included in the natural language understanding module 703 may perform operations on the basis of syntactical analysis or semantical analysis of the user utterance.

According to various embodiments, the resolver selection module 704 may select a resolver (e.g., first resolver, second resolver, third resolver) 801, 802, or 803 corresponding to the user utterance (or text data corresponding to the user utterance) as shown in FIG. 8.

For example, the resolver selection module 704 may select a resolver corresponding to the received user utterance from among a plurality of resolvers 801, 802, and 803 on the basis of utterances learned by the respective resolvers 801, 802, and 803. In this case, the resolver selection module 704 may learn the model for various user utterances, which are classified to a plurality of resolvers, and the resolver selection module 704 may select the resolver on the basis of the learned model. For example, a plurality of resolvers 801, 802, and 803 may be classified on the basis of the lexical similarity (syntactic and semantic similarity) of the learned utterances, or may be classified on the basis of functions (or services) related to the learned utterances. For example, a first resolver (e.g., MediaResolver) may be learned on the basis of utterances related to a first function (e.g., playback of media) (e.g., the utterance that desires a first function to be provided), and thus if information related to the first function (e.g., playback of media) is identified as a result of analyzing the user utterance (or text data), the resolver selection module 704 may select the first resolver 801 from among the plurality of resolvers 801, 802, and 803. As another example, the first resolver (e.g., MediaResolver) may be learned on the basis of utterances related to a second function (e.g., control of TV media) (e.g., the utterance that desires a second function to be provided), and thus if information related to the second function (e.g., control of TV media) is identified as a result of analyzing the user utterance (or text data), the resolver selection module 704 may select the first resolver 801 from among the plurality of resolvers 801, 802, and 803.

As described above, if the user utterance is received, the resolver selection module 704 may select the resolver corresponding to the received user utterance from among the resolvers learned with different types of utterances, thereby analyzing the user utterance in order to provide the user with a more appropriate service corresponding to the user utterance.

According to various embodiments, as shown in FIG. 8, a plurality of categories 811, 812, 813, and 814 (e.g., first category, second category, third category, fourth category, respectively) may be assigned to the respective resolvers 801, 802, and 803. The respective resolvers 801, 802, and 803 may select a category corresponding to the user utterance (or text data) from among the plurality of categories 811, 812, 813, and 814. For example, if one resolver is selected from among the plurality of resolvers 801, 802, and 803, the selected resolver may analyze the currently received user utterance on the basis of the characteristic of previously learned utterances, and, based on the analyzed result, may select a specific category corresponding to the user utterance from among the plurality of categories. As described above, since the resolver performs an operation of selecting the category, it may be defined as a category selection module.

According to various embodiments, a plurality of resolvers 705 and 708 may analyze the user utterance, and may select the category on the basis of databases 706 and 710 assigned to the plurality of resolvers, or library capsules 707 and 709 for interworking with a search server (not shown). For example, the resolvers 705 and 708 may identify information (e.g., name information) corresponding to at least a portion of the user utterance from the databases 706 and 710 assigned to the resolvers, and may select a category including a domain capable of providing a function corresponding to the identified information. In addition, for example, the resolver 705 and 708 may interwork with a search server (e.g., a cloud server or the like) using the library capsules 707 and 709 included in the resolvers, may search for information (e.g., name information) corresponding to at least a portion of the user utterance from the interworking search server (not shown), and may select a category including a domain capable of providing a function corresponding to the searched information. In this case, the resolvers 705 and 708 may acquire a search query for searching based on the user utterance, may transmit the acquired search query to a search server (not shown), and may acquire a search result in response thereto.

According to various embodiments, a plurality of resolvers 705 and 708 may identify an utterance list 900 supported by the respective categories as shown in FIG. 9, and may select one category including an utterance corresponding to the user utterance (or text data). For example, the category may have information on the utterances capable of being processed as shown in FIG. 9. Here, the utterances capable of being processed in the category may correspond to the functions provided in the corresponding category by a plurality of domains included in the category. For example, in FIG. 9, if a first domain provides a first function in the corresponding category, the user utterance 901 related to the first function may be processed in the corresponding category, and may be managed using the utterance list in the corresponding category.

According to various embodiments, the respective categories 811, 812, 813, and 814 may include one or more domains 821, 822, 823, 824, and 825 (e.g., first domain, second domain, third domain, fourth domain, fifth domain, respectively) as shown in FIG. 8. In other words, the respective domains 821, 822, 823, 824, and 825 may be classified into a plurality of categories 811, 812, 813, and 814. As described above, in the case where the domains are registered in the intelligent server 200, the developer may register the domains in a specific category (or may register information on the capsules in the intelligent server 200), so that the domains may be included in the specific category. One or more domains having similar functions (or services) that are provided by the corresponding capsules (applications) may be classified into the same category. An operation in which one or more domains are classified into the categories on the basis of the functional similarity may be manually performed when the developer registers the domains, or may be automatically performed in the intelligent server 200.

According to various embodiments, at least some of a plurality of categories 811, 812, 813, and 814 may include at least one of the same domains. For example, as shown in FIG. 8, both the first category 811 and the second category 812 may include a third domain 823.

If the respective domains are registered in the intelligent server 200, the developer may include the domains in a plurality of categories. For example, in the case where the developer registers the third domain 823 in the intelligent server 200, the third domain 823 may be registered in the first category 811 and the second category 812. At this time, if a developer server accesses the intelligent server 200, the intelligent server 200 may enable a user interface for registering the capsule to be displayed on the developer server, and if the developer registers the third domain 823 through the user interface, a plurality of categories in which the third domain 823 is able to be registered may be displayed. The developer may select at least one category (e.g., the first category 811 and the second category 812) in which the capsule is to be registered from among the plurality of categories on the user interface. Accordingly, the third domain 823 (or a third capsule (not shown)) may be registered in the first category 811 and the second category 812 so that the third domain 823 may be included in the first category 811 and the second category 812.

Based on the type of information (e.g., a deeplink or a UI/UX) returned after processing the user utterance by each domain (or the function executed in the electronic device 100 on the basis of the returned information), the respective domains 821, 822, 823, 824, and 825 may be included in the plurality of categories 811, 812, 813, and 814. For example, the third domain 823 may process the user utterance, may return information (e.g., a deeplink) related to a first function (e.g., a music playback function), and may return information (e.g., a deeplink) related to a second function (e.g., a video playback function). Accordingly, the third domain 823 may be included in the first category 811 (e.g., music) corresponding to the first function (e.g., the music playback function) and the second category 812 (e.g., video) corresponding to the second function (e.g., the video playback function).

One domain may be assigned to different categories, various functions capable of being provided by a specific domain may be used in the speech services depending on the type of a selected category. Accordingly, the user may receive rich speech services on the basis of the various functions capable of being provided by a specific domain.

According to various embodiments, each of the domain selection modules 711 may select a domain corresponding to the user utterance (or text data) from among a plurality of domains included in the selected category. The domain selection modules 711 may be implemented for each category, and the domain selection module assigned to one category may select a specific domain from among the domains included in the one category on the basis of the user utterance. For example, the domain selection modules 711 may identify the functions provided by the respective domains, and may select domains that provide a function corresponding to the user utterance (e.g., information related to the user intent obtained by analyzing the user utterance) from among the identified functions.

According to various embodiments, the category change module 715 may change a predetermined category to another category in order to process the user utterance. If the predetermined category is changed to another category by the category change module 715, the domain selection modules 711 may reselect a domain for processing the user utterance in the changed category.

According to various embodiments, the domain change module 716 may change a predetermined domain to another domain within the same category in order to process the user utterance.

According to various embodiments, a plurality of domains 717 and 718 may generate information for processing the received user utterance and providing service. Each of the plurality of domains 821, 822, 823, 824, and 825 may be a capsule as shown in FIG. 8. In other words, the operation of selecting one domain in order to process the user utterance and processing the user utterance by the selected domain may indicate an operation of selecting one domain and processing the user utterance by one capsule. However, in the disclosure, for the convenience of description, various embodiments of the intelligent system will be described on the basis of a domain.

According to various embodiments, the domain (capsule) may be a kind of program package that processes the user utterance to generate specific information in order to provide a specific function or a specific service corresponding to the user utterance. As described above, like the domains, the capsules may also be developed by the respective developer servers, and may be registered in the intelligent server.

According to various embodiments, the domain (capsule) may receive a user utterance, may analyze the received user utterance to identify a service desired by the user (or identify the user intent) (modeling), may perform a processing operation for providing the identified service (e.g., acquire information on the identified service) (business logic), and may generate (UI/UX) information for providing the service (e.g., visually generate the acquired information). If the electronic device 100 receives a UI/UX, content corresponding to the user utterance may be displayed on the basis of the UI/UX.

In addition, the domain (capsule) may execute a processing operation for providing a service corresponding to the user utterance on the basis of information acquired by analyzing the user utterance by the natural language understanding module 730 (or the NLU module 220). For example, based on user utterance information (intent and parameters), information on a specific word included in the utterance (e.g. a song title), context information (e.g., device identification information (e.g., a device name)), information on capability, or the like, which are acquired by analyzing the user utterance by the natural language understanding module 730 (or NLU), the domain (capsule) may generate (UI/UX) information (e.g., visually display the acquired information) for determining the service desired by the user and performing a processing operation for providing the determined service (e.g., acquiring information on the identified service) (business logic), thereby providing the service. For example, if the user utterance is "Change the wind speed of the bedroom air conditioner", at least one element (e.g., the resolver selection module 704) of the natural language understanding module 730 (or the NLU module 220) may analyze the user utterance, identify the information "bedroom air conditioner" as the information on a specific word or the context information indicating device identification information (e.g., a device name), and may identify the information "wind speed" as the information on the capability. A specific resolver may acquire the information on a specific word (e.g., bedroom air conditioner) and information on the capability (e.g., wind speed), and, based on the acquired information, may identify whether there is a device corresponding to the "bedroom air conditioner" and "whether the identified device is able to control the wind speed" through an external server (e.g., a cloud server). The domain may acquire the information analyzed by at least one element (e.g., the resolver selection module 704) of the natural language understanding module 730 (or the NLU module 220) and the specific resolver described above, and, based on the acquired information, may generate (UI/UX) information (e.g., visually display the acquired information) for determining the service desired by the user and performing a processing operation for providing the determined service (e.g., acquiring information on the identified service) (business logic), thereby providing the service.

In addition, the domain (capsule) may execute the processing operation for providing the service, thereby generating a deeplink that enables access to a specific screen of the application for providing the service. The deeplink may include mechanism enabling access to the specific screen. If the electronic device 100 receives the deeplink, the electronic device 100 may display a link for accessing the specific screen of the application for providing the service on the basis of the deeplink. If the link is selected, the electronic device 100 may display the specific screen of the application.

In addition, the domain (capsule) may communicate with an external search server to receive information on the service desired by the user.

In addition, the domain (capsule) may be trained in order to provide the function corresponding to the user utterance.

Detailed examples of the above-described resolvers, categories, and domains (capsules) may be given in Table 2 below. Table 2 below shows specific examples of the resolvers, the categories assigned to the resolvers, and one or more domains assigned to the categories.

TABLE 2

| Category Resolver | Category | Domain |
|---|---|---|
| DeviceControlResolver | Streaming Music | samsungMusicApp, Bugs |
| SystemResolver | Podcast | Podbbang |
| TVChannelResolver | TVControl | tvCotnrol |
| LauncherResolver | ACControl | airconCotrol |
| MediaResolver | SpeakerControl | speakerSystemApp |
| MusicResolver | IoTControl | speakerSmartThingsApp |
| SearchResolver | SpeakerSettings | SpeakerSettingsApp |
| PodcastResolver | SpeakerMediaControl | SpeakerSystemApp |
| ContentInfoResolver | TVMediaControl | tvMediaControl |
| AudiobookResolver | IOTMediaControl | speakerSmartThingsApp |
|  | TVShows | tvSearchAndPlayApp |
|  | Search | — |
|  | IoTSearch | SpeakerSmartThingsApp |
|  | TVChannel | TvChannel |
|  | IoTChannel | SpeakerSmartThingsApp |
|  | TVApplications | tvLauncher |
|  | FridgeDisplay | fridgeVIewInsideApp |

According to various embodiments, the intelligent server 200 may store and manage information on the resolvers, categories, and domains as shown in Table 2 above. In addition, when the electronic device 100 requests the information, the intelligent server 200 may provide the information to the electronic device 100. For example, when a speech service application is executed in the electronic device 100 and when the electronic device 100 receives a request for information on at least one of a resolver, a category, or a domain of the user on the basis of the speech service application, the electronic device 100 may request information on at least one of the resolver, the category, or the domain from the intelligent server 200. The intelligent server 200 may generate a UI/UX for displaying information on at least one of the resolver, the category, or the domain, and may provide the same to the electronic device 100. The electronic device 100 may display the provided UI/UX to provide information on at least one of the resolver, the category, or the domain to the user.

According to various embodiments, the intelligent server 200 may interwork with a plurality of external servers 719 and 720. Here, the plurality of external servers 719 and 720 may perform the same or similar operation as the capsules 717 and 718 described above. In other words, the plurality of external servers 719 and 720, like the capsules 717 and 718, may receive a user utterance, may analyze the received user utterance to identify the service desired by the user (or identify the user intent) (modeling), may perform a processing operation for providing the identified service (e.g., acquire information on the identified service) (business logic), and may generate (UI/UX) information for providing the service (e.g., visually display the acquired information). Therefore, the following description of the capsules 717 and 718 may also be applied to the external servers 719 and 720.

For example, like the operation in which the intelligent server 200, which will be described later, transmits a user utterance to the capsule and receives a processing result thereof from the capsule, the intelligent server 200 may transmit a user utterance to the external servers 719 and 720, and may receive a processing result thereof from the external servers 719 and 720.

The above-described intelligent system may be defined as a server type system in which the electronic device 100 and the intelligent server 200 interwork with each other to process the user utterance and provide a service.

The intelligent system may process the user utterance, and may provide a service by including at least some of the modules, the programs, or the applications, which are implemented in the intelligent server 200, in the electronic device 100. In other words, the electronic device 100 may perform at least one operation capable of being performed by the intelligent server 200, thereby processing the user utterance and providing a service. In this case, the intelligent system may be classified to an on-device type intelligent system in which the electronic device 100 is configured to perform the primary operations of the intelligent server 200 and a hybrid type intelligent system in which the electronic device 100 is configured to perform some operations of the intelligent server.

For example, in the case of the on-device type intelligent system, the electronic device 100 may store information on categories and information on domains, which will be described later, in the memory 130. The electronic device 100 may process a user utterance received from the user on the basis of the information on categories and the information on domains stored in the memory 130, thereby providing a service corresponding to the user utterance to the user.

Hereinafter, for convenience of explanation, a description will be made on the basis of a server type intelligent system. However, operations of the intelligent system described in the disclosure may be implemented as operations of the on-device type intelligent system or operations of the hybrid type intelligent system. In other words, the intelligent system may be implemented such that at least some of the operations of the intelligent server 200 described in the disclosure are performed by the electronic device 100.

Hereinafter, an example of the electronic device 100 according to various embodiments and an example operation method thereof will be described.

Although the operation of the electronic device 100 described below may be understood as being controlled to perform a corresponding operation by a processor (2620 to be described later) using at least one element of the electronic device 100, the disclosure may not be limited thereto. For example, instructions or computer codes that cause the operation of the electronic device 100, which will be described below, may be stored in the memory 140. The stored instructions or computer codes may cause the processor 150 to process a corresponding operation using at least one element included in the electronic device 100.

According to various embodiments, when receiving a user utterance, the electronic device 100 may provide a service corresponding to the received user utterance on the basis of a domain (e.g., a second capsule) other than a predetermined domain (e.g., a first capsule).

Figure 10:
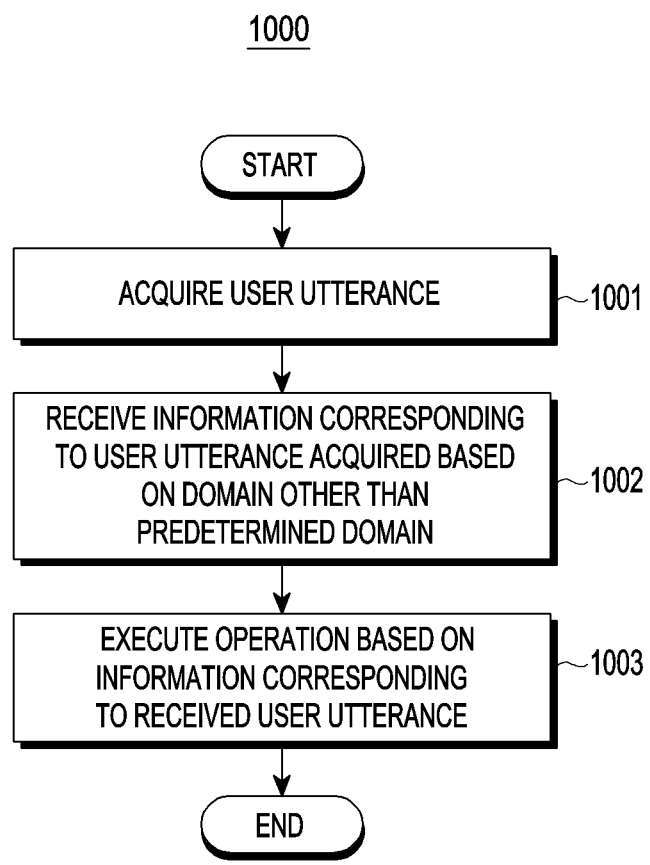
FIG. 10 is a flowchart illustrating an example operation of providing a service corresponding to a user utterance by an electronic device according to various embodiments.

FIG. 10 is a flowchart 1000 illustrating an example operation of providing a service corresponding to a user utterance by an electronic device 100 according to various embodiments. According to various embodiments, the operations of the electronic device 100 are not limited to the order of the operations of the electronic device 100 illustrated in FIG. 10, and may be performed in a different order from the illustrated order. In addition, according to various embodiments, more operations than the operations of the electronic device 100 may be performed shown in FIG. 10, or fewer operations than the operations of the electronic device 100 shown in FIG. 10 or at least one operation may be performed. Hereinafter, FIG. 10 will be described with reference to FIG. 11.

Figure 11:
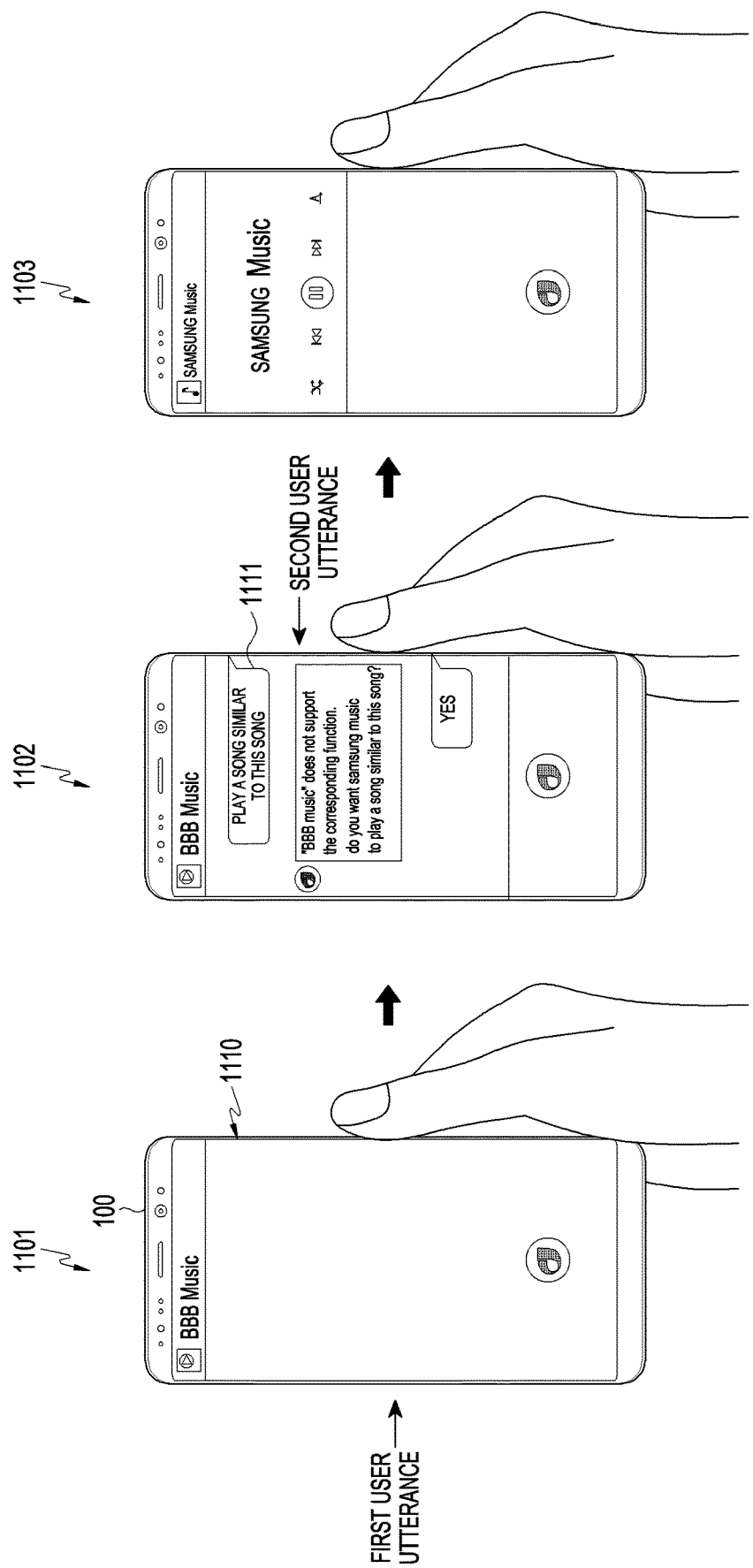
FIG. 11 is a diagram illustrating an example operation of providing a service corresponding to a user utterance by an electronic device according to various embodiments.

FIG. 11 is a diagram illustrating an example operation of providing a service corresponding to a user utterance by an electronic device 100 according to various embodiments.

According to various embodiments, the electronic device 100 may acquire a user utterance in operation 1001. For example, the electronic device 100 may receive a user utterance in the state in which the first domain is predetermined. For example, as denoted by 1101 in FIG. 11, the electronic device 100 may receive a first user utterance after a speech service providing application (e.g., Bixby) 1110 is executed. The electronic device 100 may transmit information on the first user utterance to the intelligent server 200, may receive, from the intelligent server 200, processing result information corresponding to the first user utterance, which is acquired from the determined domain on the basis of the first user utterance, and may provide a service on the basis of the processing result information. The electronic device 100, as denoted by 1102 in FIG. 11, may receive a second user utterance while the speech service providing application 1110 is being executed after the domain is determined on the basis of the first user utterance. In this case, the electronic device 100 may display a first screen of the speech service providing application 1110 including information related to the determined domain, and may receive a second user utterance 1111 (e.g., "Play a song similar to this song") from the user while displaying the first screen. The electronic device 100 may receive the second user utterance 1111 while the speech service providing application 1110 is running in the background.

According to various embodiments, the electronic device 100 may receive information corresponding to the user utterance acquired on the basis of a domain other than the predetermined domain in operation 1002. For example, in the case where the intelligent server 200 is unable to process the user utterance received from the electronic device 100 using the predetermined domain, the user utterance may be processed by another domain included in the same category. In the case where the intelligent server 200 is unable to process the user utterance received from the electronic device 100 using the predetermined category, the user utterance may be processed by another domain included in another category. The electronic device 100 may receive information (e.g., a deeplink or a UI/UX) as a result of processing the user utterance by another domain of the intelligent server 200.

A detailed operation of changing the predetermined domain to another domain or changing the predetermined category to another category in order to process the user utterance of the intelligent server 200 will be described later.

As described above, in the case where it is impossible to process the user utterance in the predetermined domain, the user utterance may be performed in another domain (or another category), thereby improving continuity of providing services for the user utterance. In other words, a user may receive a service through processing of the user utterance by another domain in a situation where the user utterance is unable to be processed by the predetermined domain.

According to various embodiments, the electronic device 100 may perform the operation on the basis of information corresponding to the received user utterance in operation 1003. For example, the electronic device 100 may perform at least one operation on the basis of result information (e.g., a deeplink or a UI/UX) obtained by processing the user utterance received from the intelligent server 200.

For example, the electronic device 100 may receive a deeplink for accessing a specific screen (e.g., a music playback screen) of a specific application (e.g., Samsung Music) from the intelligent server 200 as denoted by 1102 in FIG. 11, and may inquire of the user whether to access the specific screen of the specific application (e.g., display a link, or display text inquiring whether to access the same as denoted by 1102 in FIG. 11). When a request for access to the specific screen of the specific application is received from the user (e.g., an affirmative response is received as denoted by 1102 in FIG. 11), the electronic device 100 may display a specific screen for providing a specified function of a specific application (e.g., a music playback function) as denoted by 1103 in FIG. 11.

At this time, the electronic device 100 may control another external electronic device (e.g., the external electronic device 601 in FIG. 6) (e.g., IOT devices including smart TVs, smart speakers, air conditioners, etc.) on the basis of the specific application. For example, in the case where the electronic device 100 is a mobile terminal, the electronic device 100 may display a specific screen of an application for controlling the external electronic device 601, and may receive an input for controlling the external electronic device 601 from the user. The electronic device 100 may control the external electronic device 601 controllable by the electronic device 100 on the basis of the input for controlling the external electronic device 601, which is received from the user.

As another example, the electronic device 100 may receive a UI/UX including content corresponding to the user utterance from the intelligent server 200, and may display the received UI/UX to provide the user with content corresponding to the user utterance.

As another example, the electronic device 100 may control another external electronic device 601 through the intelligent server 200, thereby providing the user with a service corresponding to the user utterance. The intelligent server 200 may process the user utterance received from the electronic device 100 (e.g., a speaker) using a specific domain thereof, and may acquire information for controlling another external electronic device 601 as a result of processing the same. The intelligent server 200 may control another external electronic device 601 on the basis of the information for controlling another external electronic device 601, and may notify the electronic device 100 of a result of controlling the same.

Hereinafter, an example of an electronic device 100 and an operation method thereof, and an example of an intelligent server 200 and an operation method thereof according to various embodiments will be described. Meanwhile, hereinafter, duplicate descriptions regarding the electronic device 100 and the intelligent server 200 described above may not be repeated.

Although the operation of the intelligent server 200 described below may be understood as being controlled to perform a corresponding operation by a processor included in the intelligent server 200 using at least one element of the intelligent server 200, the disclosure may not be limited thereto. For example, instructions or computer codes that cause the operation of the intelligent server 200, which will be described below, may be stored in a memory (not shown). The stored instructions or computer codes may cause the processor (not shown) to process a corresponding operation using at least one element included in the intelligent server 200. A description of the memory 130 of the electronic device 100 or a memory 2630 to be described later may be applied to the memory (not shown) of the intelligent server 200, and a description of the processor 150 of the electronic device 100 or a processor 2620 to be described later may be applied to the processor (not shown) of the intelligent server 200, so duplicate descriptions thereof may not be repeated.

According to various embodiments, if a user utterance is unable to be processed by a predetermined domain, the intelligent system may allow the user utterance to be processed by another domain included in the same category as the determined domain, thereby providing a service corresponding to the user utterance.

Figure 12:
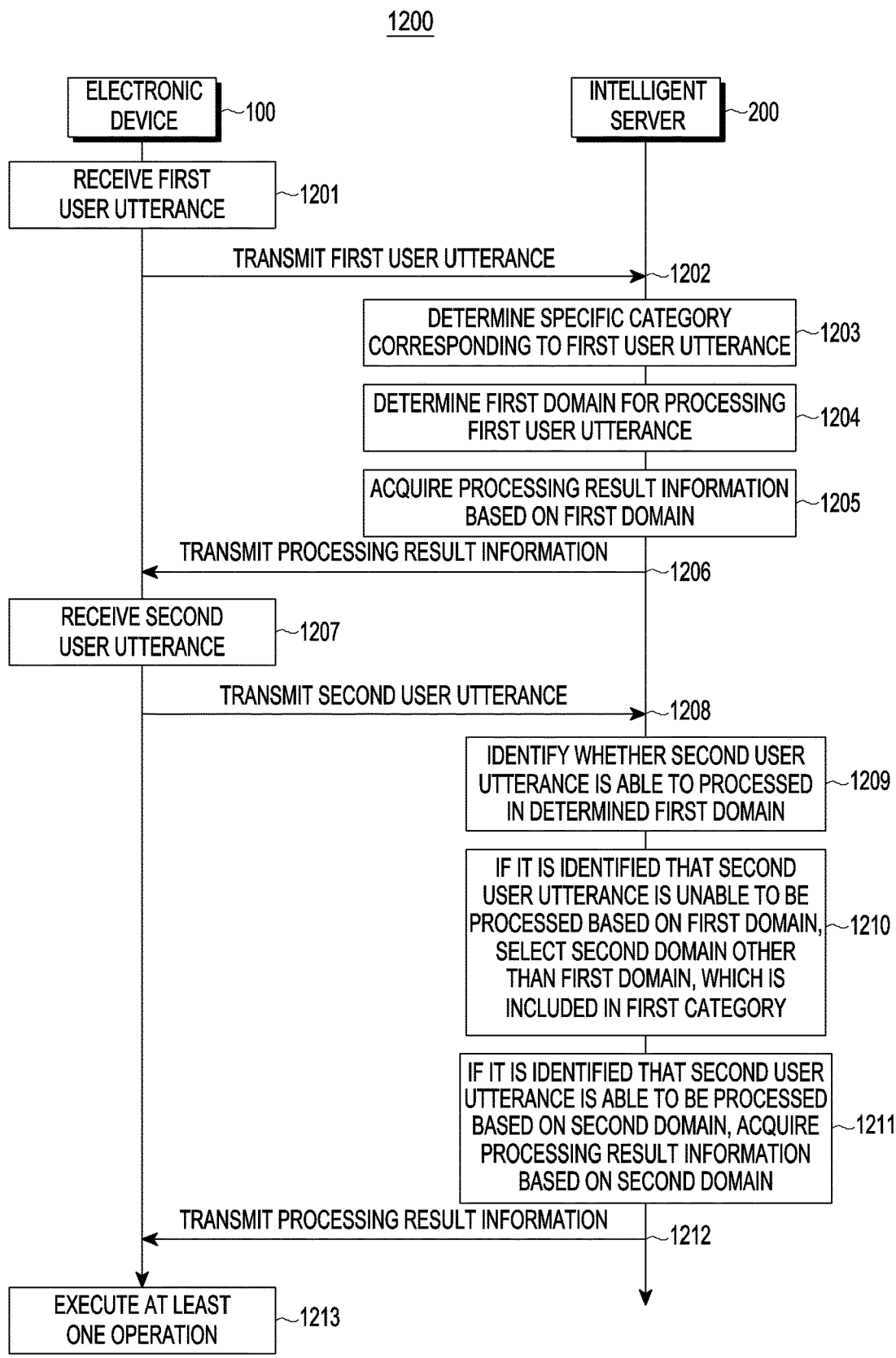
FIG. 12 is a signal flow diagram illustrating an example operation of providing a service corresponding to a user utterance by an electronic device and an intelligent server according to various embodiments.

FIG. 12 is a signal flow diagram 1200 illustrating an example operation of providing a service corresponding to a user utterance by an electronic device 100 and an intelligent server 200 according to various embodiments. According to various embodiments, the operations of the electronic device 100 are not limited to the order of the operations of the electronic device 100 illustrated in FIG. 12, and may be performed in a different order from the illustrated order. In addition, according to various embodiments, more operations than the operations of the electronic device 100 shown in FIG. 12 may be performed, or fewer operations than the operations of the electronic device 100 shown in FIG. 12 or at least one operation may be performed. Hereinafter, FIG. 12 will be described with reference to FIGS. 13, 14A, and 14B.

Figure 13:
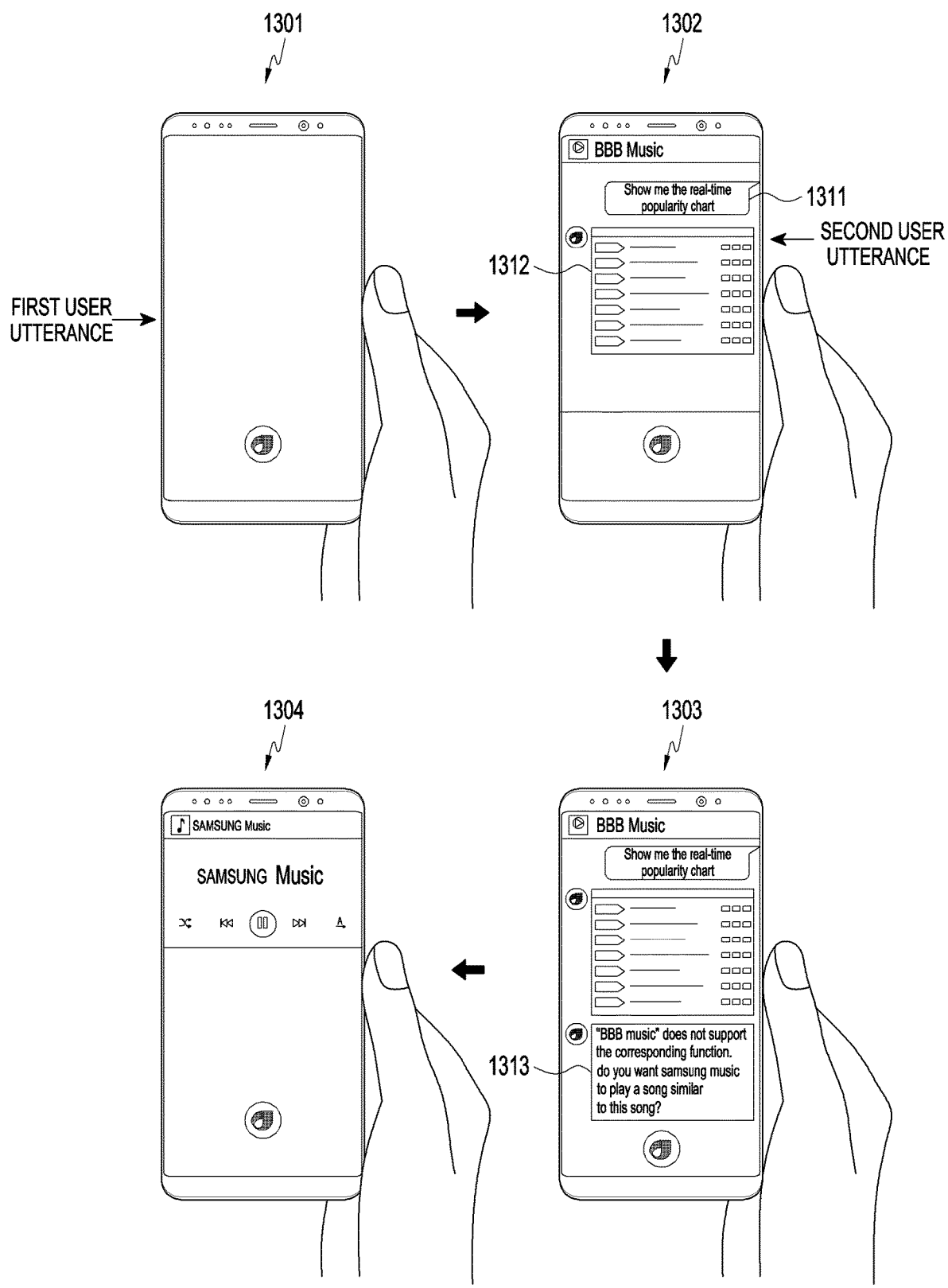
FIG. 13 is a diagram illustrating an example operation of providing a service corresponding to a user utterance by an electronic device according to various embodiments.
Figure 14A:
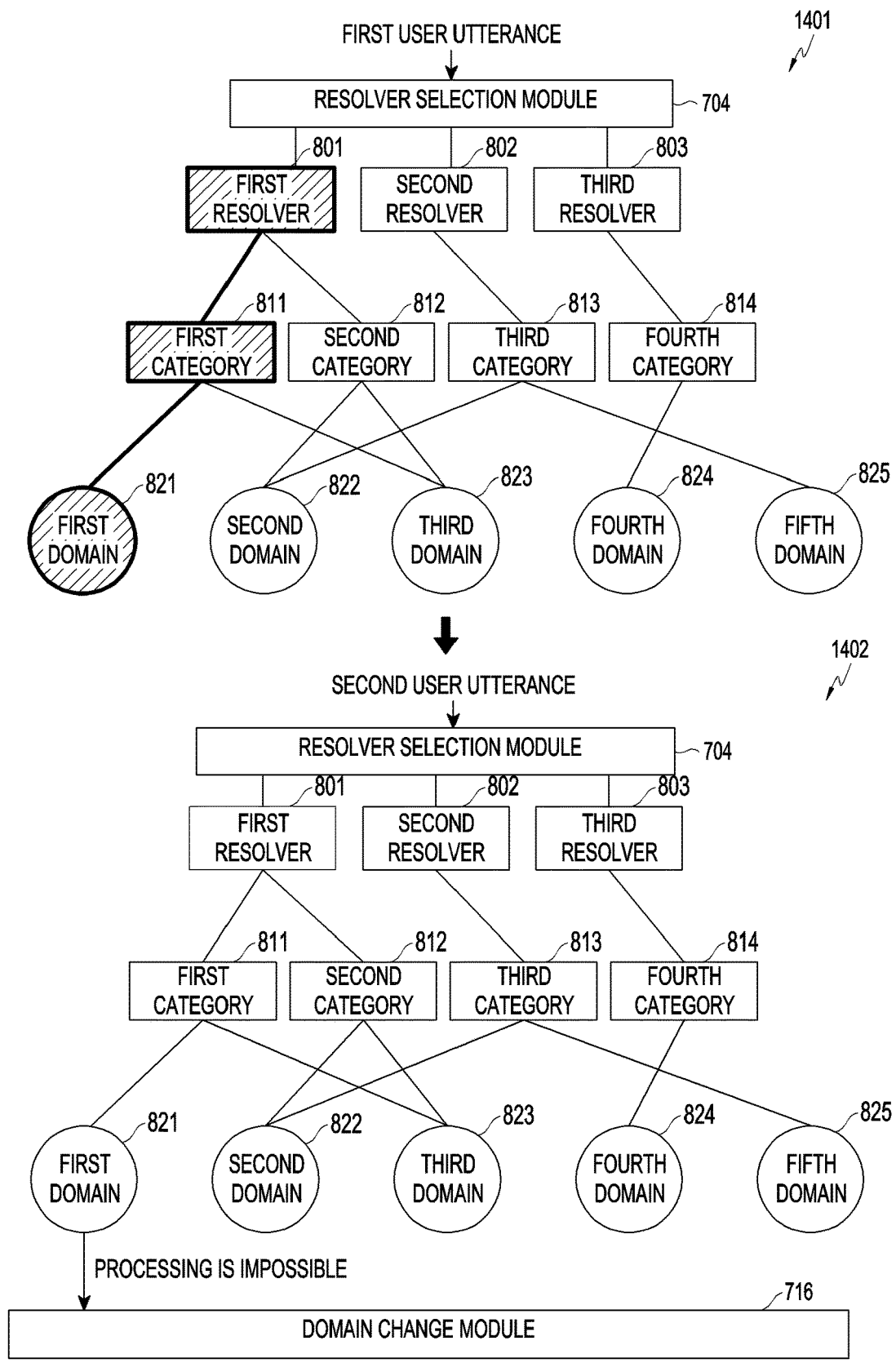
FIG. 14A is a diagram illustrating an example operation of providing a service corresponding to a user utterance by an intelligent server according to various embodiments.
Figure 14B:
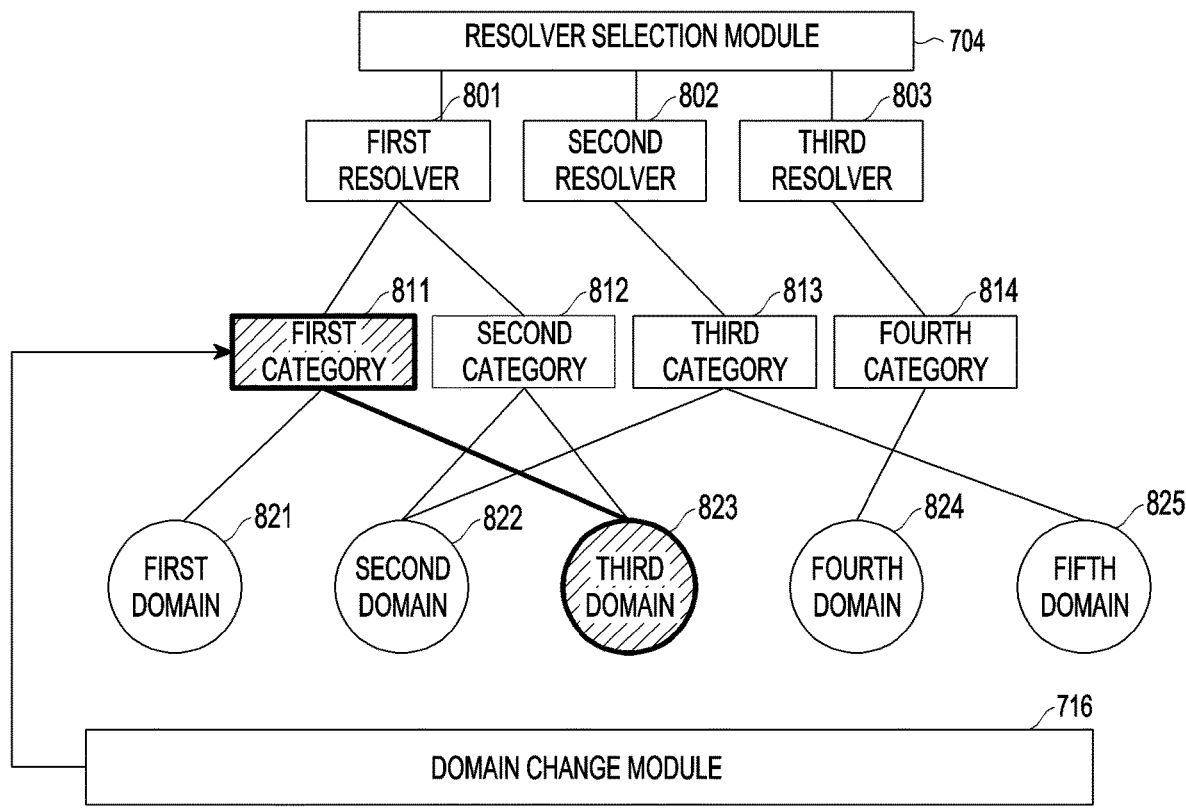
FIG. 14B is a diagram illustrating an example operation of providing a service corresponding to a user utterance by an intelligent server according to various embodiments.
Figure 15:
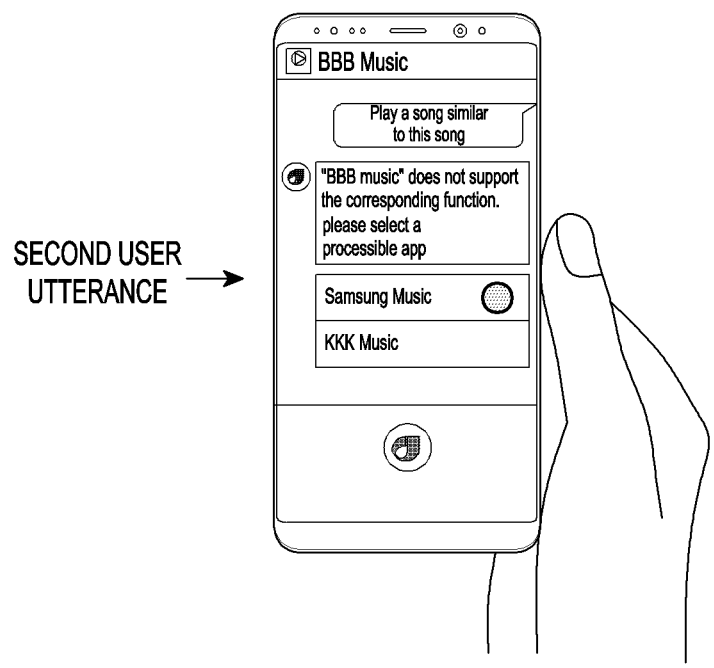
FIG. 15 is a diagram illustrating an example operation of displaying information related to a plurality of domains corresponding to a user utterance by an electronic device according to various embodiments.

FIG. 13 is a diagram illustrating an example operation of providing a service corresponding to a user utterance by an electronic device 100 according to various embodiments. FIG. 14A is a diagram illustrating an example operation of providing a service corresponding to a user utterance by an intelligent server 200 according to various embodiments. FIG. 14B is a diagram illustrating an example operation of providing a service corresponding to a user utterance by an intelligent server 200 according to various embodiments. FIG. 15 is a diagram illustrating an example operation of displaying information related to a plurality of domains corresponding to a user utterance by an electronic device 100 according to various embodiments.

According to various embodiments, the electronic device 100 may receive a first user utterance in operation 1201. For example, if a speech service providing application is executed, the electronic device 100 may receive a first user utterance from the user while the speech service providing application is being executed as denoted by 1301 in FIG. 13.

According to various embodiments, the electronic device 100 may transmit the first user utterance to the intelligent server 200 in operation 1202. Here, the operation of transmitting the first user utterance to the intelligent server 200 by the electronic device 100 may be an operation of processing the first user utterance into information in a format capable of being transmitted through communication and transmitting the processed information.

According to various embodiments, the intelligent server 200 may determine a specific category corresponding to the first user utterance in operation 1203.

For example, the resolver selection module 704, as denoted by 1401 in FIG. 14A, may select a first resolver 801 corresponding to the received first user utterance from among a plurality of resolvers 801, 802, and 803, and the first resolver 801 may select a first category 811 corresponding to the first user utterance from among a plurality of categories 811 and 812 related to the first resolver 801.

For example, the resolver selection module 704 may receive a first user utterance (e.g., "Show me the real-time popularity chart") as denoted by 1301 in FIG. 13, and may select the first resolver 801 that has learned utterances related to at least a part (e.g., "popularity chart") of the first user utterance from among the plurality of resolvers 801, 802, and 803. The selected first resolver 801, as denoted by 1401 in FIG. 14A, may search for information (e.g., "real-time popularity chart") related to at least a part of the first user utterance (e.g., "Show me the real-time popularity chart"), among a plurality of categories 811 and 812, from an external search server (not shown), and may receive a search result (e.g., information indicating "the real-time popularity chart is related to songs") from the external search server (not shown). The first resolver 801 may select the first category 811 corresponding to the received search result from among the plurality of categories 811 and 812 on the basis of the received search result. The first resolver 801 may select the first category 811 corresponding to a result of semantically/syntactically analyzing the user utterance from among the plurality of categories. Since the resolver selection module 704 and the resolvers 801, 802, and 803 have been described above, duplicate descriptions regarding the operations of the resolver selection module 704 and the resolvers 801, 802, and 803 may not be repeated.

According to various embodiments, the intelligent server 200 may determine a first domain for processing the first user utterance in operation 1204. For example, a domain selection module (not shown) may select a first domain 821 from among a plurality of domains 821 and 823 included in the selected first category 811 as denoted by 1401 in FIG. 14A. Accordingly, the first user utterance may be transmitted to the selected first domain 821. Since the domain selection module has been described above, a duplicate description regarding the operation of the domain selection module may not be repeated.

According to various embodiments, the intelligent server 200 may acquire processing result information on the basis of the first domain in operation 1205. For example, as denoted by 1401 in FIG. 14A, the first domain 821 may acquire the first user utterance, and may process the received first user utterance to generate information (e.g., deeplink information or content information) for providing a service corresponding to the first user utterance.

According to various embodiments, the intelligent server 200 may transmit the processing result information to the electronic device 100 in operation 1206. The electronic device 100, as denoted by 1302 in FIG. 13, may display a screen 1312 of a specific application, or may display an interface 1312 including specific content (e.g., the real-time popularity chart) on the basis of the information for providing a service corresponding to the first user utterance (e.g., "Show me the real-time popularity chart") 1311, which is acquired from the first domain 821 of the intelligent server 200.

According to various embodiments, the electronic device 100 may receive a second user utterance in operation 1207. For example, as denoted by 1302 in FIG. 13, the electronic device 100 may receive a second user utterance in the state in which the first domain is predetermined. Since operation 1207 of the electronic device 100 may be performed in the same or similar manner as operation 1001 of the electronic device 100 described above, a duplicate description may not be repeated here.

According to various embodiments, the electronic device 100 may transmit the second user utterance to the intelligent server 200 in operation 1208. Here, the operation of transmitting the second user utterance to the intelligent server 200 by the electronic device 100 may be an operation of processing the second user utterance into information in a format capable of being transmitted through communication and transmitting the processed information.

According to various embodiments, the intelligent server 200 may identify whether the second user utterance is able to be processed in the determined first domain in operation 1209.

For example, as denoted by 1402 in FIG. 14A, when the second user utterance is transmitted to the first domain 821, the first domain 821 may identify whether the second user utterance is able to be processed, and, as a result of the identification, may notify another element (e.g., the domain change module 716) that the second user utterance is unable to be processed. For example, if the first domain 821 is a domain that provides a first function, and if the second user utterance (e.g., "Play a song similar to this song.") is an utterance related to a second function, the first domain 821 may notify another element (e.g., the domain change module 716) that the second user utterance is unable to be processed. Accordingly, the intelligent server 200 may identify that the first domain 821 is unable to process the second user utterance.

According to various embodiments, if a specified condition is satisfied, the intelligent server 200 may identify whether the second user utterance is able to be processed in the first domain 821. For example, satisfaction of a specified condition may indicate that the predetermined first domain 821 is reselected by the second user utterance.

For example, if the category and domain corresponding to the second user utterance are the category (e.g., the first category 811) and domain (e.g., the first domain 821) of the first domain 821, the intelligent server 200 may identify whether the second user utterance is able to be processed by the first domain 821.

As another example, if it is identified that at least one specified condition is satisfied on the basis of additional information received along with the second user utterance (e.g., if the second user utterance is received within a specified time after the first domain 821 is determined), the intelligent server 200 may identify whether the second user utterance is able to be processed by the first domain 821. The operation of analyzing the user utterance on the basis of the additional information by the intelligent server 200 will be described later in more detail with reference to FIGS. 21 to 23.

According to various embodiments, in operation 1210, if it is identified that the first user utterance is unable to be processed on the basis of the first domain, the intelligent server 200 may select a second domain other than the first domain, which is included in the first category. For example, as shown in FIG. 14B, the domain change module 716 may identify whether the second user utterance is able to be processed by at least one different domain (e.g., a third domain 823) of the first category 811 in which the first domain 821 is included, and if it is identified that the second user utterance is able to be processed by at least one domain (e.g., the third domain 823), may select the at least one domain (e.g., the third domain 823) as a domain for processing the second user utterance. Accordingly, the selected domain (e.g., the third domain 823) may receive the second user utterance.

According to various embodiments, the domain change module 716 may select a specific single domain as a domain, which is different from the predetermined domain (e.g., the first domain 821), for processing the second user utterance.

For example, if it is identified that the second user utterance is able to be processed by at least one domain 823 (or other domains (not shown)) other than the first domain 821 in the first category 811, the domain change module 716 may identify a score (e.g., a score indicating the degree of relevance to the second user utterance or a score indicating reliability) of the at least one domain 823 (or other domains (not shown)) other than the first domain 821 in the first category 811. The domain change module 716 may select a specific domain (e.g., the third domain 823) having the highest score from among the at least one domain 823 (or other domains (not shown)).

In addition, for example, if it is identified that the second user utterance is able to be processed by at least one domain 823 (or other domains (not shown)) other than the first domain 821 in the first category 811, the domain change module 716 may receive a user input for selecting a specific domain from among the at least one domain 823 (or other domains (not shown)) other than the first domain 821 in the first category 811. For example, the intelligent server 200 may transmit, to the electronic device 100, information on at least one domain 823 (or other domains (not shown)) other than the first domain 821 in the first category 811. In this case, the intelligent server 200 may generate a UI/UX for displaying a plurality of domains 823 (other domains (not shown)) on the basis of the NLU/TTS module and receiving a user selection input, and may transmit the generated information on the UI/UX to the electronic device 100. The electronic device 100 may display information on at least one domain 823 (or other domains (not shown)) (for example, display the UI on the screen of a providing speech service application) on the basis of the received information, and may receive a user selection input for a specific domain (e.g., the third domain 823). The electronic device 100 may transmit information on the specific domain selected by the user to the intelligent server 200, and the intelligent server 200 may select a specific domain (e.g., the third domain 823) on the basis of the received information.

According to various embodiments, the domain change module 716 may select a plurality of domains for processing the second user utterance, which are different from the predetermined domain (e.g., the first domain 821).

For example, if it is identified that the second user utterance is able to be processed by at least one domain 823 (or other domains (not shown)) other than the first domain 821 in the first category 811, the domain change module 716 may select all of the at least one domain 823 (or other domains (not shown)) as domains for processing the second user utterance.

As described above, in the case of selecting a domain other than the predetermined domain to process the user utterance by the intelligent server 200 in operation 1210, another domain in the same category may be selected so that a service is provided by a different domain that provides a function similar to that of the predetermined domain, thereby maintaining continuity of speech services.

According to various embodiments, if it is identified that the second user utterance is able to be processed on the basis of the second domain, in operation 1211, the intelligent server 200 may acquire processing result information on the basis of the second domain. As shown in FIG. 14B, the third domain 823 may acquire the second user utterance, and may processes the received second user utterance to generate information (e.g., deeplink information or content information) for providing a service corresponding to the second user utterance.

If it is identified that the second user utterance is unable to be processed by the second domain or other domains, the intelligent server 200 may generate an error message for the electronic device 100, and may provide the error message to the electronic device 100.

According to various embodiments, the intelligent server 200 may transmit processing result information to the electronic device 100 in operation 1212, and the electronic device 100 may perform at least one operation on the basis of the processing result information received in operation 1213. For example, the electronic device 100 may display a result of processing the user utterance in another domain (e.g., a screen 1313 for inquiring whether to receive a result of processing the user utterance by another domain) as denoted by 1303 in FIG. 13, and may display a specific screen of a specific application for providing a specified service on the basis of a deeplink received from the intelligent server 200 as denoted by 1304 in FIG. 13. Since operation 1213 of the electronic device 100 may be performed in the same or similar manner as operation 1003 of the electronic device 100 described above, a duplicate description thereof may not be repeated.

In addition, as shown in FIG. 15, in the case where the utterance is able to be processed by a plurality of domains, the electronic device 100 according to various embodiments may receive information on the plurality of domains from the intelligent server 200, may display the plurality of domains, and receive a user input for selecting one of the plurality of domains. The electronic device 100 may receive a result of processing the user utterance by the selected domain, and may perform at least one operation on the basis of the result. In this case, when a plurality pieces of result information obtained by processing the second user utterance in the respective domains may be transmitted to the electronic device 100, or if a specific domain is selected by the electronic device 100, the intelligent server 200 may provide only the result of processing the second user utterance in a specific domain among the plurality of domains.

In addition, according to various embodiments, when receiving an error message, the electronic device 100 may display a screen indicating that the second user utterance is unable to be processed on the basis of the same.

Hereinafter, another example of the intelligent server 200 and an operation method thereof according to various embodiments will be described. A duplicate description regarding the above-described intelligent server 200 may not be repeated here.

According to various embodiments, if a specific word included in the received user utterance is identified, a domain corresponding to the identified specific word may be selected, and the intelligent server 200 may cause the user utterance to be processed by the selected domain.

Figure 16:
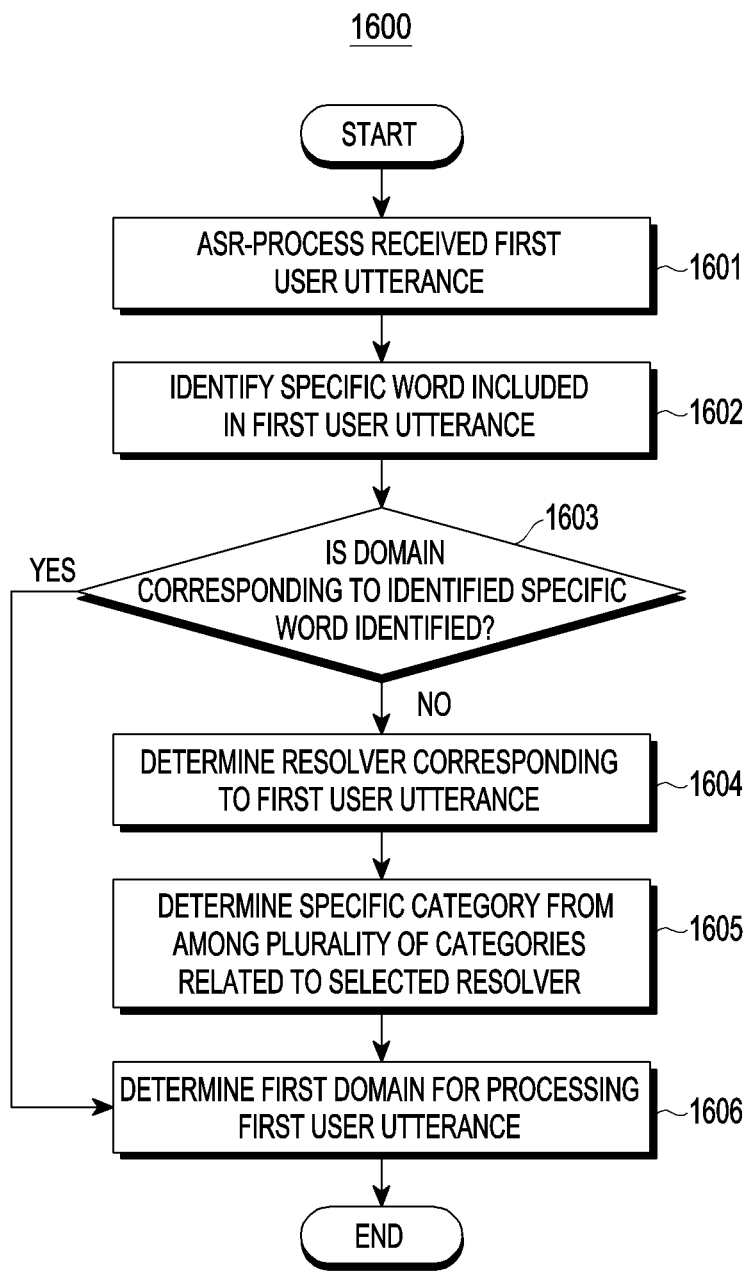
FIG. 16 is a flowchart illustrating an example operation of providing a service corresponding to a user utterance by an intelligent server according to various embodiments.

FIG. 16 is a flowchart 1600 illustrating an example operation of providing a service corresponding to a user utterance by an intelligent server 200 according to various embodiments. According to various embodiments, the operations of the intelligent server 200 are not limited to the order of the operations of the intelligent server 200 illustrated in FIG. 16, and may be performed in a different order from the illustrated order. In addition, according to various embodiments, more operations than the operations of the intelligent server 200 shown in FIG. 16 may be performed, or fewer operations than the operations of the intelligent server 200 shown in FIG. 16 or at least one operation may be performed. Hereinafter, FIG. 16 will be described with reference to FIG. 17.

Figure 17:
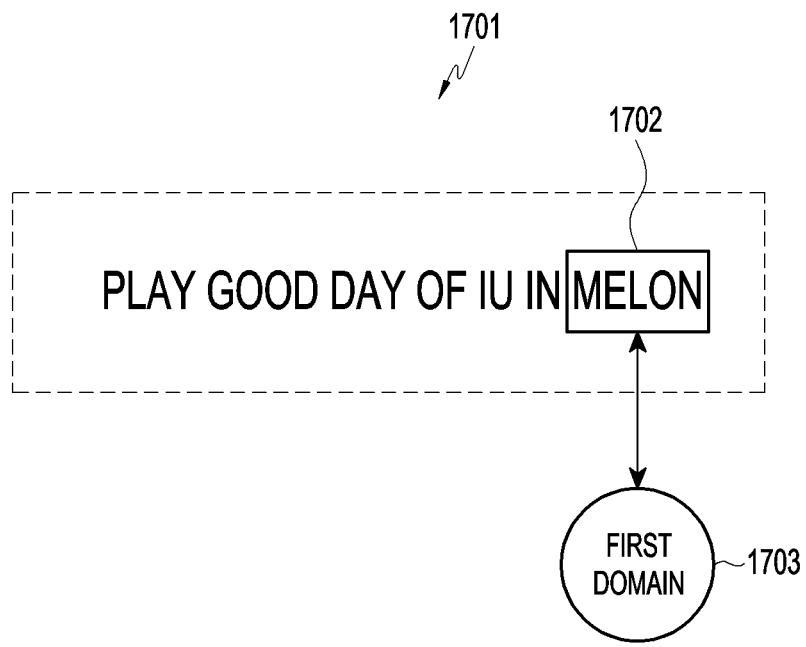
FIG. 17 is a diagram illustrating an example operation of providing a service corresponding to a user utterance by an intelligent server according to various embodiments.

FIG. 17 is a diagram illustrating an example operation of providing a service corresponding to a user utterance by an intelligent server 200 according to various embodiments.

According to various embodiments, the intelligent server 200 may ASR-process the received first user utterance in operation 1601. For example, an ASR module (e.g., the ASR module 210 in FIG. 4 or the ASR module 701 in FIG. 7) may process the received first user utterance into text data. Since the ASR module has been described above, a duplicate description thereof may not be repeated.

According to various embodiments, the intelligent server 200 may identify a specific word included in the first user utterance in operation 1602. For example, as shown in FIG. 17, a name dispatcher module (not shown) may identify a specific word 1702 (e.g., 'Melon') including common nouns and proper nouns from the text data 1701 obtained by processing the received first user utterance (e.g., "Play Good Day of IU in Melon") by the ASR module. Since the common nouns and proper nouns have been described above, duplicate descriptions thereof may not be repeated.

According to various embodiments, the intelligent server 200 may identify whether a domain corresponding to the identified specific word is identified in operation 1603. A domain selection module (not shown), as shown in FIG. 17, may identify whether a specific domain (e.g., the first domain 1703) corresponding to the specific word 1702 identified from the text data 1701 is present among a plurality of domains registered in the intelligent server 200.

According to various embodiments, in the case where a domain corresponding to the specific word is identified, in operation 1606, the intelligent server 200 may determine a first domain for processing the first user utterance. For example, as shown in FIG. 17, the intelligent server 200 may determine a first domain 1703 corresponding to the specific word 1702 to be a domain for processing the first user utterance.

According to various embodiments, in the case where a domain corresponding to the specific word is not identified, the intelligent server 200 may determine a resolver corresponding to the first user utterance in operation 1604, may determine a specific category from among a plurality of categories related to the selected resolver in operation 1605, and may determine a first domain for processing the first user utterance in operation 1606. Since operations 1604 to 1606 of the intelligent server 200 may be performed in the same or similar manner as operations 1203 to 1204 of the intelligent server 200 described above, duplicate descriptions thereof may not be repeated here.

Hereinafter, another example of the electronic device 100 and an operation method thereof, and another example of the intelligent server 200 and an operation method thereof according to various embodiments will be described. Meanwhile, hereinafter, duplicate descriptions regarding the above-described electronic device 100 and intelligent server 200 may not be repeated.

According to various embodiments, the intelligent system may determine a specific domain from among a plurality of domains included in the category selected to correspond to the user utterance on the basis of a user input.

Figure 18:
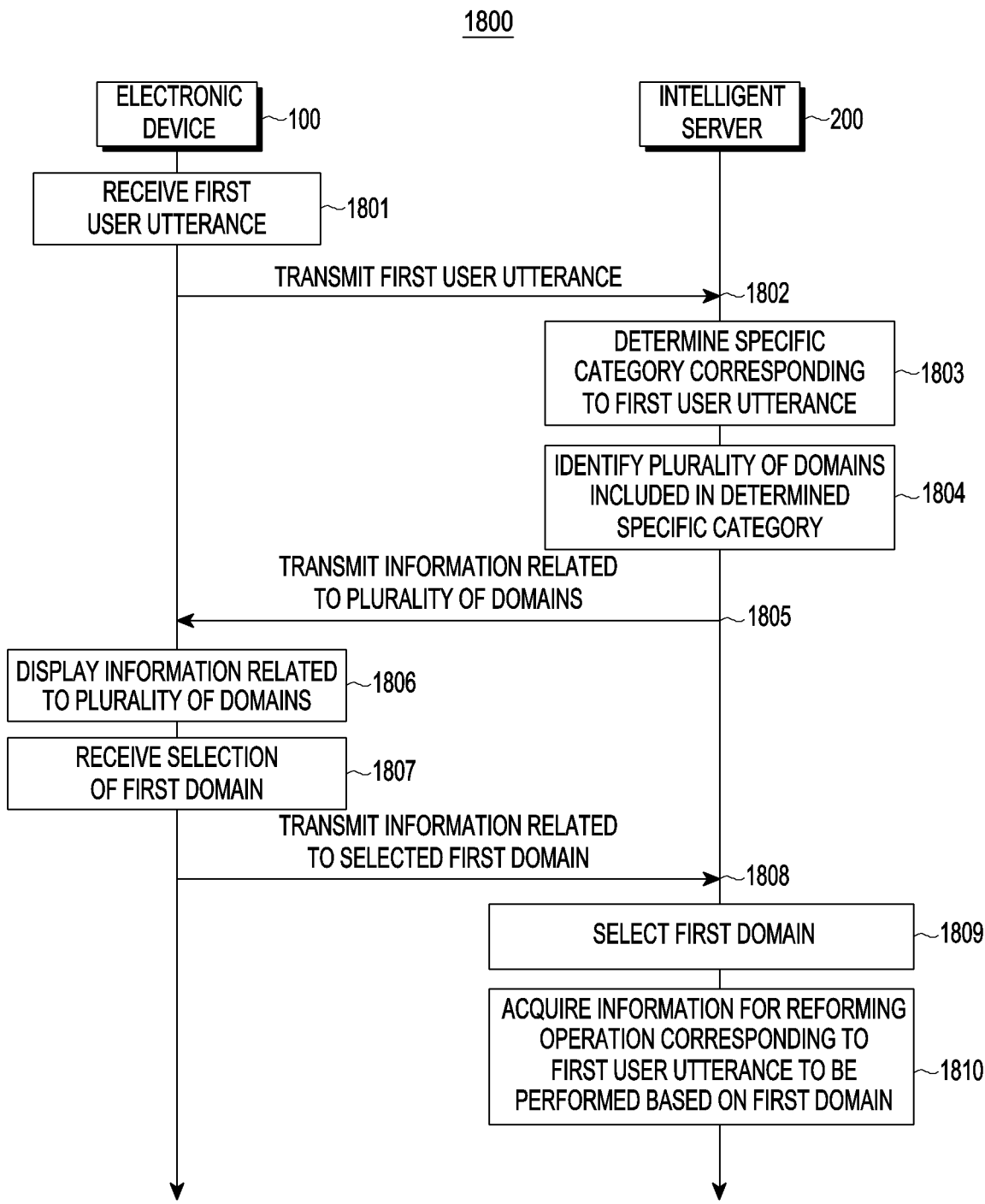
FIG. 18 is a signal flow diagram illustrating an example operation of determining a specific domain according to a user input by an electronic device and an intelligent server according to various embodiments.

FIG. 18 is a flowchart 1800 illustrating an example operation of determining a specific domain according to a user input by an electronic device 100 and an intelligent server 200 according to various embodiments. According to various embodiments, the operations of the electronic device 100 are not limited to the order of the operations of the electronic device 100 illustrated in FIG. 18, and may be performed in a different order from the illustrated order. In addition, according to various embodiments, more operations than the operations of the electronic device 100 shown in FIG. 18 may be performed, or fewer operations than the operations of the electronic device 100 shown in FIG. 18 or at least one operation may be performed. Hereinafter, FIG. 18 will be described with reference to FIGS. 19 and 20.

Figure 19:
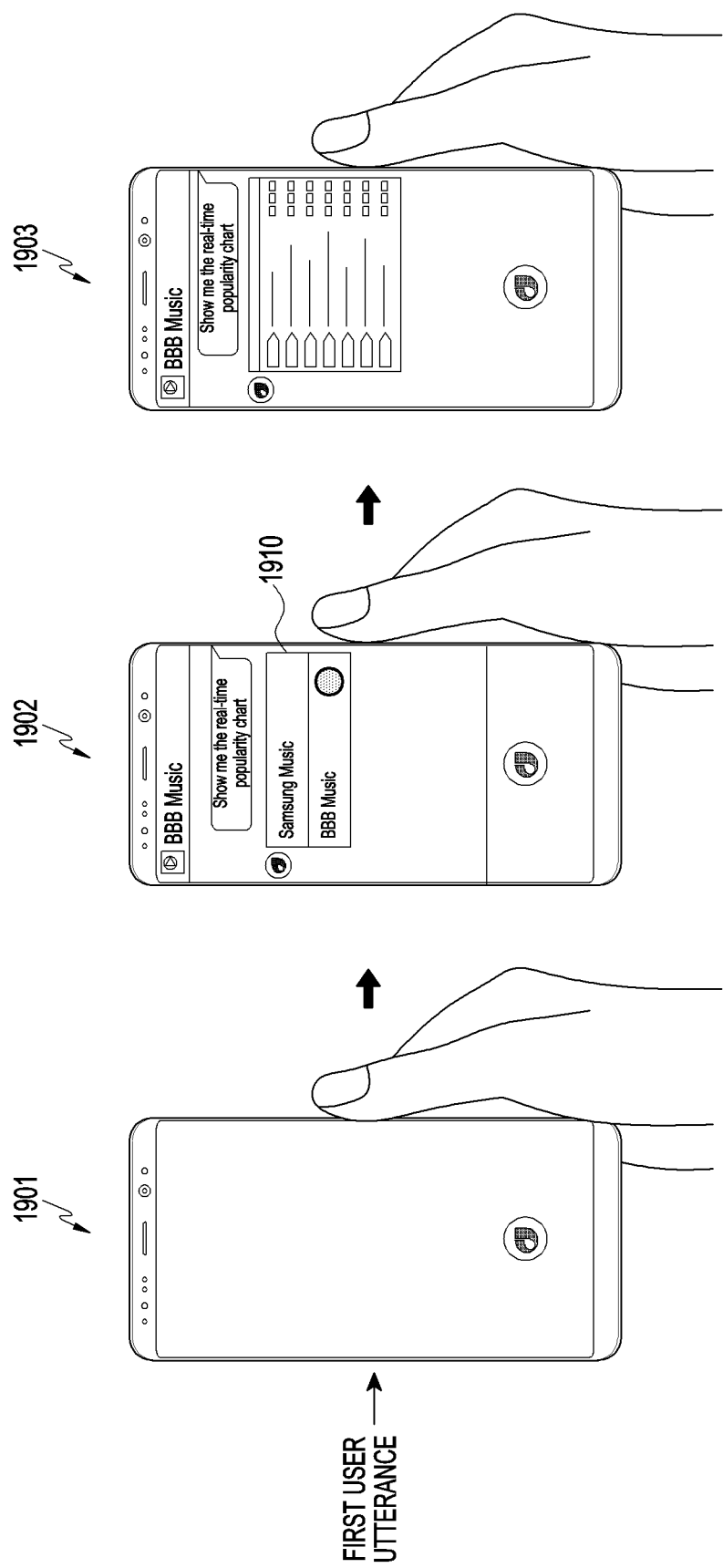
FIG. 19 is a diagram illustrating an example operation of receiving a user input for determining a specific domain by an electronic device according to various embodiments.
Figure 20:
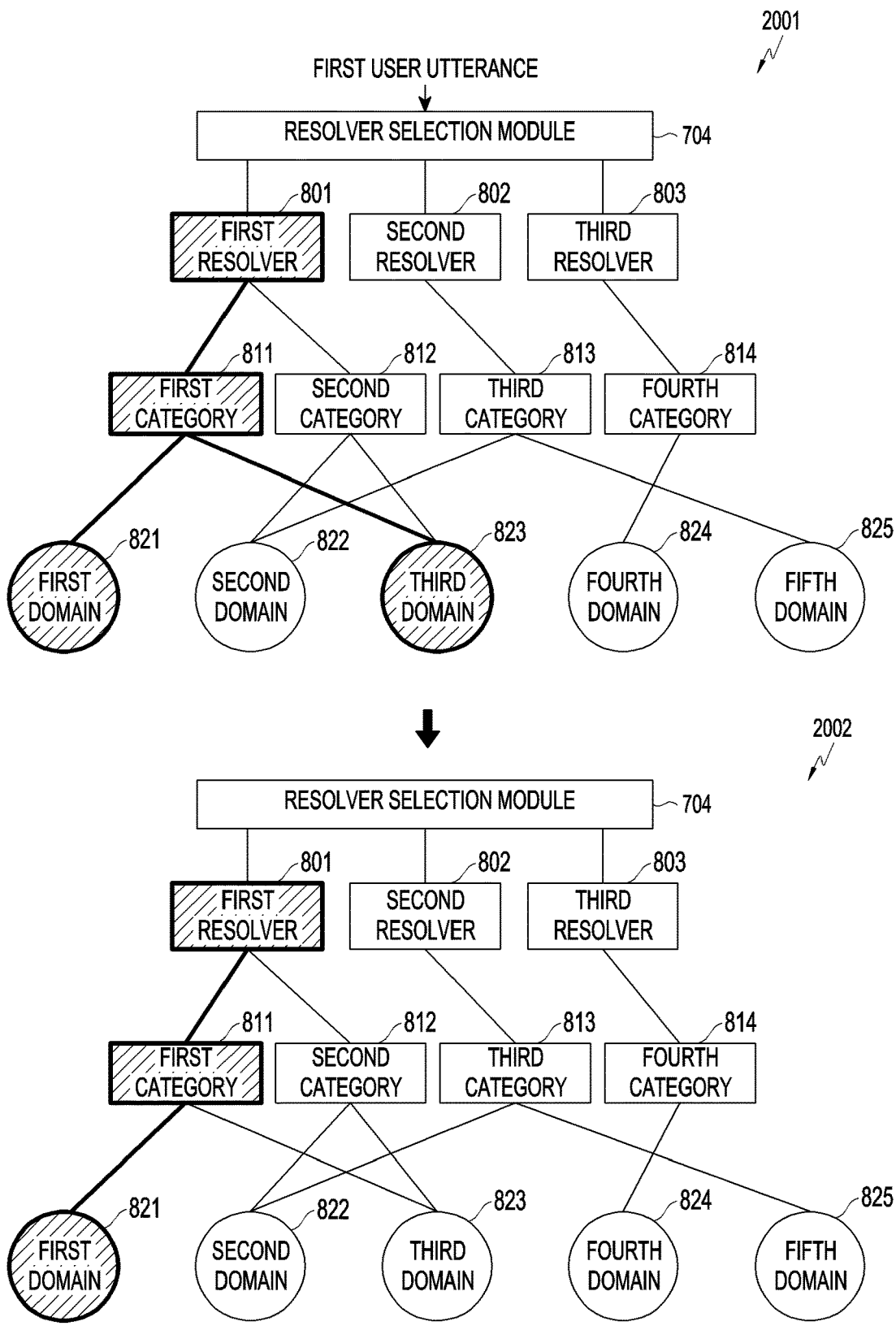
FIG. 20 is a diagram illustrating an example operation of providing a service corresponding to a user utterance by an intelligent server according to various embodiments.

FIG. 19 is a diagram illustrating an example operation of receiving a user input for determining a specific domain by an electronic device 100 according to various embodiments. FIG. 20 is a diagram illustrating an example operation of providing a service corresponding to a user utterance by an intelligent server 200 according to various embodiments.

According to various embodiments, the electronic device 100 may receive a first user utterance in operation 1801, and may transmit the first user utterance to the intelligent server 200 in operation 1802. For example, as denoted by 1901 in FIG. 19, the electronic device 100 may receive a first user utterance (e.g., "Show me the real-time popularity chart."), and may transmit the received first user utterance to the intelligent server 200. Since operations 1801 and 1802 of the electronic device 100 may be performed in the same or similar manner as operations 1201 and 1202 of the electronic device 100 described above, duplicate descriptions thereof may not be repeated here.

According to various embodiments, the intelligent server 200 may determine a specific category corresponding to the first user utterance in operation 1803. For example, the resolver selection module 704 may select a first resolver 801 corresponding to the first user utterance (e.g., "Show me the real-time popularity chart."), and the first resolver 801 may select a first category 811 as denoted by 2001 in FIG. 20. Since operation 1803 of the intelligent server 200 may be performed in the same or similar manner as operation 1203 of the intelligent server 200 described above, a duplicate description thereof may not be repeated here.

According to various embodiments, the intelligent server 200 may identify a plurality of domains included in the determined specific category in operation 1804, and may transmit information related to the plurality of domains to the electronic device 100 in operation 1805.

For example, a domain selection module (not shown) may identify a plurality of domains (e.g., the first domain 821 and the third domain 823) included in the selected first category 811 as denoted by 2001 in FIG. 20. The intelligent server 200 may transmit information on the plurality of domains 821 and 823 included in the identified first category 811 to the electronic device 100. In this case, the intelligent server 200 may generate a UI for displaying a plurality of domains and receiving a selection on the basis of the NLU/TTS module, and may transmit information on the generated UI to the electronic device 100.

According to various embodiments, the electronic device 100 may display information related to the plurality of domains in operation 1806, may receive an input for selecting a first domain in operation 1807, and may transmit information related to the selected first domain to the intelligent server 200 in operation 1808. For example, the electronic device 100, as denoted by 1902 in FIG. 19, may display information 1910 on the plurality of domains 821 and 823 on the basis of the received information on the plurality of domains, and may receive an input for selecting a specific domain (e.g., the first domain 821 (e.g., BBB Music)) from among the plurality of domains. The electronic device 100 may transmit information related to the selected first domain 821 (e.g., BBB Music) to the intelligent server 200.

According to various embodiments, the intelligent server 200 may select the first domain in operation 1809, and may acquire information for performing an operation corresponding to the first user utterance on the basis of the first domain in operation 1810.

For example, a domain selection module (not shown) may select a first domain 821 from among the plurality of domains 821 and 823 on the basis of the received information related to the first domain 821 as denoted by 2002 in FIG. 20. The selected first domain 821 may process the first user utterance to generate processing result information (e.g., a deeplink or a UI/UX) of the first user utterance.

According to various embodiments, the intelligent server 200 may transmit the processing result information of the first user utterance by the first domain 821 to the electronic device 100, and the electronic device 100 may perform at least one operation on the basis of the processing result information as denoted by 1903 in FIG. 19. Since at least one operation on the basis of the processing result information of the electronic device 100 may be performed in the same or similar manner as operation 1003 of the electronic device 100 described above, a duplicate description thereof may not be repeated.

The disclosure is not limited to the above description, and the intelligent server 200 may automatically select the first domain on the basis of additional information (e.g., information on the application usage pattern of the user or the like) as well as the user selection. An operation of selecting the first domain on the basis of the additional information (e.g., information on the application usage pattern of the user or the like) by the intelligent server 200 will be described in detail with reference to FIGS. 21 to 22.

Hereinafter, another example of the electronic device 100 and an operation method thereof, and another example of the intelligent server 200 and an operation method thereof according to various embodiments will be described. Meanwhile, hereinafter, duplicate descriptions regarding the above-described electronic device 100 and intelligent server 200 may not be repeated.

According to various embodiments, the intelligent system may search for information related to the user utterance from an external server on the basis of a variety of additional information in addition to the user utterance, and may provide a service corresponding to the user utterance on the basis of the searched information. For example, respective modules included in the intelligent server 200 may perform an operation of analyzing the user utterance on the basis of the received additional information.

According to various embodiments, the additional information may include information on the application usage pattern of the user of the electronic device 100, user-related information including personal information of the user (e.g., age, gender, etc.), information on the execution state of an application (e.g., foreground state, etc.), information on the amount of resource allocation, information related to the state of the electronic device 100 including information on the remaining battery level and the like, and context information related to the current surrounding situation (e.g., the location of the electronic device 100, weather, and the like).

Figure 21:
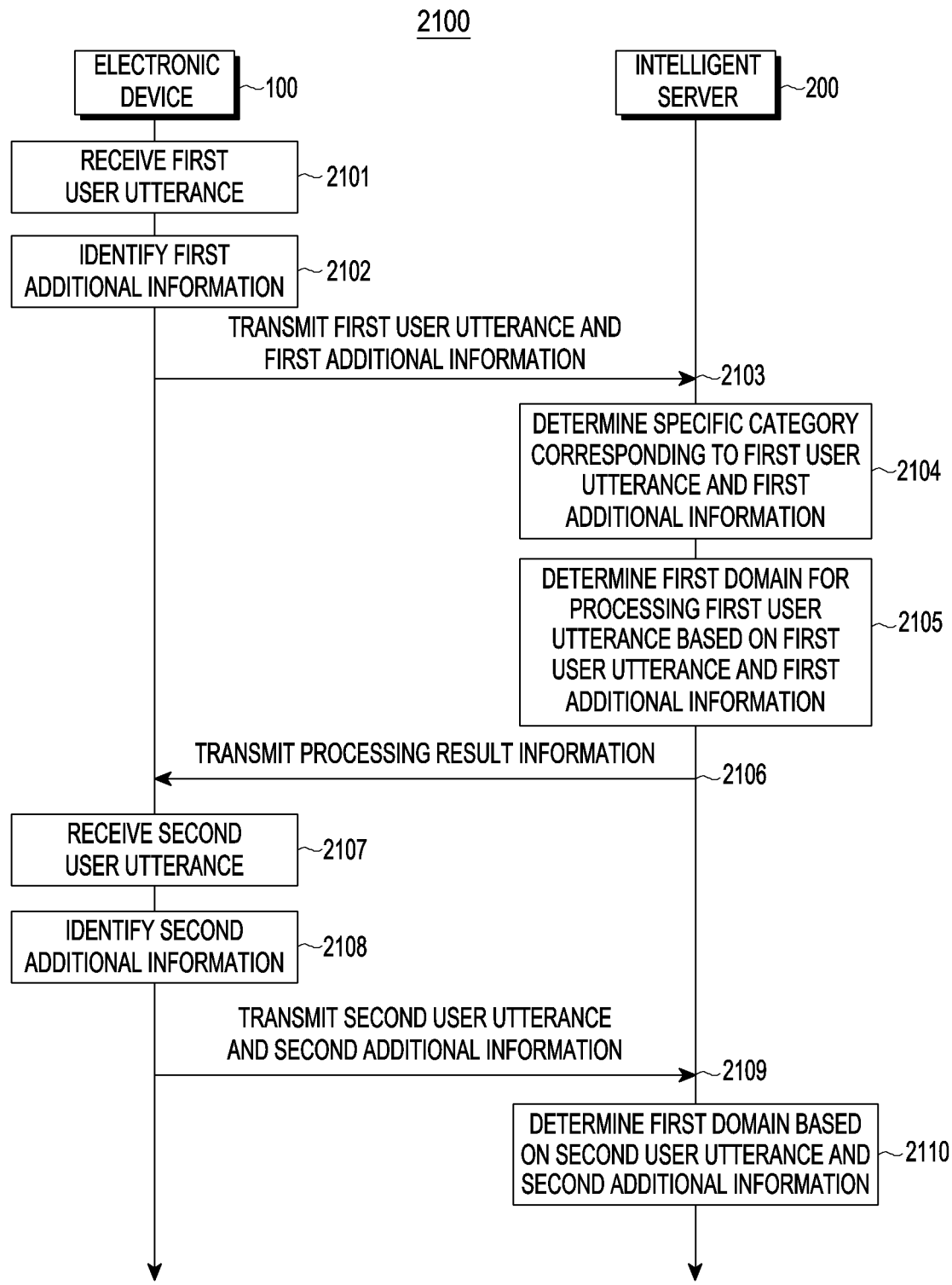
FIG. 21 is a signal flow diagram illustrating an example operation of determining a domain on the basis of additional information by an electronic device and an intelligent server according to various embodiments.

FIG. 21 is a signal flow diagram 2100 illustrating an example operation of determining a domain on the basis of additional information by an electronic device 100 and an intelligent server 200 according to various embodiments. According to various embodiments, the operations of the electronic device 100 are not limited to the order of the operations of the electronic device 100 illustrated in FIG. 21, and may be performed in a different order from the illustrated order. In addition, according to various embodiments, more operations than the operations of the electronic device 100 shown in FIG. 21 may be performed, or fewer operations than the operations of the electronic device 100 shown in FIG. 21 or at least one operation may be performed. Hereinafter, FIG. 21 will be described with reference to FIG. 22.

Figure 22:
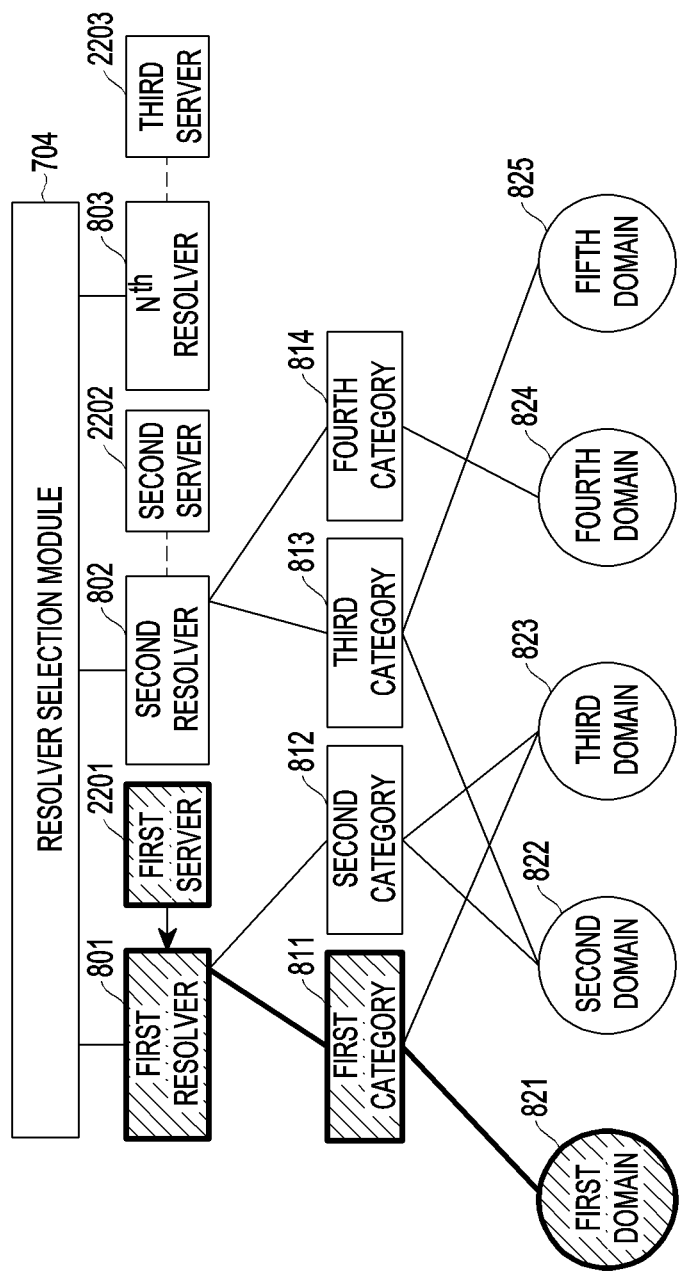
FIG. 22 is a diagram illustrating an example operation of determining a domain on the basis of additional information by an intelligent server according to various embodiments.

FIG. 22 is a diagram illustrating an example operation of determining a domain on the basis of additional information by an intelligent server 200 according to various embodiments.

According to various embodiments, the electronic device 100 may receive a first user utterance in operation 2101. Since operation 2101 of the electronic device 100 may be performed in the same or similar manner as operations 1201 and 1801 of the electronic device 100 described above, a duplicate description thereof may not be repeated here.

According to various embodiments, the electronic device 100 may identify first additional information in operation 2102. For example, the electronic device 100 may identify at least one piece of additional information at the time at which the first user utterance is received. At least one piece of additional information to be identified may be additional information indicating a plurality of types of information, as well as additional information indicating a single type of information. Since at least one piece of additional information to be identified has been described above, a duplicate description thereof may not be repeated.

According to various embodiments, the electronic device 100 may transmit the first user utterance and first additional information to the intelligent server 200 in operation 2103.

According to various embodiments, the intelligent server 200 may determine a specific category corresponding to the first user utterance and the first additional information in operation 2104.

According to various embodiments, the resolver selection module 704 may select a specific resolver (e.g., the first resolver 801) corresponding to the received first user utterance from among a plurality of resolvers 801, 802, and 803. A duplicate description of the operation of selecting the resolver corresponding to the first user utterance by the resolver selection module 704 may not be repeated here. The resolver selection module 704 may further refer to the received additional information in the operation of analyzing the first user utterance in order to select the resolver. For example, the resolver selection module 704 may semantically/syntactically analyze at least a portion of the first user utterance with reference to the received additional information in order to identify the user intent included in the first user utterance.

According to various embodiments, the resolvers 801, 802, and 803 may perform a searching operation using external search servers 2201, 2202, and 2203 with library capsules (not shown) assigned to the resolvers, thereby selecting a category.

For example, referring to FIG. 22, the first resolver 801 may select a specific category (e.g., the first category 811) corresponding to the received first user utterance from among a plurality of categories 811 and 812 associated with the first resolver 801. A duplicate description of the operation of selecting the category corresponding to the first user utterance by the resolver may not be repeated here. The first resolver 801 may further refer to the received additional information in the operation of analyzing the first user utterance in order to select the category. For example, if the first user utterance (e.g., "Change the mode of the air conditioner for children") is received, the first resolver 801 may generate a search query (e.g., a search query to find an air conditioner in the current place) on the basis of the first user utterance and the received additional information (e.g., information on the location of the electronic device 100), and may transmit the generated search query to a first server (e.g., a cloud server) 2201. The first resolver 801 may receive a search result (e.g., information on the air conditioner registered in the cloud server 2201 by the user) corresponding to the search query, which is transmitted from the first server 2201, and may identify a first category 811 (e.g., including a domain for controlling the air conditioner) corresponding to the received search result.

The operation of the resolver using the external search server as described above may enable more accurate analysis of the user utterance, and the resolver may select a category for processing the user utterance so that the user utterance may be processed by a domain that is appropriate for processing the user utterance, thereby providing the user with an appropriate service corresponding to the user utterance.

According to various embodiments, in operation 2105, the electronic device 100 may determine a first domain for processing the first user utterance on the basis of the first user utterance and first additional information. For example, a domain selection module (not shown) may identify first additional information for processing the first user utterance (e.g., information on the location of the electronic device 100 and information on the application usage pattern of the user), may identify an analysis results on the basis of the first additional information (e.g., the user frequently uses a first application when the user is outside), and may select a first domain 821 corresponding to the analysis result (e.g., corresponding to the first application) from among the plurality of domains 821 and 823.

According to various embodiments, the intelligent server 200 may transmit processing result information in operation 2106. The operation of performing at least one operation by the electronic device 100 on the basis of the received processing result information may be the same as or similar to the operation of the electronic device 100 described above according to operation 1206 of the intelligent server 200, so a duplicate description thereof may not be repeated here.

According to various embodiments, the electronic device 100 may receive a second user utterance in operation 2107. Since operation 2107 of the electronic device 100 may be performed in the same or similar manner as operation 1207 of the electronic device 100 described above, a duplicate description thereof may not be repeated here.

According to various embodiments, the electronic device 100 may identify second additional information in operation 2108. For example, the electronic device 100 may identify at least one piece of additional information at the time at which the second user utterance is received.

According to various embodiments, the electronic device 100 may transmit the second user utterance and second additional information in operation 2109.

According to various embodiments, the intelligent server 200 may determine a first domain on the basis of the second user utterance and the second additional information in operation 2110. Since the operation of each module of the intelligent server 200 in operation 2110 is the same as or similar to the operation of each module of the intelligent server 200 in operation 2104, a duplicate description thereof may not be repeated here.

According to various embodiments, the intelligent server 200 may identify whether a specified condition is satisfied on the basis of the second additional information, and if the specified condition is satisfied, may reselect the predetermined first domain 821 upon receiving the first user utterance without performing the operation of the resolver selection module 704, the resolver, and the domain selection module.

For example, the intelligent server 200 may identify, as the second additional information, information indicating that a first application corresponding to the first domain 821 is running in the foreground of the electronic device 100, may identify that a specified condition is satisfied (for example, an application corresponding to the predetermined domain is running in the electronic device 100), and may reselect the predetermined first domain 821 according thereto.

As another example, the intelligent server 200 may identify, as the second additional information, information on the time at which the electronic device 100 provides a speech service on the basis of the first domain 821, may identify that a specified condition is satisfied (for example, within a specified time after the time at which the speech service is provided on the basis of the first domain 821), and may reselect the predetermined first domain 821 according thereto.

According to various embodiments, thereafter, the operation in which the intelligent server 200 inquires whether to process the second user utterance in the reselected first domain 821 and selects the second domain 822 to process the second user utterance may be performed in the same or similar manner as operations 1209 to 1212 of the intelligent server 200 described above, so a duplicate description thereof may not be repeated.

Hereinafter, another example of the electronic device 100 and an operation method thereof, and another example of the intelligent server 200 and an operation method thereof according to various embodiments will be described. Duplicate descriptions regarding the above-described electronic device 100 and intelligent server 200 may not be repeated here.

According to various embodiments, if it is identified that the received user utterance is not able to be processed by any domain included in the predetermined category, the intelligent system may cause the user utterance to be processed by another domain included in another category.

Hereinafter, another example of the electronic device 100 and an operation method thereof, and another example of the intelligent server 200 and an operation method thereof according to various embodiments will be described. Duplicate descriptions regarding the above-described electronic device 100 and intelligent server 200 may not be repeated.

Figure 23:
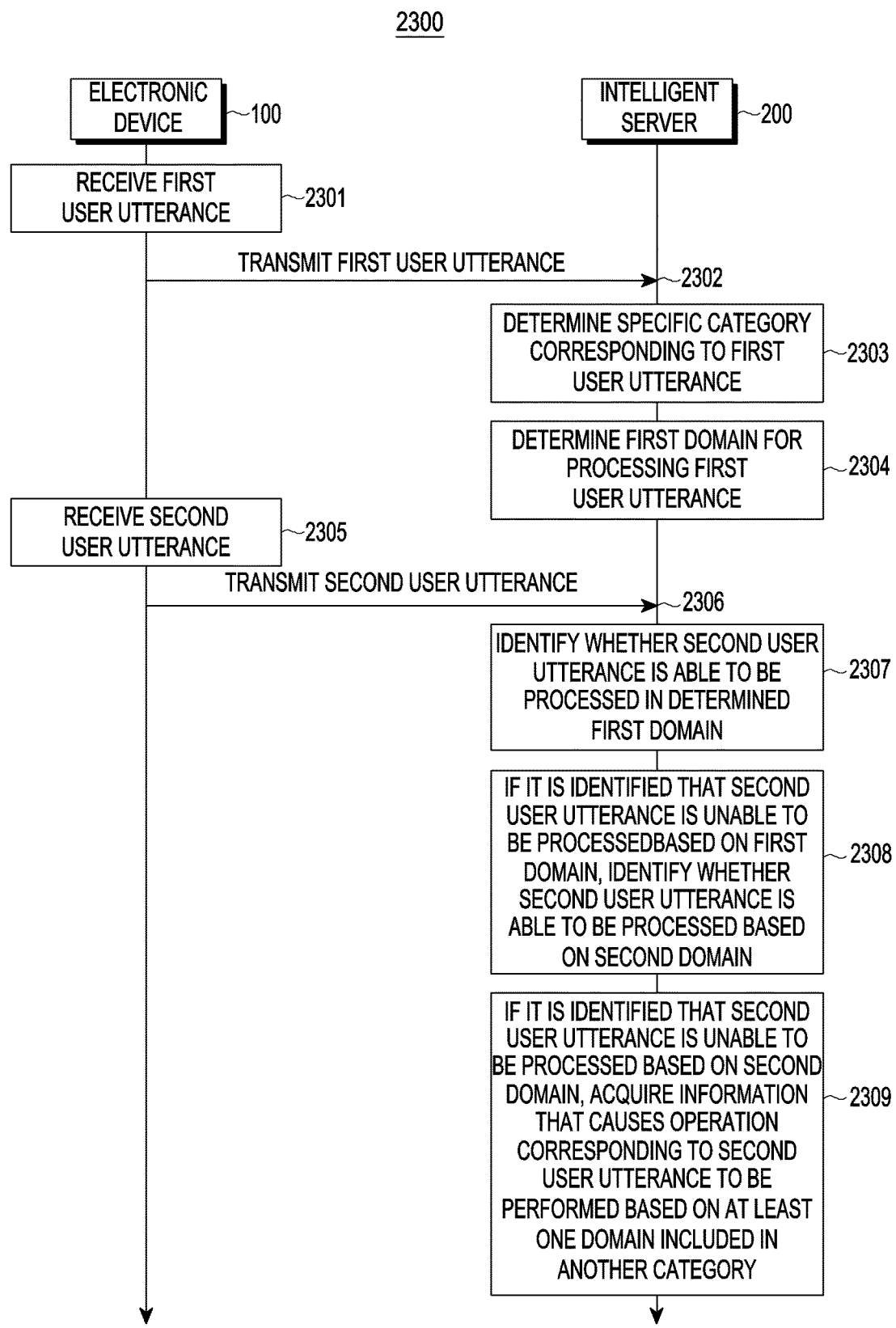
FIG. 23 is a signal flow diagram illustrating an example operation of providing a service corresponding to a user utterance by an electronic device and an intelligent server according to various embodiments.

FIG. 23 is a signal flow diagram 2300 illustrating an example operation of providing a service corresponding to a user utterance by an electronic device 100 and an intelligent server 200 according to various embodiments. According to various embodiments, the operations of the electronic device 100 are not limited to the order of the operations of the electronic device 100 illustrated in FIG. 23, and may be performed in a different order from the illustrated order. In addition, according to various embodiments, more operations than the operations of the electronic device 100 shown in FIG. 23 may be performed, or fewer operations than the operations of the electronic device 100 shown in FIG. 23 or at least one operation may be performed. Hereinafter, FIG. 23 will be described with reference to FIGS. 24, 25A, and 25B.

Figure 24:
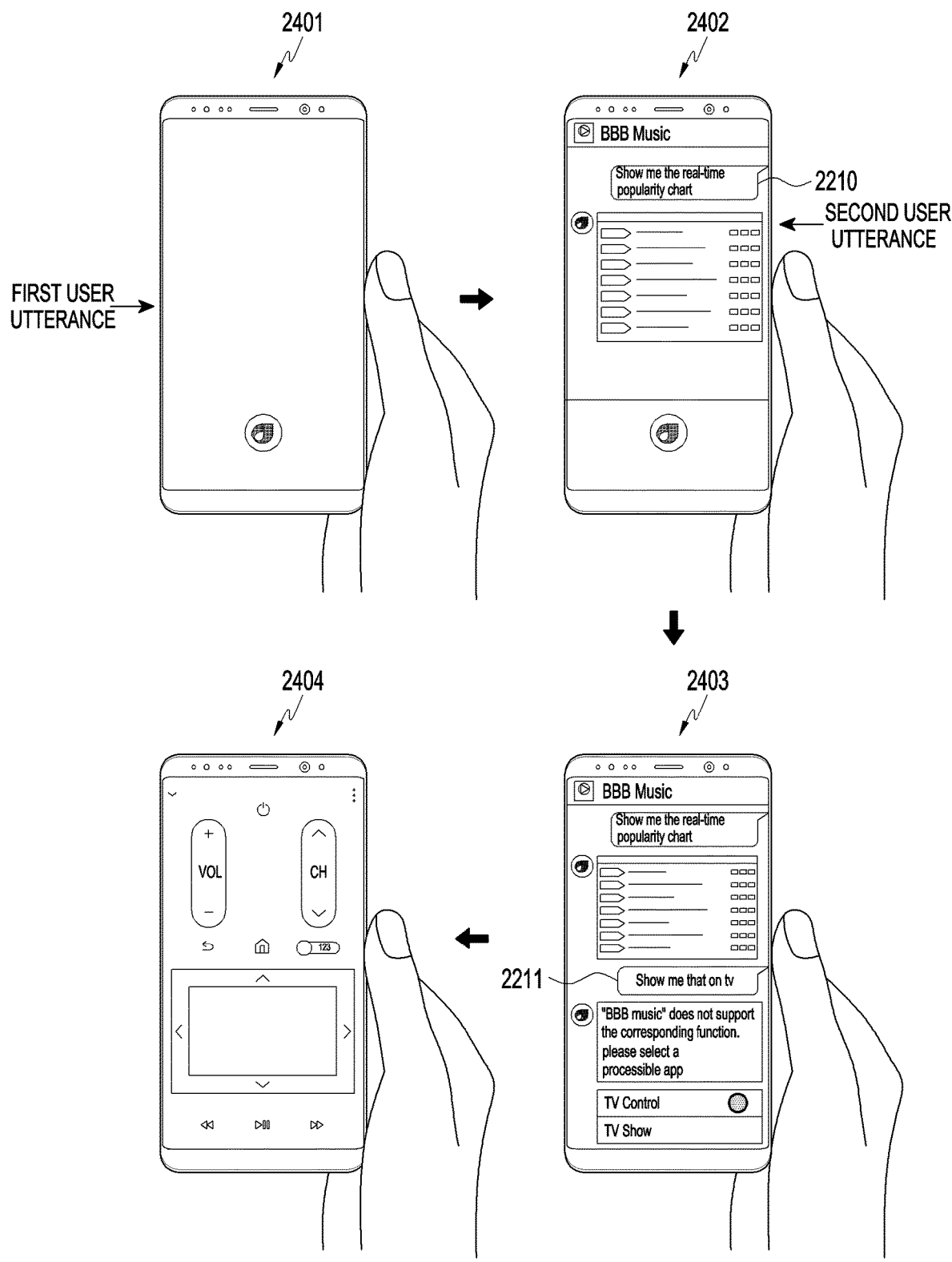
FIG. 24 is a diagram illustrating an example operation of providing a service corresponding to a user utterance by an electronic device according to various embodiments.
Figure 25A:
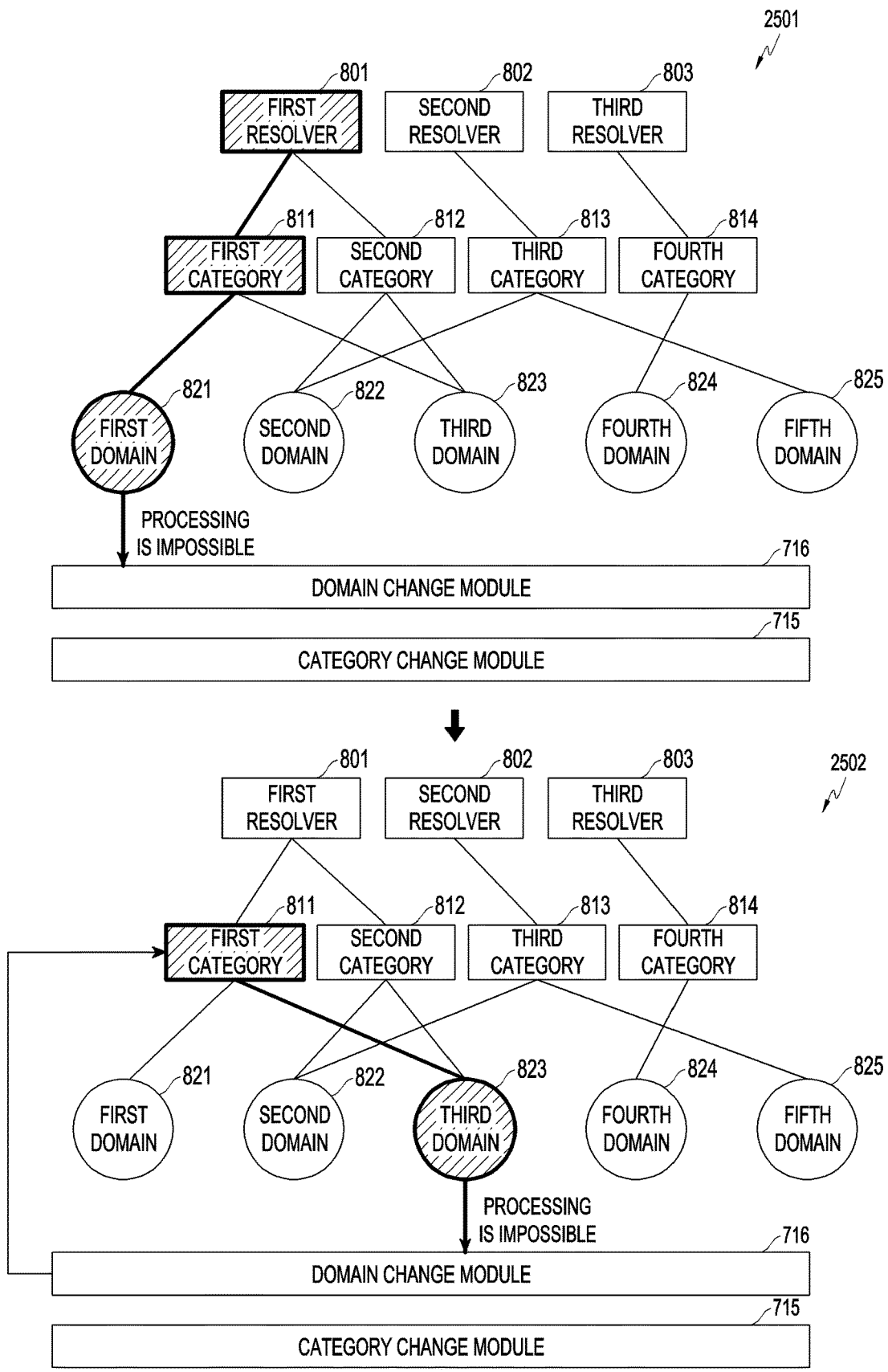
FIG. 25A is a diagram illustrating an example operation of providing a service corresponding to a user utterance by an intelligent server according to various embodiments.
Figure 25B:
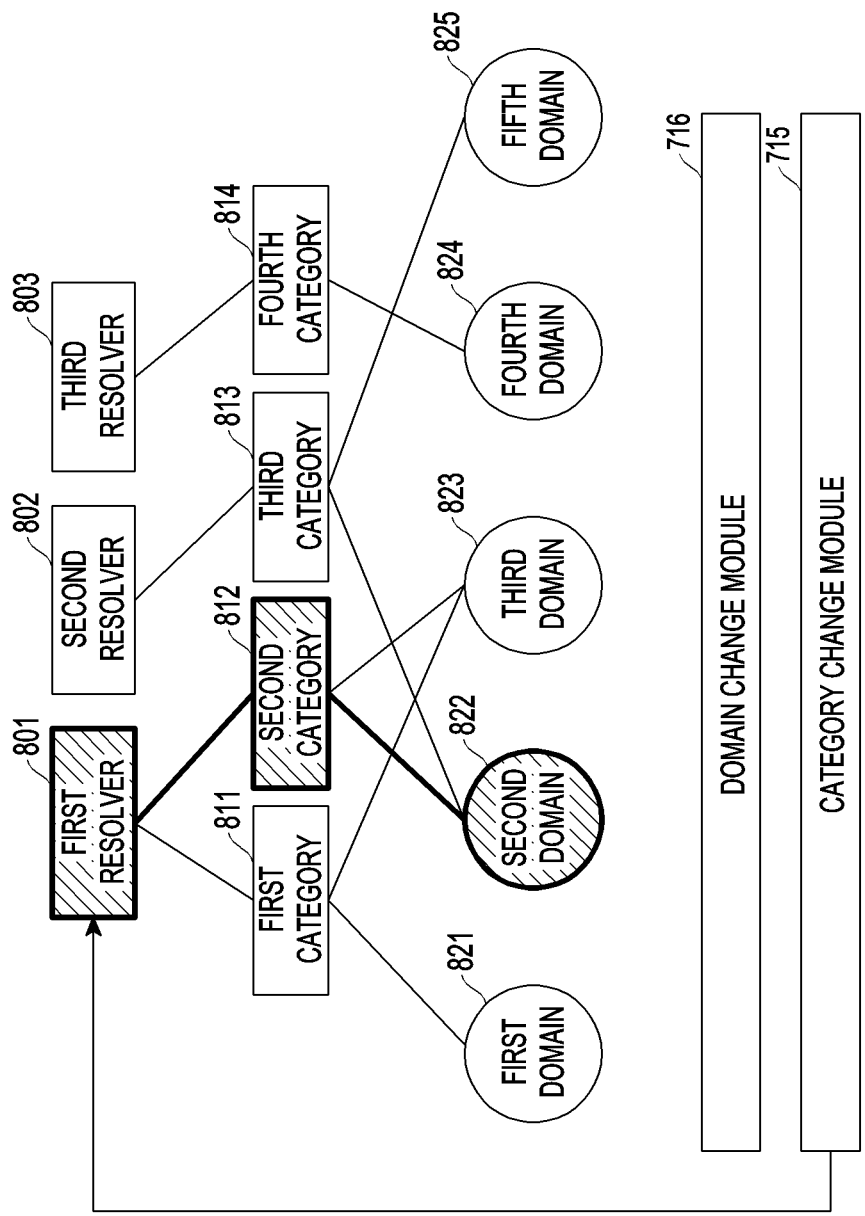
FIG. 25B is a diagram illustrating an example operation of providing a service corresponding to a user utterance by an intelligent server according to various embodiments.

FIG. 24 is a diagram illustrating an example operation of providing a service corresponding to a user utterance by an electronic device 100 according to various embodiments. FIG. 25A is a diagram illustrating an example operation of providing a service corresponding to a user utterance by an intelligent server 200 according to various embodiments. FIG. 25B is a diagram illustrating an example operation of providing a service corresponding to a user utterance by an intelligent server 200 according to various embodiments.

According to various embodiments, the electronic device 100 may receive a first user utterance in operation 2301, and may transmit the first user utterance to the intelligent server 200 in operation 2302. For example, as denoted by 2401 in FIG. 24, the electronic device 100 may receive the first user utterance, and may transmit the same to the intelligent server 200. Since operations 2301 and 2302 of the electronic device 100 may be performed in the same or similar manner as operations 1201 and 1202 of the electronic device 100 described above, duplicate descriptions thereof may not be repeated here.

According to various embodiments, the intelligent server 200 may determine a specific category corresponding to the first user utterance in operation 2303, and may determine a first domain for processing the first user utterance in operation 2304. Since operations 2303 and 2304 of the electronic device 100 may be performed in the same or similar manner as operations 1203 and 1204 of the electronic device 100 described above, duplicate description thereof may not be repeated here.

According to various embodiments, the electronic device 100 may receive a second user utterance in operation 2305, and may transmit the second user utterance to the intelligent server 200 in operation 2306. For example, the electronic device 100 may receive the second user utterance after displaying a processing result on the basis of the first user utterance 2210 as denoted by 2402 in FIG. 24. Since operations 2305 and 2306 of the electronic device 100 may be performed in the same or similar manner as operations 1207 and 1208 of the electronic device 100 described above, duplicate descriptions thereof may not be repeated here.

According to various embodiments, the intelligent server 200 may identify whether the second user utterance is able to be processed in the determined first domain in operation 2307, and if it is identified that the second user utterance is unable to be processed on the basis of the first domain, may identify whether the second user utterance is able to be processed on the basis of a second domain in operation 2308. For example, the domain change module 716 may identify that the second user utterance is unable to be processed by the first domain 821 as denoted by 2501 in FIG. 25A, and may identify whether the second user utterance is able to be processed by another domain (e.g., the third domain 823) in the first category 811. Since operations 2307 and 2308 of the intelligent server 200 may be performed in the same or similar manner as operations 1210 and 1211 of the electronic device 100 described above, duplicate descriptions thereof may not be repeated here.

According to various embodiments, if it is identified that the second user utterance is unable to be processed on the basis of the second domain, the intelligent server 200 may acquire information that causes an operation corresponding to the second user utterance to be performed on the basis of at least one domain included in another category in operation 2309.

According to various embodiments, the domain change module 716 may identify that the second user utterance is unable to be processed by the first domain 821 and any domain (e.g., the third domain 823) in the first category 811 as denoted by 2502 in FIG. 25A. In response to identifying that the second user utterance is not able to be processed by any domain 821 or 823 in the first category 811, the domain change module 716 may make a request for changing of the category to the category change module 715.

According to various embodiments, the category change module 715 may identify whether the second user utterance is able to be processed by domains included in the category 812, 813, or 814 other than the first category 811 among a plurality of categories 811, 812, 813, and 814.

Accordingly, if it is identified that the second user utterance is able to be processed by a specific domain (e.g., the second domain 822) in at least one category (e.g., the second category 812) other than the first category 811 among the plurality of categories, as shown in FIG. 25B, the category change module 715 may cause the second user utterance to be processed by a specific domain (e.g., the second domain 822).

Thereafter, the processing of the second user utterance by the intelligent server 200 and the operation of the electronic device 100 according thereto have been described above, so duplicate descriptions thereof may not be repeated.

According to various embodiments, the electronic device 100 may display information on the domains included in another category capable of processing the second user utterance 2211 as denoted by 2403 in FIG. 24, and if one domain (e.g., TV control) is selected, may display a result of processing the second user utterance by the one domain as denoted by 2404 in FIG. 24 (e.g., a screen for controlling the TV by a TV control application is displayed).

Figure 26:
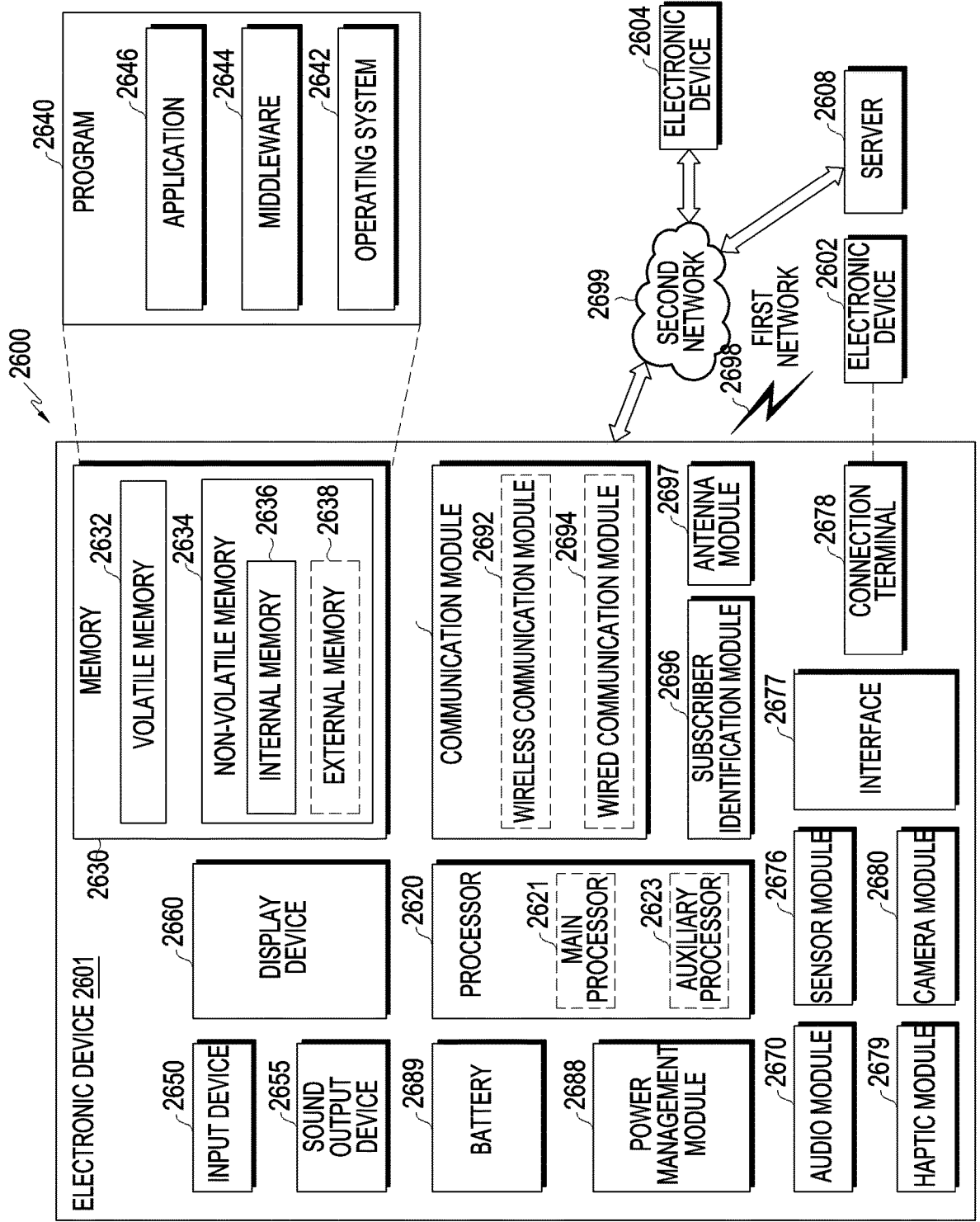
FIG. 26 is a block diagram illustrating an example electronic device in a network environment according to various embodiments.

FIG. 26 is a block diagram illustrating an example electronic device 2601 in a network environment 2600 according to various embodiments.

Hereinafter, the description of the electronic device 2601 may be applied to devices (e.g., the intelligent server 200, the electronic device 101, etc.) included in the above-described intelligent system.

Referring to FIG. 26, the electronic device 2601 in the network environment 2600 may communicate with an electronic device 2602 via a first network 2698 (e.g., a short-range wireless communication network), or an electronic device 2604 or a server 2608 via a second network 2699 (e.g., a long-range wireless communication network). According to an embodiment, the electronic device 2601 may communicate with the electronic device 2604 via the server 2608. According to an embodiment, the electronic device 2601 may include a processor 2620, memory 2630, an input device 2650, a sound output device 2655, a display device 2660, an audio module 2670, a sensor module 2676, an interface 2677, a haptic module 2679, a camera module 2680, a power management module 2688, a battery 2689, a communication module 2690, a subscriber identification module (SIM) 2696, or an antenna module 2697. In some embodiments, at least one (e.g., the display device 2660 or the camera module 2680) of the components may be omitted from the electronic device 2601, or one or more other components may be added in the electronic device 2601. In some embodiments, some of the components may be implemented as single integrated circuitry. For example, the sensor module 2676 (e.g., a fingerprint sensor, an iris sensor, or an illuminance sensor) may be implemented as embedded in the display device 2660 (e.g., a display).

The processor 2620 may execute, for example, software (e.g., a program 2640) to control at least one other component (e.g., a hardware or software component) of the electronic device 2601 coupled with the processor 2620, and may perform various data processing or computation. According to an embodiment, as at least part of the data processing or computation, the processor 2620 may load a command or data received from another component (e.g., the sensor module 2676 or the communication module 2690) in volatile memory 2632, process the command or the data stored in the volatile memory 2632, and store resulting data in non-volatile memory 2634. According to an embodiment, the processor 2620 may include a main processor 2621 (e.g., a central processing unit (CPU) or an application processor (AP)), and an auxiliary processor 2623 (e.g., a graphics processing unit (GPU), an image signal processor (ISP), a sensor hub processor, or a communication processor (CP)) that is operable independently from, or in conjunction with, the main processor 2621. Additionally or alternatively, the auxiliary processor 2623 may be adapted to consume less power than the main processor 2621, or to be specific to a specified function. The auxiliary processor 2623 may be implemented as separate from, or as part of the main processor 2621.

The auxiliary processor 2623 may control, for example, at least some of functions or states related to at least one component (e.g., the display device 2660, the sensor module 2676, or the communication module 2690) among the components of the electronic device 2601, instead of the main processor 2621 while the main processor 2621 is in an inactive (e.g., sleep) state, or together with the main processor 2621 while the main processor 2621 is in an active (e.g., executing an application) state. According to an embodiment, the auxiliary processor 2623 (e.g., an image signal processor or a communication processor) may be implemented as part of another component (e.g., the camera module 2680 or the communication module 2690) functionally related to the auxiliary processor 2623.

The memory 2630 may store various data used by at least one component (e.g., the processor 2620 or the sensor module 2676) of the electronic device 2601. The various data may include, for example, software (e.g., the program 2640) and input data or output data for a command related thereto. The memory 2630 may include the volatile memory 2632 or the non-volatile memory 2634.

The program 2640 may be stored in the memory 2630 as software, and may include, for example, an operating system (OS) 2642, middleware 2644, or an application 2646.

The input device 2650 may receive a command or data to be used by a component (e.g., the processor 2620) of the electronic device 2601, from the outside (e.g., a user) of the electronic device 2601. The input device 2650 may include, for example, a microphone, a mouse, a keyboard, or a digital pen (e.g., a stylus pen).

The sound output device 2655 may output sound signals to the outside of the electronic device 2601. The sound output device 2655 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 2660 may visually provide information to the outside (e.g., a user) of the electronic device 2601. The display device 2660 may include, for example, a display, a hologram device, or a projector and control circuitry to control a corresponding one of the display, hologram device, and projector. According to an embodiment, the display device 2660 may include touch circuitry adapted to detect a touch, or sensor circuitry (e.g., a pressure sensor) adapted to measure the intensity of force incurred by the touch.

The audio module 2670 may convert a sound into an electrical signal and vice versa. According to an embodiment, the audio module 2670 may obtain the sound via the input device 2650, or output the sound via the sound output device 2655 or an external electronic device (e.g., an electronic device 2602 (e.g., a speaker or a headphone)) directly or wirelessly coupled with the electronic device 2601.

The sensor module 2676 may detect an operational state (e.g., power or temperature) of the electronic device 2601 or an environmental state (e.g., a state of a user) external to the electronic device 2601, and then generate an electrical signal or data value corresponding to the detected state. According to an embodiment, the sensor module 2676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2677 may support one or more specified protocols to be used for the electronic device 2601 to be coupled with the external electronic device (e.g., the electronic device 2602) directly or wirelessly. According to an embodiment, the interface 2677 may include, for example, a high definition multimedia interface (HDMI), a universal serial bus (USB) interface, a secure digital (SD) card interface, or an audio interface.

A connecting terminal 2678 may include a connector via which the electronic device 2601 may be physically connected with the external electronic device (e.g., the electronic device 2602). According to an embodiment, the connecting terminal 2678 may include, for example, a HDMI connector, a USB connector, a SD card connector, or an audio connector (e.g., a headphone connector).

The haptic module 2679 may convert an electrical signal into a mechanical stimulus (e.g., a vibration or a movement) or electrical stimulus which may be recognized by a user via his tactile sensation or kinesthetic sensation. According to an embodiment, the haptic module 2679 may include, for example, a motor, a piezoelectric element, or an electric stimulator.

The camera module 2680 may capture a still image and moving images. According to an embodiment, the camera module 2680 may include one or more lenses, image sensors, image signal processors, or flashes.

The power management module 2688 may manage power supplied to the electronic device 2601. According to an embodiment, the power management module 2688 may be implemented as at least part of, for example, a power management integrated circuit (PMIC).

The battery 2689 may supply power to at least one component of the electronic device 2601. According to an embodiment, the battery 2689 may include, for example, a primary cell which is not rechargeable, a secondary cell which is rechargeable, or a fuel cell.

The communication module 2690 may support establishing a direct (e.g., wired) communication channel or a wireless communication channel between the electronic device 2601 and the external electronic device (e.g., the electronic device 2602, the electronic device 2604, or the server 2608) and performing communication via the established communication channel. The communication module 2690 may include one or more communication processors that are operable independently from the processor 2620 (e.g., the application processor (AP)) and support a direct (e.g., wired) communication or a wireless communication. According to an embodiment, the communication module 2690 may include a wireless communication module 2692 (e.g., a cellular communication module, a short-range wireless communication module, or a global navigation satellite system (GNSS) communication module) or a wired communication module 2694 (e.g., a local area network (LAN) communication module or a power line communication (PLC) module). A corresponding one of these communication modules may communicate with the external electronic device via the first network 2698 (e.g., a short-range communication network, such as Bluetooth™, wireless-fidelity (Wi-Fi) direct, or infrared data association (IrDA)) or the second network 2699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2692 may identify and authenticate the electronic device 2601 in a communication network, such as the first network 2698 or the second network 2699, using subscriber information (e.g., international mobile subscriber identity (IMSI)) stored in the subscriber identification module 2696.

The antenna module 2697 may transmit or receive a signal or power to or from the outside (e.g., the external electronic device) of the electronic device 2601. According to an embodiment, the antenna module may include an antenna including a radiating element include a conductive material or a conductive pattern formed in or on a substrate (e.g., PCB). According to an embodiment, the antenna module 2697 may include a plurality of antennas. In such a case, at least one antenna appropriate for a communication scheme used in the communication network, such as the first network 2698 or the second network 2699, may be selected, for example, by the communication module 2690 from the plurality of antennas. The signal or the power may then be transmitted or received between the communication module 2690 and the external electronic device via the selected at least one antenna. According to an embodiment, another component (e.g., a radio frequency integrated circuit (RFIC)) other than the radiating element may be additionally formed as part of the antenna module 2697.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2601 and the external electronic device 2604 via the server 2608 coupled with the second network 2699. Each of the electronic devices 2602 and 2604 may be a device of a same type as, or a different type, from the electronic device 2601. According to an embodiment, all or some of operations to be executed at the electronic device 2601 may be executed at one or more of the external electronic devices 2602, 2604, or 2608. For example, if the electronic device 2601 should perform a function or a service automatically, or in response to a request from a user or another device, the electronic device 2601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2601. The electronic device 2601 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 2640) including one or more instructions that are stored in a storage medium (e.g., internal memory 2636 or external memory 2638) that is readable by a machine (e.g., the electronic device 2601). For example, a processor (e.g., the processor 2620) of the machine (e.g., the electronic device 2601) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments, there may be provided method of operating an electronic device including: receiving a first utterance from a device; determining a specific category corresponding to the received first utterance from among a plurality of categories; determining a first domain for processing the first utterance from among a plurality of domains related to the determined specific category; acquiring information that causes an operation corresponding to the first utterance to be performed based on the determined first domain; receiving a second utterance from the user device; identifying whether the second utterance is able to be processed in the predetermined first domain; based on identifying that the second user utterance is unable to be processed based on the first domain, identifying a second domain among the plurality of domains and identifying whether the second user utterance is able to be processed based on the second domain; and based on identifying that the second user utterance is able to be processed based on the second domain, acquiring information that causes an operation corresponding to the second utterance to be performed based on the second domain.

According to various example embodiments, the operating method, wherein information related to a plurality of applications corresponding to the respective domains is registered in the specific category of the plurality of categories so that the plurality of domains are included in the specific category.

According to various example embodiments, there may be provided the operating method, wherein the first domain is included in at least one category other than the specific category among the plurality of categories.

According to various example embodiments, there may be provided the operating method that further includes: causing the second utterance to be processed in an application corresponding to the second domain; and acquiring a deeplink including information for accessing a graphic element including content related to the application or a specific screen of the application based on the processing result, including information that causes the operation corresponding to the second utterance to be performed.

According to various example embodiments, there may be provided the operating method that further includes: determining a first resolver corresponding to the first utterance from among a plurality of resolvers learned based on utterances; and determining the specific category from among a plurality of categories assigned to the first resolver based on information related to the first utterance.

According to various example embodiments, there may be provided the operating method, wherein the information related to the first utterance includes at least one piece of information on a device acquired from the first utterance, information on a specific word acquired from the first utterance, information indicating intent acquired from the first utterance, or information indicating a result of searching performed based on the first utterance.

According to various example embodiments, there may be provided operating method that further includes: receiving context information related to the first utterance together with the first utterance; and selecting the specific category from among the plurality of categories assigned to the resolver based on the information related to the first utterance and the context information.

According to various example embodiments, there may be provided the operating method that further includes: transmitting information related to the plurality of related domains to the device; receiving, from the device, first information indicating that the first domain is selected from among the plurality of domains; and determining the first domain from among the plurality of domains based on the first information.

According to various example embodiments, there may be provided the operating method that further includes: based on a specified condition related to the second utterance being satisfied after the first domain is determined, identifying whether the second utterance is able to be processed by the first domain, wherein the specified condition related to the second utterance includes at least one of a case in which the second utterance is received within a specified time from a time at which the first domain is determined or a case in which information indicating that a first application related to the first domain is running in a foreground state in the device is received together with the second user utterance.

According to various example embodiments, there may be provided operating method that further includes: acquiring second information indicating that the second utterance is unable to be processed by the first domain; identifying at least one domain other than the first domain, which is included in the specific category, in response to acquiring the second information; producing a score related to the at least one identified domain; and identifying the second domain having a highest score produced among the at least one domain.

According to various example embodiments, there may be provided the operating method that further includes: based on identifying that the second utterance is unable to be processed by the second domain, identifying at least one domain associated with at least one category other than the specific category from among the plurality of categories; and processing the second utterance by the at least one identified domain.

According to various example embodiments, there may be provided an electronic device including: at least one communication circuit; and at least one processor operatively connected to the at least one communication circuit, wherein the at least one processor may be configured to: control the at least one communication circuit to receive a first utterance from a device; determine a specific category corresponding to the received first utterance from among a plurality of categories; determine a first domain for processing the first utterance from among a plurality of domains related to the determined specific category; acquire information that causes an operation corresponding to the first utterance to be performed based on the determined first domain; control the at least one communication circuit to receive a second utterance from the device; identify whether the second utterance is able to be processed in the predetermined first domain based on identifying that the second user utterance is unable to be processed based on the first domain, identify a second domain from among the plurality of domains and identify whether the second utterance is able to be processed based on the second domain; and based on identifying that the second utterance is able to be processed based on the second domain, acquire information that causes an operation corresponding to the second utterance to be performed based on the second domain.

According to various example embodiments, there may be provided the electronic device, wherein information related to a plurality of applications corresponding to the respective domains is registered in the specific category of the plurality of categories so that the plurality of domains are included in the specific category.

According to various example embodiments, there may be provided the electronic device, wherein the first domain is included in at least one category other than the specific category among the plurality of categories.

According to various example embodiments, there may be provided an electronic device, wherein the at least one processor may be configured to cause the second utterance to be processed in an application corresponding to the second domain, and acquire a deeplink including information for accessing a graphic element including content related to the application or a specific screen of the application based on the processing result, including information that causes the operation corresponding to the second utterance to be performed.

According to various example embodiments, there may be provided the electronic device, wherein the at least one processor may be configured to: control the at least one communication circuit to transmit information related to the plurality of domains related to the determined specific category to the device, control the at least one communication circuit to receive, from the device, first information indicating that the first domain is selected from among the plurality of domains, and determine the first domain among the plurality of domains based on the first information.

According to various example embodiments, there may be provided the electronic device, wherein the at least one processor may be configured, based on a specified condition related to the second utterance being satisfied after the first domain is determined, to identify whether the second utterance is able to be processed by the first domain, and wherein the specified condition related to the second utterance may include at least one of the case in which the second utterance is received within a specified time from a time at which the first domain is determined or the case in which information indicating that a first application related to the first domain is running in a foreground state in the device is received together with the second utterance.

According to various example embodiments, there may be provided the electronic device, wherein the at least one processor may be configured to: acquire second information indicating that the second utterance is unable to be processed by the first domain, identify at least one domain other than the first domain, which is included in the specific category, in response to acquiring the second information, produce a score related to the at least one identified domain, and identify the second domain having the highest score produced among the at least one domain.

According to various example embodiments, there may be provided the electronic device, wherein the at least one processor may be configured, based on identifying that the second utterance is unable to be processed by the second domain, to identify at least one domain associated with at least one category other than the specific category from among the plurality of categories, and to process the second utterance by the at least one identified domain.

According to various example embodiments, there may be provided an electronic device including: a memory configured to store instructions, first information on a plurality of categories, and second information on at least one domain included the respective categories; and at least one processor, wherein the instructions, when executed, cause the processor to: acquire a first utterance, determine a specific category corresponding to the first utterance from among a plurality of categories based on at least part of the first information, determine a first domain for processing the first utterance from among a plurality of domains related to the determined specific category based on at least part of the second information, acquire information that causes an operation corresponding to the first utterance to be performed based on the determined first domain, acquire a second utterance, identify whether the second utterance is able to be processed in the determined first domain based on at least part of the second information, based on identifying that the second utterance is unable to be processed based on the first domain, identify a second domain from among the plurality of domains, identify whether the second utterance is able to be processed based on the second domain, and based on identifying that the second user utterance is able to be processed based on the second domain, acquire information that causes an operation corresponding to the second utterance to be performed based on the second domain.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method of operating an electronic device, the method comprising:
   receiving a first utterance from a device;
   determining a specific category corresponding to the received first utterance from among a plurality of categories;
   determining a first domain for processing the first utterance from among a plurality of domains related to the determined specific category;
   obtaining information causing an operation corresponding to the first utterance to be performed based on the determined first domain;
   receiving a second utterance from the device;
   based on a specified condition related to the second utterance being satisfied after the first domain is determined, identifying whether the second utterance is capable of being processed in the determined first domain;
   based on identifying that the second utterance is not capable of being processed based on of the first domain, identifying a second domain among the plurality of domains and identifying whether second utterance is capable of being processed based on the second domain;
   based on identifying that the second utterance is capable of being processed based on the second domain, obtaining processing result information causing an operation corresponding to the second utterance to be performed based on the second domain, and
   transmitting, to the device, the processing result information causing the device to perform at least one operation based on the processing result information, wherein the at least one operation includes displaying, on the device, a user interface of a first application for providing a specified service based on a deeplink included in the processing result information,
   wherein the specified condition related to the second utterance comprises a case in which the second utterance is received within a specified time from a time at which the first domain is determined, or a case in which information indicating that a first application related to the first domain is running in a foreground state in the device is received together with the second utterance.

2. The method of claim 1, wherein information related to a plurality of applications corresponding to the plurality of domains is registered in the specific category of the plurality of categories so that the plurality of domains is included in the specific category.

3. The method of claim 2, wherein the first domain is included in at least one category other than the specific category among the plurality of categories.

4. The method of claim 1, further comprising:
   causing the second utterance to be processed in an application corresponding to the second domain; and
   obtaining the deeplink comprising information for accessing a graphic element comprising content related to the application or a specific screen of the application based on a result of the processing, as the information that causes the operation corresponding to the second utterance to be performed.

5. The method of claim 1, further comprising:
   determining a first resolver corresponding to the first utterance from among a plurality of resolvers having learned based on utterances; and
   determining the specific category from among a plurality of categories assigned to the first resolver based on information related to the first utterance.

6. The method of claim 5, wherein the information related to the first utterance comprises at least one of information on a device acquired from the first utterance, information on a specific word acquired from the first utterance, information indicating an intent acquired from the first utterance, or information indicating a result of searching performed based on the first utterance.

7. The method of claim 6, further comprising:
receiving context information related to the first utterance together with the first utterance; and
selecting the specific category from among the plurality of categories assigned to the first resolver based on the information related to the first utterance and the context information.

8. The method of claim 1, further comprising:
transmitting information related to the plurality of domains related to the determined specific category to the device;
receiving, from the device, first information indicating that the first domain is selected from among the plurality of domains; and
determining the first domain from among the plurality of domains based on the first information.

9. The method of claim 8, further comprising:
obtaining second information indicating that the second utterance is capable of being processed by the first domain;
identifying at least one domain other than the first domain, included in the specific category, in response to obtaining the second information;
calculating a score related to the at least one identified domain; and
identifying the second domain having a highest score produced among the at least one domain.

10. The method of claim 9, further comprising:
based on identifying that the second utterance is capable of being processed by the second domain, identifying at least one domain associated with at least one category other than the specific category from among the plurality of categories; and
processing the second utterance by the at least one identified domain.

11. An electronic device, comprising:
at least one communication circuit;
at least one processor operatively connected to the at least one communication circuit, and
memory configured to store instructions, wherein the instructions, when executed by the at least one processor, cause the electronic device to:
control the at least one communication circuit to receive a first utterance from a device;
determine a specific category corresponding to the received first utterance from among a plurality of categories;
determine a first domain for processing the first utterance from among a plurality of domains related to the determined specific category;
obtain information causing an operation corresponding to the first utterance to be performed based on the determined the determined first domain;
control the at least one communication circuit to receive a second utterance from the device;
based on a specified condition related to the second utterance being satisfied after the first domain is determined, identify whether the second utterance is capable of being processed in the determined first domain;
based on identifying that the second utterance is not capable of being processed based on the first domain, identify a second domain from among the plurality of domains and identify whether the second utterance is capable of being processed based on the second domain;
based on identifying that the second utterance is capable of being processed based on the second domain, obtain processing result information causing an operation corresponding to the second utterance to be performed based on the second domain, and
transmit, to the device, the processing result information causing the device to perform at least one operation based on the processing result information, wherein the at least one operation includes displaying, on the device, a user interface of a first application for providing a specified service based on a deeplink included in the processing result information,
wherein the specified condition related to the second utterance comprises a case in which the second utterance is received within a specified time from a time at which the first domain is determined, or a case in which information indicating that a first application related to the first domain is running in a foreground state in the device is received together with the second utterance.

12. The electronic device of claim 11, wherein information related to a plurality of applications corresponding to the plurality of domains is registered in the specific category of the plurality of categories so that the plurality of domains is included in the specific category.

13. The electronic device of claim 12, wherein the first domain is included in at least one category other than the specific category among the plurality of categories.

14. The electronic device of claim 11, wherein the at least one processor is configured to:
cause the second utterance to be processed in an application corresponding to the second domain; and
obtain the deeplink comprising information for accessing a graphic element comprising content related to the application or a specific screen of the application based on a result of the processing, as the information causing the operation corresponding to the second utterance to be performed.

* * * * *